United States Patent
Bitou et al.

(10) Patent No.: US 8,240,918 B2
(45) Date of Patent: Aug. 14, 2012

(54) SHAFT MEMBER FOR FLUID BEARING DEVICE AND METHOD OF PRODUCING THE SAME

(75) Inventors: Kimihiko Bitou, Kuwana (JP); Jun Hirade, Kuwana (JP); Kazuto Shimizu, Kuwana (JP); Tetsuya Yamamoto, Kuwana (JP); Isao Komori, Kuwana (JP)

(73) Assignee: NTN Corporation, Osaka-shi (JP)

( * ) Notice: Subject to any disclaimer, the term of this patent is extended or adjusted under 35 U.S.C. 154(b) by 430 days.

(21) Appl. No.: 12/518,298

(22) PCT Filed: Dec. 18, 2007

(86) PCT No.: PCT/JP2007/074301
§ 371 (c)(1),
(2), (4) Date: Jun. 9, 2009

(87) PCT Pub. No.: WO2008/075675
PCT Pub. Date: Jun. 26, 2008

(65) Prior Publication Data
US 2010/0129014 A1    May 27, 2010

(30) Foreign Application Priority Data

| Dec. 20, 2006 | (JP) | 2006-343216 |
|---|---|---|
| Jan. 29, 2007 | (JP) | 2007-018183 |
| May 7, 2007 | (JP) | 2007-122665 |
| May 9, 2007 | (JP) | 2007-124707 |
| May 30, 2007 | (JP) | 2007-143729 |
| Jun. 12, 2007 | (JP) | 2007-155364 |
| Jul. 20, 2007 | (JP) | 2007-189676 |

(51) Int. Cl.
*F16C 32/06* (2006.01)
*B21D 53/10* (2006.01)

(52) U.S. Cl. ............ 384/100; 384/107; 29/898.02
(58) Field of Classification Search .......... 384/100, 384/107, 112, 114, 121, 207, 226–228, 243, 384/275, 296, 420, 425; 29/509, 898.02, 29/898.07; 310/90; 360/99.07, 99.08
See application file for complete search history.

(56) References Cited

U.S. PATENT DOCUMENTS 1,275,576 A * 8/1918 Lockwood ............ 29/509
(Continued)

FOREIGN PATENT DOCUMENTS
JP          07-296502 A       11/1995
(Continued)

OTHER PUBLICATIONS

Notification of Transmittal of Translation of the International Preliminary Report on Patentability (Form PCT/IB/338) of International Application No. PCT/JP2007/074301 mailed Jul. 2, 2009 with Forms PCT/IB1373 and PCT/ISA/237.

(Continued)

*Primary Examiner* — James Pilkington
(74) *Attorney, Agent, or Firm* — Westerman, Hattori, Daniels & Adrian, LLP

(57) ABSTRACT

A shaft portion is press-fitted to a flange portion, and a plastic working portion of a first jig is pressed against an upper end surface of the flange portion, whereby the flange portion is partially subjected to plastic deformation toward an inner peripheral side. With this, a caulked portion is formed between the flange portion and the shaft portion. Further, press-fitting and caulking are performed in a state in which both end surfaces of the flange portion are bound by a second jig and a third jig.

15 Claims, 35 Drawing Sheets

U.S. PATENT DOCUMENTS

| | | | |
|---|---|---|---|
| 2,537,723 A * | 1/1951 | Ward | 29/509 |
| 7,178,983 B2 * | 2/2007 | Shindo et al. | 384/107 |
| 7,604,409 B2 * | 10/2009 | Nishiyama et al. | 384/107 |
| 7,918,007 B2 * | 4/2011 | Watanabe et al. | 29/509 |
| 2003/0169952 A1 | 9/2003 | Yamashita et al. | |
| 2004/0071504 A1 * | 4/2004 | Harada | 29/522.1 |
| 2007/0110348 A1 | 5/2007 | Obara | |

FOREIGN PATENT DOCUMENTS

| | | |
|---|---|---|
| JP | 2000-314425 A | 11/2000 |
| JP | 2000-324753 A | 11/2000 |
| JP | 2001-003930 A | 1/2001 |
| JP | 2001-287124 A | 10/2001 |
| JP | 2001-317545 A | 11/2001 |
| JP | 2003-239951 A | 8/2003 |
| JP | 2004-202526 A | 7/2004 |
| JP | 2004-204916 A | 7/2004 |
| JP | 2005-106289 A | 4/2005 |

OTHER PUBLICATIONS

International Search Report of PCT/JP2007/074301, Mailing Date of Apr. 8, 2008.

Japanese Office Action dated May 31, 2012, issued in corresponding Japanese Patent Application No. 2007-018183, (2 pages).

* cited by examiner

SHAFT MEMBER FOR FLUID BEARING DEVICE AND METHOD OF PRODUCING THE SAME

TECHNICAL FIELD

The present invention relates to a bearing member for a fluid dynamic bearing device and a manufacturing method therefor.

BACKGROUND ART

The fluid dynamic bearing device supports a shaft member by fluid film formed in a bearing gap so as to be capable of relative rotation. The bearing device of this type is excellent particularly in rotational accuracy at the time of high-speed rotation, silence, and the like, and is suitably used as a bearing device for a motor mounted to various electrical apparatuses such as an information apparatus. Specifically, the bearing device is suitably used as a bearing device for a spindle motor in a magnetic disk drive like an HDD, an optical disk drive for a CD-ROM, CD-R/RW, DVD-ROM/RAM, or the like, or a magneto-optical disk drive for an MD, MO, or the like, or as a bearing device for a motor such as a polygon scanner motor of a laser beam printer (LBP), a color wheel motor of a projector, or a fan motor.

Normally, in a fluid dynamic bearing device, a shaft portion of a shaft member is inserted along an inner periphery of a bearing sleeve or the like, and a radial bearing portion is constituted between the outer peripheral surface of the shaft portion and the inner peripheral surface of the bearing sleeve. Further, in some fluid dynamic bearing devices, a flange portion is provided at one end of the shaft portion, and between the end surface of the flange portion and the surface opposed thereto (for example, the end surface of the bearing sleeve), a thrust bearing portion is constituted (for example, refer to Japanese Patent Application Laid-open No. 2003-239951).

As described above, the outer peripheral surface of the shaft portion constitutes a radial bearing portion, and the end surface of the flange portion constitutes the thrust bearing portion. Thus, it is necessary to finish those surfaces with high accuracy. Simultaneously, in the case where the radial bearing portion and thrust bearing portion are constituted together with each other, it is important to take into consideration not only the surface accuracy of the individual bearing portions, but also the shape accuracy therebetween, that is, perpendicularity between the outer peripheral surface of the shaft portion and the end surface of the flange portion.

Proposed examples of a method of integrating the shaft portion and the flange portion separated from each other with high accuracy include fixation means in which an annular thrust plate is press-fitted to a fixation shaft (for example, refer to Japanese Patent Application Laid-open No. 2000-324753 and Japanese Patent Application Laid-open No. 2001-317545).

Further, as another means for fixing the shaft portion and the flange portion by press-fitting with high accuracy, there has been proposed a press-fitting device in which a guide member is used and press-fit fixation is performed with use of a shaft member (shaft portion) which is provided with an R portion on the outer periphery of the lower end thereof and a ring member (flange portion) which is provided with a chamfered portion on the inner peripheral edge of the upper end of the hole thereof, the guide member having a shaft holding surface and a ring contact surface which are worked so as to achieve perpendicularity of high accuracy therebetween, the R portion and the chamfered portion are brought into contact with each other at the time of starting press-fitting (for example, refer to Japanese Patent Application Laid-open No. 2001-287124). In this case, first, the R portion provided at the lower end of the shaft member is brought into contact with the chamfered portion of the hole of the ring member. With this operation, the ring member is moved in the horizontal direction, whereby press-fitting is performed in the state in which the shaft member and the ring member are coaxial with each other.

Further, in accordance with recent downsizing and enhancement in portability of information devices, there has been demanded enhancement in resistance to falling-off and the like (impact resistance) with respect to fluid dynamic bearing devices mounted to those information devices. Accordingly, when the shaft member is constituted by the shaft portion and the flange portion separated from each other, it is important to increase fastening strength therebetween.

As means for increasing the fastening strength, there has been proposed, for example, means by which a flange portion is pressurized in the axial direction in a seal state in which an expansion of an outer diameter portion of a flange material is regulated, and the inner peripheral surface of the flange portion is reduced in diameter, whereby fastening fixation with respect to the shaft portion is achieved (for example, refer to Japanese Patent Application Laid-open No. 2004-204916).

[Patent Document 1] Japanese Patent Application Laid-open No. 2003-239951
[Patent Document 2] Japanese Patent Application Laid-open No. 2000-324753
[Patent Document 3] Japanese Patent Application Laid-open No.
[Patent Document 4] Japanese Patent Application Laid-open No. 2001-287124
[Patent Document 5] Japanese Patent Application Laid-open No. 2004-204916

DISCLOSURE OF THE INVENTION

Problems to be Solved by the Invention

In comparison with other fixation means, press-fitting can be relatively easily carried out. Further, when press-fitting is carried out after the surfaces to be fixed by press-fitting are finished with high accuracy and are positioned to each other in advance, assembly accuracy such as perpendicularity can be ensured. However, in terms of fastening strength, it is insufficient for press-fitting to satisfy the above-mentioned demand for increase in fixing force (holding force) in anticipation of falling-off and the like. As a matter of course, when an attempt is made to reduce the axial dimension in the recent trend in which demand for downsizing has increased, press-fitting length is inevitably reduced. Under the circumstance, it is difficult to ensure fastening strength. Patent Document 2 describes that, after press-fitting, fixation strength is increased by laser welding of the axial end portion of the press-fit region. However, for the operations of this type, it is necessary to separately establish large scale and expensive facilities, which leads to increase in manufacturing cost thereof.

Alternatively, as described in Patent Document 5, in the case where there is adopted means by which a flange portion in the state in which the enlargement of the outer peripheral surface thereof is regulated is reduced in diameter by compression by so-called press working, whereby the shaft portion and the flange portion are fastened to each other, there arise problems with accuracy. That is, the flange portion is provided with a bearing surface, and hence it is necessary that shape accuracy and surface accuracy thereof be high. On the other hand, the fixation means of this type is provided to achieve fastening fixation by subjecting the whole component to plastic deformation. Therefore, it is difficult to avoid deformation of the bearing surface and the like, which leads to a risk that required surface accuracy cannot be sufficiently ensured.

In addition, as described above, in the case of integrating the shaft portion and the flange portion by press-fitting, when the shape accuracy (perpendicularity) between the bearing surfaces, it suffices that a press-fitting dimension (press-fitting length in the axial direction) is increased. However, in the recent situation in which demand for downsizing has increased, it is difficult to avoid reduction in an axial dimension of the shaft member, and is extremely difficult to increase the press-fitting dimension.

Further, as described in Patent Document 3, in the case where press-fitting means is adopted, relatively high fixation strength can be obtained only by setting a tightening allowance. Meanwhile, the fixation strength and the assembly accuracy are in incompatible relationship. Thus, as the tightening allowance is increased for satisfying demand for increase in holding force (fixing force), the assembly accuracy is decreased, whereby it is difficult to obtain necessary shape accuracy such as perpendicularity between the bearing surfaces.

Simultaneously, in the case where fastening force is ensured by press-fitting, the fastening force largely depends on an aspect of the tightening allowance (size or uniformity). Accordingly, in order to obtain high fastening force without involving variation, there is no other way but to enhance working accuracy (dimensional accuracy) of individual components. However, in some cases, it is difficult to work some components with high accuracy in relation to other parts for which high accuracy working is necessary (for example, thrust bearing surface). In particular, the outer peripheral surface of the shaft portion and the hole of the flange portion are different from each other in working means, which leads to difference in working tolerance (dimensional tolerance) therebetween. Therefore, variation in tightening allowance caused by the difference in the tolerance becomes larger. With this, there occurs a combination in which actual tightening allowances fall out of an allowable range thereof, which leads to a risk that necessary fastening force cannot be obtained.

Further, when the case where the shaft member of this type is mass-produced is taken into consideration, the dimensional variation of the shaft portions and the flange portions separately manufactured is inevitably allowed to some extent. On the premise of this, as in Patent Document 4, even when press-fitting is performed with use of a guide member obtained by working in advance the shaft holding surface and the ring contact surface so that perpendicularity of high accuracy is achieved therebetween, it is difficult to perform press-fitting in the state in which the position and the posture of the shaft portion with respect to the flange portion are maintained with high accuracy.

In addition, press-fitting is performed while involving deformation of the members. Thus, even when the members are positioned with high accuracy at the time of starting press-fitting, in accordance with progress of press-fitting, there are quite a few cases where positional relationship therebetween is broken. The guide member described in Patent Document 4 is coupled with a drive mechanism (screw shaft) through an intermediation of a spring, and hence even when press-fitting of the shaft portion is started, the guide member is not lowered from the position of being brought into contact with the flange portion. However, the guide member is provided merely for positioning the flange portion with respect to the shaft portion at the time of starting the press-fitting, and hence prevention or restoration of deviation in positional relationship after the start of press-fitting is not intended.

Under the circumstances, it is a first technical object of the present invention to form at lower cost a shaft member for a fluid dynamic bearing device, which is excellent in accuracy of bearing surfaces and shape accuracy between the bearing surfaces, and which has high fixation strength between a shaft portion and a flange portion.

Further, under the circumstances, it is a second technical object of the present invention to provide a manufacturing method for a shaft member for a fluid dynamic bearing device by which necessary fastening strength can be obtained without involving variation while assembly accuracy is ensured between the shaft portion and the flange portion.

Further, under the circumstances, it is a third technical object of the present invention to mass-produce at lower cost a shaft member for a fluid dynamic bearing device, which is excellent in accuracy of bearing surfaces and shape accuracy between the bearing surfaces.

Means for Solving the Problems

The first technical object is achieved by a shaft member for a fluid dynamic bearing device according to a first aspect of the present invention. That is, the shaft member for a fluid dynamic bearing device includes: a shaft portion; and a flange portion fixed to one end of the shaft portion, in which: a radial bearing gap is formed between an outer peripheral surface of the shaft portion and a surface opposed to the outer peripheral surface; and a thrust bearing gap is formed between an end surface of the flange portion and a surface opposed to the end surface, the shaft member being rotated and supported by fluid film formed in the radial bearing gap and the thrust bearing gap, and is characterized in that: the shaft portion is press-fitted into a hole portion provided in the flange portion; and one of the shaft portion and the flange portion is partially subjected to plastic working and is fixed to another by caulking.

As described above, the shaft member according to the first aspect of the present invention is characterized in that press-fit fixation and caulking fixation are simultaneously adopted, and is characterized in that a caulked portion is formed by performing, while avoiding caulking by means of plastic deformation of the entire of the flange portion, partial plastic working on the shaft portion or the flange portion. With this structure, similarly to the conventional cases, it is possible to avoid deformation of the shaft portion or the entire of the flange portion, which is caused by caulking. Further, owing to the formation of the caulked portion by means of partial plastic deformation, it is possible to avoid the region subjected to press-fitting from being loosened so as to maintain a press-fit state. Thus, it is possible to increase fixation strength in the state in which high shape accuracy (perpendicularity) obtained by press-fitting or high surface accuracy obtained at the time of working individual components. Alternatively, as long as necessary fixation strength can be ensured, downsizing of the fluid dynamic bearing device can be achieved as well by reducing the axial dimension thereof.

The caulked portion is preferably formed by partially performing plastic deformation on the flange portion, and is preferably obtained by performing plastic deformation on the region on the radially inner side with respect to the region facing the thrust bearing gap. This is because, while the hardness of the shaft portion is normally increased by surface treatment such as quenching in terms of increase in strength and improvement of sliding appropriately, the flange portion can be made of a material more excellent in workability than that of the shaft portion. Further, when the flange portion is partially subjected to plastic deformation while the thrust bearing surface is avoided, accuracy of both end surfaces constituting the thrust bearing surfaces is not deteriorated. Further, plastic deformation can be effected except the region substantially functioning as the thrust bearing surfaces, which does not lead to reduction of the bearing area. Thus, the partial plastic deformation is preferable.

Further, for the purpose of ensuring accuracy of bearing surfaces and area thereof, it is possible to provide a release portion for releasing plastic deformation of the flange portion to the radially inner side, which is caused by plastic working, to the shaft portion. That is, as described above, when plastic working (a caulking process) is performed on the flange portion, owing to the provision of a groove-like smaller diameter portion or the like at a position at which the plastically deformed region generated in the flange portion can be released, plastic deformation occurs toward the groove-like smaller diameter portion. Thus, it is possible to suppress hump around the region subjected to plastic working, and possible to maintain accuracy of the thrust bearing surfaces provided at the flange portion.

Further, in the present invention, the above-mentioned caulking process can be performed also on the release portion provided on the inner periphery of one end surface of the flange portion. As illustrated in FIG. 23A, in the case where a flange portion 122 is fixed to a shaft portion 221 by simultaneously adopting press-fitting and a caulking process to the flange portion, a portion recessed by being subjected to a caulking process by a plastic working portion 131$b$ (recessed portion 222$f$) is formed in an end surface 222$a$ of a flange portion 222, and a hump portion 222$g$ is generated around the recessed portion 222$f$ in accordance with an amount of recess (refer to FIG. 23B). Thus, in the case where the hump portion 222$g$, in particular, the hump portion 222$g$ formed on the side near to the region constituting the thrust bearing surface of the end surface 222$a$ of the flange portion 222 largely protrudes from the bearing surface, there is a risk that bearing performance is adversely affected, which is not preferable. In particular, in the case where a caulking process is performed on the inner periphery of the flange portion in a press-fit state, plastic deformation due to a caulking process tends to be caused not toward the shaft portion but toward the outer diameter of the flange portion. Thus, the above-mentioned hump is remarkable.

As a countermeasure therefor, when a relief portion is provided on the inner periphery of one end surface of the flange portion, and a caulking process is performed on the relief portion, a recessed portion is formed in the portion subjected to the caulking process. In addition, plastic flow generated by the caulking process is absorbed by the relief portion adjacent to the recessed portion. Accordingly, it is possible to suppress the hump portion generated on the side near to the thrust bearing surface. Further, when the caulking process is performed on a position separated from the radially outer end of the relief portion, the hump portion generated on the radially outer side thereof by the caulking process is formed on the relief portion. Thus, it is possible to suppress the portion of the hump portion generated by the caulking process, which protrudes from the thrust bearing surface. Further, in this case, in accordance with an amount of the caulking process (size of the recessed portion), it is possible to suppress the above-mentioned protruding height of the hump portion from the thrust bearing surface. Specifically, the protruding height from the thrust bearing surface is set equal to 3 μm or less, more preferably, set equal to 2 μm or less, whereby it is possible to avoid substantial interference with bearing performance, and possible to ensure preferable bearing performance.

Further, owing to the adjustment of the size of the hump portion generated by the caulking process (in particular, height thereof), it is also possible to constitute the thrust bearing surface by the hump portion (first hump portion) generated on the radially outer side of the portion recessed by being subjected to the caulking process. That is, the size of the hump portion, which is generated on the thrust bearing surface side, is adjusted in accordance with the size of the part of the relief portion, which is adjacent to the thrust bearing surface, whereby the hump portion can be used as apart of the thrust bearing surface. Accordingly, it is possible to perform the caulking process on the end surface of the flange portion with respect to a position relatively separated from the shaft portion, whereby caulking can be more firmly performed to the shaft portion. Note that, the height of the hump formed by the caulking process can be controlled by appropriately setting, for example, a shape of a leading end of a caulking jig, a caulking amount (pushing-in amount of a jig), a shape of the relief portion.

Further, in the case where a hump portion is formed on the radially inner side of the portion recessed by being subjected to the caulking process, it is also possible to form a caulked portion with respect to the shaft portion by means of the hump portion (second hump portion). In this case, the larger (higher) the hump portion is, the larger the fastening area with respect to the shaft portion becomes. Thus, owing to the above-mentioned adjustment, plastic deformation is positively caused to occur on the radially inner side, whereby it is possible to increase fixing force with respect to the shaft portion by caulking.

As described above, the flange portion is fixed to the shaft portion by simultaneously adopting press-fitting and caulking, whereby it is possible to obtain a shaft member which is excellent in fixation strength and also in assembly accuracy. In this case, it is necessary to pay attention to the point that there is a risk that deformation of the flange portion at the time of press-fitting is promoted by the caulking process. That is, when the shaft portion is press-fitted into the hole of the flange portion from any one of the sides, in some cases, there occurs variation in tightening allowance in the axial direction depending on working accuracy of the hole of the flange portion, and the flange portion is deflected in any directions. When the caulking process is performed on one end surface of the flange portion while the deflection of this type remains, there is a risk that the deflection (deformation) of the flange portion is promoted, which is not preferable.

As a countermeasure therefor, in the present invention, between the inner peripheral surface of the hole portion of the flange portion and the outer peripheral surface of the shaft portion, in addition to a portion fixed by press-fitting and a portion fixed by caulking, there is provided a portion for absorbing plastic deformation caused in accordance with caulking. Alternatively, the shaft portion is press-fitted into the hole portion of the flange portion having a larger diameter portion so that a gap is formed between the larger diameter portion of the hole portion and the shaft portion, and the caulking process is performed on the inner peripheral side of the end surface of the flange portion so that at least a part of the gap is filled by deformation as a result of the caulking process. With this, at the time of assembly of the shaft portion and the flange portion, of the plastic deformation of the flange portion, which is caused by the caulking process, a part of the deformation which is caused at least toward the inner peripheral side is absorbed between the shaft portion and the flange portion. Alternatively, deformation of the flange portion is caused in a direction in which the gap provided at a point to constitute a caulking fixation portion is filled. As described above, it is possible to reduce deformation caused toward the outer peripheral side as a result of incomplete deformation toward the inner peripheral side, and possible to suppress promotion of deformation such as deflection caused on the entire of the flange portion by caulking.

The absorbing portion of plastic deformation can be formed by filling the gap provided between the flange portion and the shaft portion, and the gap can be formed between the larger diameter portion formed in advance in the inner peripheral surface of the hole portion (hole) of the flange portion and the outer peripheral surface of the shaft portion.

In this case, a position at which the gap is formed is not particularly limited. For example, it is possible to provide the gap such that the absorbing portion of plastic deformation is formed on the inner side in the radial direction of the portion recessed by a caulking process. Alternatively, it is possible to provide the gap such that the absorbing portion of plastic deformation is formed directly below the portion recessed by a caulking process. Note that, in any of the cases, it is necessary that the distance from the portion (recessed portion) to be subjected to a caulking process be small to the extent that deformation of the flange portion, which is caused by the caulking process, can be absorbed. Further, when the point that the portion to be subjected to a caulking process should be positioned on the inner peripheral side as much as possible in relation to the thrust bearing surface is taken into consideration, it is preferable that the gap be positioned on the inner side in the radial direction of the recessed portion, specifically, be provided at a position at which the portion is filled owing to the deformation in accordance with the caulking process. In this case, the caulking fixation portion and the absorbing portion of plastic deformation are formed in the same region. With this structure, it is possible to reduce the deformation caused by caulking as much as possible while performing the caulking process as close to the inner side of the flange portion as possible, and possible to effectively obtain fixing force by caulking owing to the caulking fixation portion formed between the shaft portion and the flange portion in the filled portion of the gap.

Note that, examples of a shape of a gap to be formed between the flange portion and the shaft portion before caulking include one formed between a cylindrical surface and the outer peripheral surface of the shaft portion, the cylindrical surface having a diameter larger than that of a press-fitted portion of the hole portion and constituting the larger diameter portion of the flange portion. Alternatively, examples thereof include one formed between an annular notched groove and the outer peripheral surface of the shaft portion, the notched groove constituting the larger diameter portion.

Further, for the purpose of suppressing hump on the end surface at the time of the caulking process, it is also possible to provide the relief portion on the inner peripheral side of the one end surface of the flange portion, and to perform the caulking process on the relief portion. With this structure, a recessed portion is formed in the portion subjected to the caulking process, and plastic flow caused by the caulking process is absorbed by the relief portion which is adjacent to the recessed portion and is provided in the end surface of the flange portion. Accordingly, it is possible to suppress the hump portion generated on the side near to the thrust bearing surface. Further, when the caulking process is performed on a position separated from the radially outer end of the relief portion, the hump portion generated on the outer peripheral side thereof by the caulking process is formed on the relief portion. Thus, it is possible to suppress the portion of the hump portion generated by the caulking process, which protrudes from the thrust bearing surface.

Incidentally, in the present invention having structure in which the shaft portion and the flange portion are fixed by caulking while involving press-fitting, thickness hump or the like occurs in accordance with the caulking process (plastic working), which especially adversely affects on the accuracy of the thrust bearing gap. As an example of means for avoiding the adverse effect, it is probable that the thickness hump is removed by performing a machining process such as trimming after the caulking process. However, in order to avoid deterioration in bearing performance caused by contamination, it becomes necessary to further provide a step of elaborately removing trimming powder generated in accordance with a trimming process, which leads to increase in manufacturing cost.

As a countermeasure therefor, when the end surface facing the thrust bearing gap of the flange portion is covered with a cover portion, only with a single step of forming the cover portion, it is possible to eliminate the adverse effect caused by the thickness hump or the like so as to form the thrust bearing gap with high accuracy. Further, even in the case where the shapes of the shaft portion and the flange portion and the relative postures therebetween are deteriorated in accordance with press-fitting and caulking, it is possible to ensure the required accuracy in the cover portion. In other words, within a range of not adversely affecting the bearing performance, it is possible to lower quality required in working steps of manufacturing the members, press-fitting, and caulking. Therefore, manufacturing cost can be reduced in this manner as well.

While caulking may be performed on any one of or both the shaft portion and the flange portion, it is desirable that caulking be performed on the flange portion. This is because, while the hardness of the shaft portion is normally increased by surface treatment such as quenching in terms of increase in strength and enhancement in sliding appropriately, the flange portion can be made of a material more excellent in workability than that of the shaft portion.

In terms of enhancement in accuracy of the cover portion at lower cost, it is desirable that the cover portion be formed by die molding through insertion of the shaft portion and the flange portion. Further, the cover portion may be provided with a thrust dynamic pressure generating portion for generating a fluid dynamic pressure in the thrust bearing gap. In particular, in the case where the cover portion is formed by die molding, it is possible to obtain a shaft member with desired accuracy thereof being ensured, and to form the thrust dynamic pressure generating portion by die molding simultaneously with the formation of the cover portion. Therefore, it is possible to save time and effort for providing the dynamic pressure generating portion to the other side member for forming the thrust bearing gap, to thereby achieve cost reduction of the fluid dynamic bearing device.

Note that, regarding the shaft member described above, the hole portion provided in the flange portion may be formed in a recessed manner, or may be formed as a through-hole opening in both the end surfaces of the flange portion. In particular, with the later structure, the caulked portion can be formed at both ends of the hole portion, which is preferable for increasing strength of the shaft member.

Further, the first technical object is achieved by a manufacturing method for a shaft member for a fluid dynamic bearing device according to the first aspect of the present invention.

That is, in the manufacturing method for a shaft member for a fluid dynamic bearing device, the shaft member includes: a shaft portion; and a flange portion fixed to one end of the shaft portion, in which: a radial bearing gap is formed between an outer peripheral surface of the shaft portion and a surface opposed to the outer peripheral surface; and a thrust bearing gap is formed between an end surface of the flange portion and a surface opposed to the end surface, the shaft member being rotated and supported by fluid film formed in the radial bearing gap and the thrust bearing gap. The manufacturing method therefor is characterized by including the steps of: press-fitting the shaft portion into a hole portion provided in the flange portion; and caulking the shaft portion or the flange portion.

The same matters as those regarding the shaft member, which are mentioned at the start of this section, are applied to the manufacturing method as described above. Therefore, the same operational effects as those obtained by the matters can be obtained.

In this case, the caulking process normally causes plastic deformation in any one of both the members to be fixed to each other by fastening. Thus, for example, when the caulking step is performed after the press-fitting step, owing to plastic deformation of one of the members, deformation occurs in the region relating to press-fit fixation, and hence there arises a risk of deterioration in press-fitting force or in press-fitting accuracy. Therefore, the caulking process is not preferable. In this context, for example, when the caulking step in a press-fit state is performed in the state in which the end surfaces of the flange portion are bound, caulking can be performed while maintaining the surface accuracy of the end surfaces to be bound and maintaining the posture (position) of the flange portion with respect to the shaft portion to that at the time of press-fitting. Further, when caulking is performed with use of a jig having a surface, which is finished with high accuracy, for binding the flange portion, positional deviation and the like at the time of press-fitting can be corrected by binding of the jig. Further, the shaft member having high shape accuracy (perpendicularity and the like) can be manufactured simultaneously with fixation. Thus, it is unnecessary to separately provide a step of correction in a post-processing, and hence unnecessary to increase the number of steps. Therefore, with this method, it is possible to manufacture a shaft member having significantly high surface accuracy and perpendicularity, and sufficient fastening strength at lower cost.

As a matter of course, also during the press-fitting step, by putting both the end surfaces of the flange portion in the state of being bound, it is possible to perform press-fitting in the state in which the press-fit posture of the shaft portion with respect to the flange portion is appropriately maintained. Further, when press-fitting is performed in the state in which the press-fit posture of the shaft portion is appropriately maintained, there is a low risk of causing positional deviation after press-fitting, which is preferable.

Further, for the purpose of compensating difference in dimensional tolerance, which is caused between the shaft portion and the flange portion and in working processes, it is also possible to set caulking force based on press-fitting force at the time of press-fitting the shaft portion to the flange portion. In this case, based on load (press-fitting force) at the time of press-fitting, which can be detected beforehand, load (caulking force) at the time of caulking which is performed afterward is controlled so that the sum of fixing force by press-fitting and fixing force by caulking is constant. Alternatively, the sum of fixing force (fixation strength) is set so as to constantly satisfy the minimum fixation strength required in accordance with application thereof or the like, and set so that the caulking process is performed while fixed caulking force is imparted when necessary. Therefore, even in the case where there is variation in difference between the outer diameter of the shaft portion and the inner diameter of the hole of the flange portion (corresponding to the tightening allowance), which are press-fitted to each other, fixing force between the shaft portion and the flange portion of a finished product is maintained to be constant, or the lower minimum value thereof is ensured. Therefore, it is possible to increase yield rate and to stably provide shaft members of high quality.

The above-mentioned shaft member according to the first aspect of the present invention, or a shaft member manufactured by the manufacturing method therefor has significantly excellent accuracy of the bearing surfaces and perpendicularity between the bearing surfaces. Therefore, the shaft members can be suitably provided as shaft members for a fluid dynamic bearing device in which it is necessary to manage bearing gaps with high accuracy, or as fluid dynamic bearing devices provided with the shaft members. Further, the shaft members can be suitably provided by being incorporated in a motor such as a motor for an HDD, in which another member such as a disk-hub is attached to an end portion of the shaft portion, which is opposed to the side of the flange portion.

Further, the second technical object is achieved by a manufacturing method for a shaft member for a fluid dynamic bearing device according to a second aspect of the present invention. That is, in the manufacturing method for a shaft member for a fluid dynamic bearing device, the shaft member includes: a shaft portion having an outer peripheral surface facing a radial bearing gap; and a flange portion fixed to an end of the shaft portion and having end surfaces at least one of which faces a thrust bearing gap, the method therefor including the steps of: press-fitting the shaft portion into a hole portion provided in the flange portion; evaluating a tightening allowance at a time of press-fitting of the shaft portion and the flange portion; and setting a caulking condition after press-fitting based on the evaluated tightening allowance.

As described above, the manufacturing method according the second aspect of the present invention is characterized in that the shaft portion is press-fitted to the flange portion, a tightening allowance at the time of press-fitting is evaluated, and a caulking condition is set based on the evaluated tightening allowance. With this method, the caulking condition can be adjusted in accordance with the degree of the evaluated tightening allowance, and hence variation in tightening allowance is compensated by caulking, whereby stable fixing force can be imparted between the shaft portion and the flange portion. In particular, in the case where the evaluated tightening allowance is smaller than a value of an appropriate tightening allowance, by performing a caulking process under the appropriate caulking condition based on the value of the evaluated tightening allowance, it is possible to make reinforcement by caulking substantial and effective. As a matter of course, in the case of a tightening allowance with which necessary fastening force is estimated to be ensured by press-fitting, the caulking condition can be set such that the caulking process is omitted.

Incidentally, the above-mentioned assembly step (step of integrating the shaft portion and the flange portion) is normally performed on a lot-by-lot basis in consideration of productivity and cost thereof. In this case, the press-fitting step is performed on a pair of a shaft portion and a flange portion arbitrarily selected from lots of each of the shaft portion and the flange portion. As described above, in the case where the assembly step is performed on a lot-by-lot basis, for example, as illustrated in FIG. 60, for the purpose of including the shaft portions and the flange portions as many as possible within a range of an effective and appropriate tightening allowance (range indicated by region$_{40}$ in FIG. 60), it is probable that matching in which the difference between a representative outer diameter dimension M$_s$ of the shaft portions and a representative inner diameter dimension M$_f$ of the holes of the flange portions is set as an aimed value P$_{aim}$ of the tightening allowance is performed on the basis of lots L$_S$ and L$_f$.

However, when press-fitting is performed after the matching as described above is performed, of assembled products, there are included assembled products belonging to a range in which the tightening allowance is excessively small (range indicated by region$_{41}$ in FIG. 60), or to a range in which the tightening allowance is excessively large (range indicated by region$_{42}$ in FIG. 60). In the case where the tightening allowance is excessively small, as described above, fixing force can be compensated by performing caulking in accordance with the degree of the evaluated tightening allowance. However, in the case where the tightening allowance is excessively large, there arise failures which cannot be compensated by caulking, such as a failure of trimming the inner diameter portion of the flange portion, with the result that yield rate is decreased.

As a countermeasure therefor, in the present invention, before the press-fitting step, there is performed on a lot-by-lot basis matching in which the difference between the representative outer diameter dimension of the shaft portions and the representative inner diameter dimension of the hole portions of the flange portions, which are determined in each of the lots, is set to be smaller than an aimed value of the tightening allowance, and the press-fitting step is performed thereafter. Note that, the phrase "representative outer diameter dimension" herein includes an average value of the outer diameter dimensions of all the shaft portions included in a lot unit (average outer diameter dimension) and a dimension (of the highest rate of being included in the lots) of the highest frequency in the case where the frequency distribution of the outer diameter dimension of the shaft portion is calculated on the lot-by-lot basis. The phrase "representative inner diameter dimension" also includes the similar concept.

An allowable range of the appropriate tightening allowance normally has a predetermined width including aimed values of the tightening allowance. Thus, matching is performed on the lot-by-lot basis as described above, whereby the allowable range of the appropriate tightening allowance wholly shifts to the side on which the tightening allowance is large. As a result, while a range in which the tightening allowance is relatively excessively small is increased (range in which the tightening allowance falls out of the allowable range of the appropriate tightening allowance to the side on which the tightening allowance is small), by that much, a range in which the tightening allowance is relatively excessively large is decreased (range in which the tightening allowance falls out of the allowable range of the appropriate tightening allowance to the side on which the tightening allowance is large). In this case, regarding assembled products obtained by combination in the range in which the tightening allowance is excessively small, fixing force therebetween can be adjusted by performing a caulking process based on the evaluated tightening allowance. Thus, it is possible to ensure fixing force after assembly with respect to works as many as possible, and possible to increase yield rate while decreasing rate of failure assemblies caused by the excessive tightening allowance.

Further, when matching is performed on the lot-by-lot basis as described above, it is preferable to perform matching in which the difference between a smallest outer diameter dimension of the shaft portions and a smallest inner diameter dimension of the hole portions of the flange portions, which are determined in each of the lots, is set as the aimed value of the tightening allowance. Note that, the "smallest outer diameter dimension" herein represents substantially the smallest outer diameter dimension of the outer diameter dimensions of the shaft portions included in the lots. Similarly, the "smallest inner diameter dimension" represents substantially the smallest inner diameter dimension of the inner diameter dimensions of the hole portions (holes) of the flange portions included in the lots. In the case where a nominal dimension (representative dimension) and working tolerance are clear, the smallest outer diameter dimension and the smallest inner diameter dimension can be estimated from those values.

As described above, press-fitting is performed after performing the matching in which the difference between the smallest outer diameter dimension of the shaft portions and the smallest inner diameter dimension of the hole portions of the flange portions is set as the aimed value of the tightening allowance, whereby it is possible to remove the range in which the tightening allowance is relatively excessively large (range in which the tightening allowance falls out of the allowable range of the appropriate tightening allowance to the side on which the tightening allowance is large). In other words, in any combinations of the shaft portions and the flange portions, it is possible to eliminate the state in which the tightening allowance falls out of the allowable range thereof to the side of being excessibly large. Accordingly, it is possible to further decrease failures in assembly involved with press-fitting, and to further increase yield rate as a shaft member.

In this case, examples of a method of evaluating a tightening allowance include a method of evaluating a tightening allowance based on the outer diameter dimensions of the shaft portions and the inner diameter dimensions of the hole portions of the flange portions, which have been measured before press-fitting, and a method of evaluating a tightening allowance based on load at the time of press-fitting. In this context, when a tightening allowance is evaluated based on the load at the time of press-fitting, it is possible to obtain information on the press-fit states of the press-fit products. Therefore, a tightening allowance (fastening force which is estimated to be obtained by press-fitting) can be evaluated based on the information reflecting the individually specific press-fit states. Further, only with appropriate pressure sensors provided to the jigs or the like used at the time of press-fitting, tightening allowances can be individually evaluated, and hence it is unnecessary to separately provide steps of and facilities for measuring dimensions, which is economically preferable.

Further, examples of a method of setting a caulking condition based on an evaluated tightening allowance include a method in which a lower minimum value of tightening allowance to be evaluated is set and a caulking process is performed while a caulking condition is set to a predetermined value in the case where an actually evaluated tightening allowance becomes smaller than the preset lower minimum value, and a method in which a caulking condition is set such that sum of fastening force based on an evaluated tightening allowance and fastening force of caulking is constant. Of those methods, according to the method in which a caulking process is performed while a caulking condition is set to a predetermined value in the case where an actually evaluated tightening allowance becomes smaller than the preset lower minimum value, it is possible to perform a caulking process on each of the lots in a single mode (for example, predetermined caulking load), which is practical. Note that, specific examples of the caulking condition include one achieved by the method in which reaction force which a caulking jig receives from works at the time of the caulking process is evaluated as caulking load so that the caulking process at the maximum value of the reaction force is controlled, and one achieved by the method of controlling the caulking process by a pushing-in amount of a caulking jig.

Further, the third technical object is achieved by a manufacturing method for a shaft member for a fluid dynamic bearing device according to a third aspect of the present invention. That is, in the manufacturing method for a shaft member for a fluid dynamic bearing device, the shaft member includes: a shaft portion; and a flange portion fixed to one end of the shaft portion by press-fitting, in which: a radial bearing gap is formed between an outer peripheral surface of the shaft portion and a surface opposed to the outer peripheral surface; and a thrust bearing gap is formed between an end surface of the flange portion and a surface opposed to the end surface, the shaft member being rotated and supported by fluid film formed in the radial bearing gap and the thrust bearing gap. The manufacturing method therefor is characterized by including the step of imparting, after press-fitting the shaft portion into a hole portion provided in the flange portion, corrective force for correcting the posture of the flange portion with respect to the shaft portion to at least one of the shaft portion and the flange portion.

Alternatively, in the manufacturing method for a shaft member for a fluid dynamic bearing device, the shaft member includes: a shaft portion; and a flange portion fixed to one end of the shaft portion by press-fitting, in which: a radial bearing gap is formed between an outer peripheral surface of the shaft portion and a surface opposed to the outer peripheral surface; and a thrust bearing gap is formed between an end surface of the flange portion and a surface opposed to the end surface, the shaft member being rotated and supported by fluid film formed in the radial bearing gap and the thrust bearing gap. The manufacturing method therefor is characterized in that, in the process of press-fitting the shaft portion into a hole portion provided in the flange portion, corrective force for correcting the posture of the flange portion with respect to the shaft portion is imparted to at least one of the shaft portion and the flange portion.

As described above, the manufacturing method according to the third aspect of the present invention is characterized in that correction is effected on the shaft portion and the flange portion during a press-fitting process or in a press-fitting completion state. That is, correction is effected, while effecting at the time of starting press-fitting is avoided, at the stage at which press-fitting is caused to progress to some extent or at the stage at which press-fitting has been completed, whereby it is possible to appropriately correct deformation, distortion of a posture, or the like, which is caused by press-fitting. Therefore, it is possible to manufacture at lower cost a shaft member for a fluid dynamic bearing device, which is excellent in accuracy of the bearing surfaces provided on the shaft portion and the flange portion and excellent in perpendicularity between the bearing surface of the shaft portion and the bearing surface of the flange portion.

Further, when the corrective force is imparted after the completion of press-fitting, a mechanism to be used for press-fitting and a mechanism to be used for correction can be provided separately from each other. With this, it is possible to impart to the flange portion and the like corrective force of a degree suitable for correction (for example, load equal to or larger than load necessary for press-fitting) without limitation of press-fitting force, to thereby increase degree of freedom of a loading mode.

Further, when corrective force is imparted during the press-fitting process, press-fitting and correction can be performed in the same step, whereby it is possible to decrease the number of steps. Further, depending on the structure of a device, a drive system (drive mechanism) for press-fitting of the shaft portion can be used (double) as a drive system used for correction of the flange portion and the like, whereby it suffices that a single drive system is provided. Thus, it is possible to simplify necessary facilities. Further, with this method, the posture of the flange portion with respect to the shaft portion is consequently corrected in the middle of press-fitting, and hence correction can be effected in the state in which deformation caused by press-fitting (distortion with respect to an appropriate position) is small. Accordingly, it is possible to perform correction with corrective force smaller than that in the case of imparting corrective force after the completion of press-fitting.

In the case of imparting corrective force during the press-fitting process, for example, by gradually increasing corrective force imparted to at least one of the shaft portion and the flange portion in accordance with progress of press-fitting, it is also possible to correct the posture of the flange portion with respect to the shaft portion. In the case of performing press-fitting with corrective force, depending on the correction mode and the degree thereof, it is possible that force necessary for press-fitting is increased. As a countermeasure therefor, as described above, when press-fitting is performed while gradually increasing corrective force with respect to the flange portion, it is possible to decrease the force necessary for press-fitting as a whole.

The shaft members obtained by the manufacturing method according to the third aspect are excellent in accuracy of the bearing surfaces and perpendicularity between the bearing surfaces, and high in productivity. Therefore, the shaft members can be suitably provided as shaft members for a fluid dynamic bearing device in which it is necessary to manage bearing gaps with high accuracy, or as fluid dynamic bearing devices provided with the shaft members.

Effects of the Invention

As described above, in the shaft member for a fluid dynamic bearing device or the manufacturing method therefor according to the first aspect of the present invention, the flange portion is fixed to the shaft portion by simultaneously adopting press-fit fixation and caulking fixation, whereby it is possible to form at lower cost the shaft member for a fluid dynamic bearing device, which is excellent in accuracy of the bearing surfaces and shape accuracy between the bearing surfaces, and which has high fixation strength between the shaft portion and the flange portion.

Further, as described above, in the manufacturing method for the shaft member for a fluid dynamic bearing device according to the second aspect of the present invention, it is possible to obtain necessary fastening strength without involving variation while assembly accuracy is ensured between the shaft portion and the flange portion.

Further, as described above, in the shaft member for a fluid dynamic bearing device or the manufacturing method therefor according to the third aspect of the present invention, corrective force is imparted to the shaft portion and the flange portion in the press-fitting process or the press-fitting completion state, whereby it is possible to mass-produce at lower cost the shaft member for a fluid dynamic bearing device, which is excellent in accuracy of the bearing surfaces and shape accuracy between the bearing surfaces.

BEST MODES FOR CARRYING OUT THE INVENTION

Hereinafter, a first embodiment of the present invention is described with reference to FIGS. 1 to 12. Herein, the first embodiment is an example of an embodiment according to a first aspect of the present invention. Note that, "upper and lower" directions in the following description are used for facilitating the understanding of a positional relation between components in the figures. Therefore, the installation direction, use mode, and the like of the fluid dynamic bearing device are not specified thereby. The same is applied to other embodiments described below.

Figure 1:
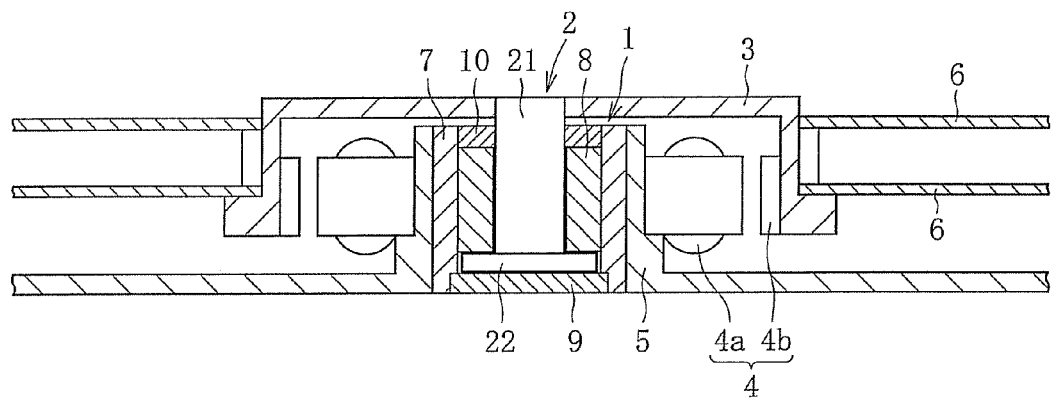
FIG. 1 is a sectional view of a spindle motor provided with a fluid dynamic bearing device according to a first embodiment of the present invention.

FIG. 1 is a sectional view of a spindle motor according to the first embodiment of the present invention, which is provided with a fluid dynamic bearing device 1. The spindle motor is used for an HDD or the like, which is provided with a magnetic disk, and includes the fluid dynamic bearing device 1 for supporting a shaft member 2 attached with a hub 3 in a radial direction and in a non-contact manner, a drive portion 4 constituted by a stator coil 4a and a rotor magnet 4b opposed to each other through an intermediation of, for example, a radial gap, and includes a bracket 5. The stator coil 4a is fixed to the bracket 5, and the rotor magnet 4b is fixed to the hub 3. A housing 7 of the fluid dynamic bearing device 1 is fixed to an inner periphery of the bracket 5. Further, as illustrated in the figure, a disk 6 (two in FIG. 1) is held on the hub 3. In the spindle motor constituted as described above, when the stator coil 4a is energized, the rotor magnet 4b is rotated with excitation force generated between the stator coil 4a and the rotor magnet 4b. In accordance therewith, the disk 6 held on the hub 3 is integrally rotated with the shaft member 2.

Figure 2:
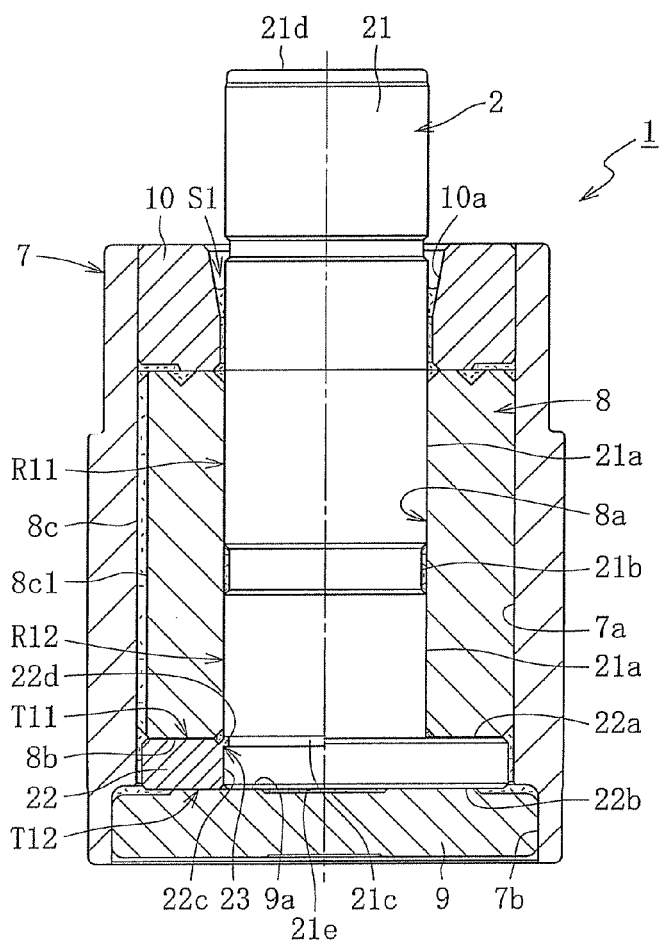
FIG. 2 is a sectional view of the fluid dynamic bearing device.

FIG. 2 illustrates the fluid dynamic bearing device 1. The fluid dynamic bearing device 1 mainly includes the housing 7, a bearing sleeve 8 fixed to the inner periphery of the housing 7, a lid member 9 for closing one end of the housing 7, a seal member 10 arranged on the opening side of the other end of the housing, and the shaft member 2 rotated relatively to the housing 7, the bearing sleeve 8, and the seal member 10.

The housing 7 is formed into a cylindrical shape with use of a metal material such as brass or a resin material, and exhibits a mode in which both axial ends thereof are opened. To an inner peripheral surface 7a of the housing 7, an outer peripheral surface 8c of the bearing sleeve 8 is fixed by appropriate means such as bonding (including loose bonding and press-fit bonding), press-fitting, or welding (including ultrasonic welding and laser welding). Further, on the lower end side of the inner peripheral surface 7a, there is formed a fixation surface 7b, which is described below and larger than the inner peripheral surface 7a in diameter, for fixing the lid member 9.

The bearing sleeve 8 is formed into a cylindrical shape with use of a porous body made of a sintered metal or the like. In this embodiment, the bearing sleeve 8 is formed into a cylindrical shape with use of a porous body made of a sintered metal including copper as a main component, and is fixed to the inner peripheral surface 7*a* of the housing 7 by bonding. Further, the bearing sleeve 8 may be formed of a porous body made of a non-metallic material such as a resin or ceramic, or may be formed of, except the porous body such as a sintered metal, a material having a structure free from inner holes, or a structure having holes of a size which prevents passage of a lubricating oil.

Figure 3:
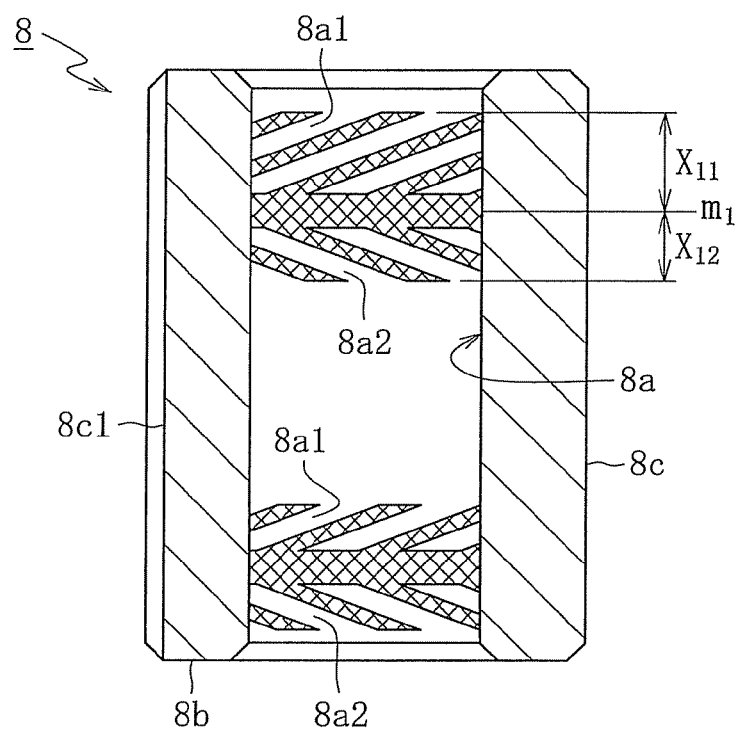
FIG. 3 is a sectional view of a bearing sleeve.

In the entire or a partially cylindrical region of an inner peripheral surface 8*a* of the bearing sleeve 8, regions where multiple dynamic pressure grooves are arranged are formed as a radial dynamic pressure generating portion. In this embodiment, as illustrated in FIG. 3, for example, two regions where multiple dynamic pressure grooves 8*a*1 and 8*a*2 having inclination angles different from each other are arranged in a herringbone pattern are formed while being axially separated from each other. Note that, in this embodiment, for the purpose of intentionally generating circulation of a lubricating oil in the inside of the bearing, the region on one side (upper side in this case), where the dynamic pressure grooves 8*a*1 and 8*a*2 are formed, is formed asymmetrically in the axial direction. When description thereof is made with reference to a mode illustrated in FIG. 3, an axial dimension X11 of the region on the upper side with respect to an axial center m1 (seal member 10 side), where the dynamic pressure grooves 8*a*1 are formed, is larger than an axial dimension X12 of the region on the lower side, where the dynamic pressure grooves 8*a*2 are formed.

Figure 4:
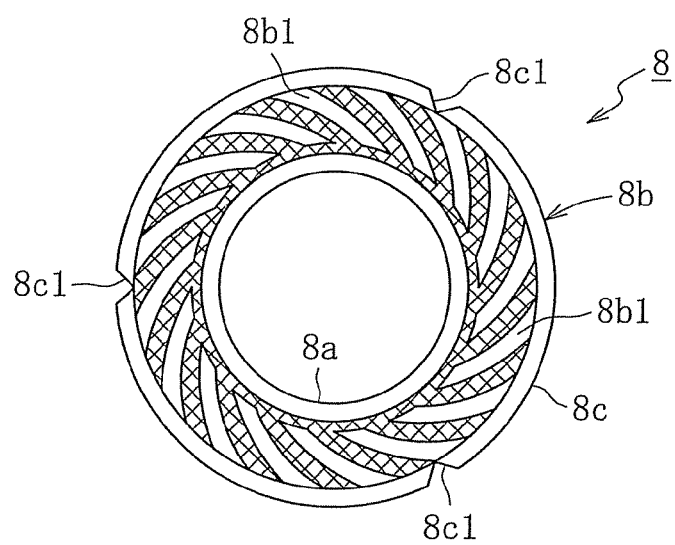
FIG. 4 is a plan view of an end surface of the bearing sleeve, which is opposed to a flange portion.

In the entire or a partially annular region of a lower end surface 8*b* of the bearing sleeve 8, as illustrated in FIG. 4, for example, a region where multiple dynamic pressure grooves 8*b*1 are arranged in a spiral pattern is formed as a thrust dynamic pressure generating portion. In the state of a finished product, the region where the dynamic pressure grooves 8*b*1 are formed is opposed to an upper end surface 22*a* of a flange portion 22 described below, and at the time of the rotation of the shaft member 2, a thrust bearing gap of a first thrust bearing portion T11 described below is formed between the region and the upper end surface 22*a* (refer to FIG. 2).

In an outer peripheral surface 8*c* of the bearing sleeve 8, there are formed multiple axial grooves 8*c*1 extending in the axial direction. Mainly during use of the fluid dynamic bearing device 1, in the case where excess and deficiency of the lubricating oil occur in the inner space of the bearing, for example, those axial grooves 8*c*1 play a role of immediately solving this undesirable state so as to restore an appropriate state.

The lid member 9 for closing the lower end side of the housing 7 is formed of a metal material, a resin material, or the like, and is fixed to the fixation surface 7*b* provided at the lower end in the inner periphery of the housing 7.

In the entire or a partially annular region of an upper end surface 9*a* of the lid member 9, there is formed a region where dynamic pressure grooves are formed, the region exhibiting an arrangement mode similar to, for example, that of FIG. 4 (opposite in spiral direction). In the state of a finished product, the region where dynamic pressure grooves are formed (thrust dynamic pressure generating portion) is opposed to a lower end surface 22*b* of the flange portion 22, and at the time of the rotation of the shaft member 2, a thrust bearing gap of a second thrust bearing portion T12 described below is formed between the region and the lower end surface 22*b* (refer to FIG. 2).

In this embodiment, the seal member 10 as a sealing means is formed of a metal material or a resin material separately from the housing 7, and is fixed to the inner periphery of the upper end of the housing 7 by an arbitrary means such as press-fitting, bonding, or welding.

On the inner periphery of the seal member 10, there is formed a sealing surface 10*a* having a tapered shape, and a seal space S1 is formed between the sealing surface 10*a* and the outer peripheral surface of a shaft portion 21 described below. In the state in which the lubricating oil is filled inside the fluid dynamic bearing device 1, the oil surface of the lubricating oil is constantly maintained within the range of the seal space S1.

The shaft member (shaft member for a fluid dynamic bearing device) 2 is constituted by the shaft portion 21 and an annular flange portion 22 having a hole 22*c* provided at the center thereof, in which the lower end of the shaft portion 21 is fixed. In this embodiment, as illustrated in FIG. 2, on the outer periphery of the shaft portion 21, there are provided, while being axially separated from each other, two radial bearing surfaces 21*a* opposed in the radial direction to the regions where the dynamic pressure grooves 8*a*1 and 8*a*2 are formed, the regions being provided on the inner peripheral surface 8*a* of the bearing sleeve 8. Between those radial bearing surfaces 21*a* and 21*a*, there is provided a thinned portion 21*b* having a diameter smaller than that of the radial bearing surfaces 21*a*. Further, of the portions introduced into the hole 22*c* of the flange portion 22, to a caulked portion 23 described below with respect to the flange portion 22, there is provided a smaller diameter portion 21*c* (also referred to as a release portion) for accommodating an inward protruding portion 22*d* of the flange portion 22, which constitutes a plastically deformed portion. In this example illustrated in the figure, there is provided a groove-like smaller diameter portion 21*c*.

The lower end of the shaft portion 21 is press-fitted to the flange portion 22. Further, at the axial end portion of the press-fit region (bearing sleeve 8 side in this case), there is provided the caulked portion 23 with respect to the flange portion 22.

After the components described above are assembled, the inner space of the bearing is filled with the lubricating oil, whereby the fluid dynamic bearing device 1 as a finished product is obtained. Here, as a lubricating oil filled in the fluid dynamic bearing device 1, various oils can be used. As a lubricating oil provided to the fluid dynamic bearing device for a disk drive such as an HDD, in consideration of changes in temperature during use and transportation thereof, it is possible to suitably use an ester-based lubricating oil excellent in low evaporation rate and low viscosity, for example, a lubricating oil including dioctyl sebacate (DOS) or dioctyl azelate (DOZ).

In the fluid dynamic bearing device 1 constituted as described above, when the shaft member 2 is rotated, the regions where the dynamic pressure grooves 8*a*1 and 8*a*2 of the bearing sleeve 8 are formed are opposed to the radial bearing surfaces 21*a* and 21*a* of the bearing portion 21 through an intermediation of radial bearing gaps. Then, in accordance with the rotation of the shaft member 2, in any of the upper and lower regions where the dynamic pressure grooves 8*a*1 and 8*a*2 are formed, the lubricating oil is pressed to an axial center m1 of the dynamic pressure grooves 8*a*1 and 8*a*2, and the pressure thereof is increased. Owing to the dynamic pressure effect of the dynamic pressure grooves 8*a*1 and 8*a*2 as described above, a first radial bearing portion R11 and a second radial bearing portion R12 for rotatably supporting the shaft member 2 in the radial direction in a non-contact manner are formed so as to be constituted at two positions while being separated from each other, respectively.

Simultaneously, in a thrust bearing gap between the region where the dynamic pressure grooves 8*b*1 are formed, the region being provided to the lower end surface 8*b* of the bearing sleeve 8, and the upper end surface 22*a* of the flange portion 22 opposed thereto, and in a thrust bearing gap between the region where the dynamic pressure grooves are arranged, the region being provided to the upper end surface 9*a* of the lid member 9, and the lower end surface 22*b* of the flange portion 22, oil films of the lubricating oil are respectively formed owing to the dynamic pressure effect of the dynamic pressure grooves. Then, owing to the pressures of the oil films, a first thrust bearing portion T11 and a second thrust bearing portion T12 for supporting the shaft member 2 in the thrust direction in a non-contact manner are constituted, respectively.

Hereinafter, an example of the manufacturing step of the shaft member 2 is described with reference to FIGS. 5 to 8.

Figure 5:
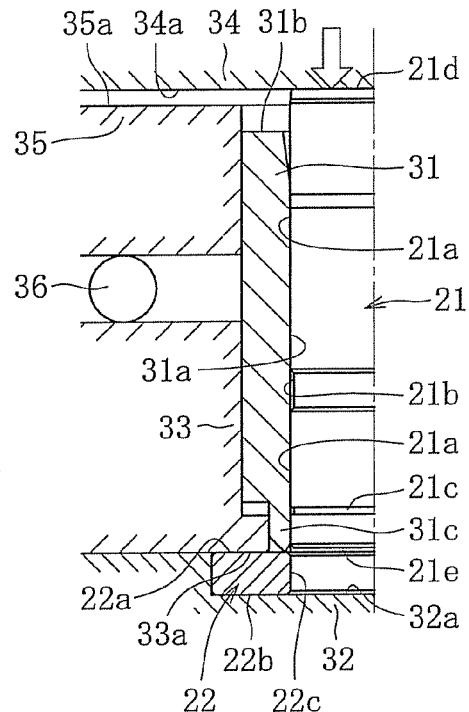
FIG. 5 is a sectional view conceptually illustrating an example of a manufacturing step of a shaft member.

FIG. 5 is a schematic view of a device used for assembly of the shaft member 2. This device mainly includes a first jig 31 for holding the shaft portion 21, a second jig 32 for holding the flange portion 22 positioned below the first jig 31, a third jig 33 capable of holding or binding the flange portion 22 between the second jig 32 and the third jig 33, and a fourth jig 34 capable of being held in contact with an upper end surface (end surface on the side opposite to flange portion 22) 21*d* of the shaft portion 21, for pushing-in the shaft portion 21 toward the flange portion 22 by an appropriate drive mechanism.

Between the third jig 33 and the fourth jig 34, there is arranged a fifth jig 35. This jig (fifth jig 35) has an elastic body 36 interposed between the third jig 33 positioned therebelow and the fifth jig 35, and in the case of receiving downward load from the fourth jig 34, the fifth jig 35 transmits this load to the third jig 33 through an intermediation of the elastic body 36. In this case, the elastic body 36 is compressed and deformed depending on the load, whereby downward displacement of the fifth jig 35 is absorbed.

The first jig 31 has a holding hole 31*a* into which the shaft portion 21 can be inserted and in which the shaft portion 21 inserted can be held. Further, an upper end surface 32*a* of the second jig 32 holds the lower end surface 22*b* of the flange portion 22, and a lower end surface 33*a* of the third jig 33 holds the upper end surface 22*a* of the flange portion 22. Accordingly, it is necessary to form the holding hole 31*a* to have a dimension and a shape of high accuracy to the extent that the radial bearing surfaces 21*a* and 21*a* of the shaft portion 21 can be appropriately held and bound. Similarly, it is necessary to form the upper end surface 32*a* and the lower end surface 33*a* to have a shape (perpendicularity and the like) of high accuracy to the extent that both the end surfaces 22*a* and 22*b* of the flange portion 22, which constitute thrust bearing surfaces, can be appropriately held and bound.

In addition, in the shaft member 2 of this type, bearing performance depends on perpendicularity between the radial bearing surface 21*a* and the thrust bearing surface (upper end surface 22*a*). Therefore, in order that high perpendicularity can be obtained between those bearing surfaces, it is preferable to increase the perpendicularity between the holding hole 31*a* and the upper end surface 32*a*, and between the holding hole 31*a* and the lower end surface 33*a* by performing highly accurate working thereon. As a matter of course, both the jigs 32 and 33 are subjected to highly accurate working so that high parallelism can be obtained between the upper end surface 32*a* and the lower end surface 33*a*, which axially bind the flange portion 22.

Below the first jig 31, there is provided a plastic working portion 31*c* for forming the caulked portion 23 between the first jig 31 and the shaft portion 21 by partially subjecting the flange portion 22 to plastic deformation in accordance with lowering of the first jig 31. In this embodiment, the plastic working portion 31*c* has a shape tapering to the leading end, and is held in contact with the inner peripheral side of the upper end surface 22*a* of the flange portion 22 in the state in which the shaft portion 21 and the flange portion 22 are installed so as to be surrounded by the jigs 31 to 35. Further, at the stage before press-fitting, the hole 22*c* of the flange portion 22 is formed to have a diameter slightly smaller than the outer diameter dimension of the shaft portion 21 to be press-fitted while predetermined tightening allowance is taken into account.

In the case of using the device structured as described above, fixation of the shaft portion 21 and the flange portion 22 is effected as described below.

As described above, in the state in which the shaft portion 21 and the flange portion 22 are installed so as to be surrounded (retained) by the first jig 31 to the fifth jig 35, the fourth jig 34 is lowered so as to be brought into contact with the upper end surface 21*d* of the shaft portion 21 (the state illustrated in FIG. 5). At this stage, an upper end surface 35*a* of the fifth jig 35 is positioned lower than the upper end surface 21*d* of the shaft portion 21, and an upper end surface 31*b* of the first jig 31 is positioned lower than the upper end surface 35*a* of the fifth jig 35.

The fourth jig 34 is further lowered in the state in which the fourth jig 34 is held in contact with the shaft portion 21, whereby the lower end of the shaft portion 21 is press-fitted into the hole 22*c* of the flange portion 22. At the stage at which press-fitting is started as described above and the press-fitting is performed by predetermined length (in other words, stage at which press-fit posture of flange portion 22 with respect to shaft portion 21 is stabilized), the fourth jig 34 is caused to be brought into contact with the upper end surface 35*a* of the fifth jig 35 (the stage illustrated in FIG. 6). Then, the fourth jig 34 is further lowered so as to press the fifth jig 35 downward, whereby downward load is transmitted to the third jig 33 through an intermediation of the elastic body 36. Accordingly, while both the end surfaces 22*a* and 22*b* of the flange portion 22 are bound between the third jig 33 and the second jig 32, press-fitting of the shaft portion 21 is caused to progress.

Figure 7:
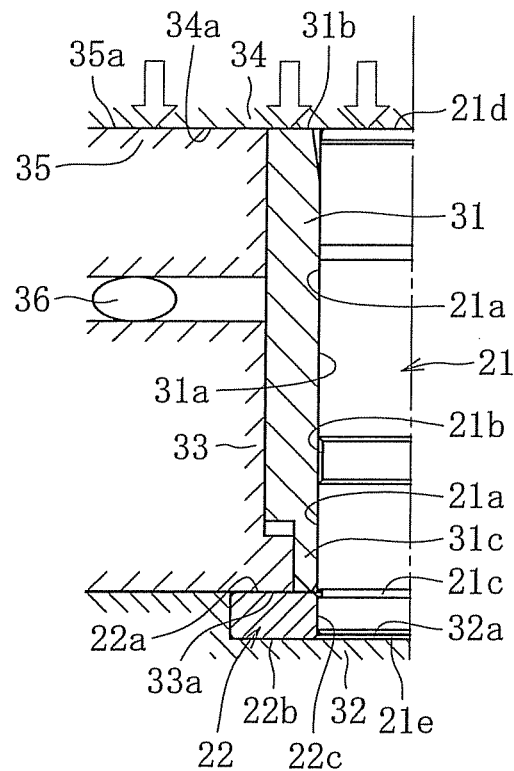
FIG. 7 is a sectional view conceptually illustrating an example of the manufacturing step of the shaft member.
Figure 8:
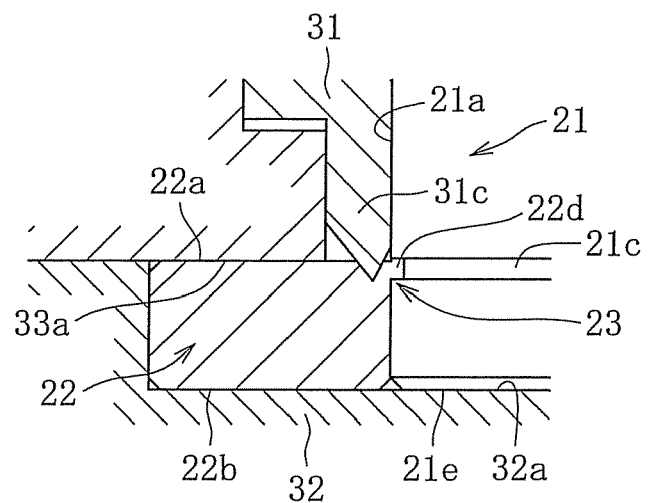
FIG. 8 is a sectional view conceptually illustrating an example of the manufacturing step of the shaft member.

As described above, the shaft portion 21 is continued to be press-fitted in the state in which the flange portion 22 is bound. At the stage at which the press-fitting has been completed to some extent, a lower end surface 34*a* of the fourth jig 34 is brought into contact with the upper end surface 31*b* of the first jig 31. FIG. 7 illustrates the case of bringing the first jig 31 and the fourth jig 34 into contact with each other at the stage at which the shaft portion 21 has been pushed-in (press-fitted) to the position at which a small gap is formed between a lower end surface 21*e* of the shaft portion 21 and the upper end surface 32*a* of the second jig 32, which is opposed to this surface. Further, in this state, as illustrated in FIG. 7, load corresponding to compression and deformation of the elastic body 36 is imparted from the third jig 33 to the flange portion 22, whereby the flange portion 22 is bound.

Then, by further lowering the fourth jig 34, the first jig 31 held in contact with the fourth jig 34 is pressurized in the axial direction, whereby the flange portion 22 is partially and plastically deformed by the plastic working portion 31*c* provided at the lower end thereof. In this case, the inner peripheral edge of the upper end surface 22*a* of the flange portion 22, which is a region except the thrust bearing surface, is plastically deformed to the radially inner side by the plastic working portion 31c having a tapered shape, whereby there is formed the inward protruding portion 22d intruding on the inner peripheral side with respect to the outer peripheral surface of the shaft portion 21 (radial bearing surface 21a) (refer to FIG. 8). Accordingly, between the flange portion 22 and the shaft portion 21 which have been subjected to plastic deformation, that is, on the axial upper end of the press-fit region in this case, there is formed the caulked portion 23. The above-mentioned caulking process is continuously performed while the flange portion 22 is bound.

Note that, in the case where the shaft portion 21 is formed of a material (of high rigidity) harder than that of the flange portion 22 such as stainless steel, as illustrated in the figure, it is preferable that the smaller diameter portion 21c be provided in advance at a portion of the shaft portion 21, at which the inward protruding portion 22d is to be formed. Further, in anticipation of plastic working and inward caulking, it is preferable that the flange portion 22 be formed of a soft metal such as brass, and that curing treatment such as quenching be not performed thereon.

As described above, by stopping lowering of the fourth jig 34 at the state at which the caulked portion 23 is formed between the shaft portion 21 and the flange portion 22, and taking out an integrated product of the shaft portion 21 and the flange portion 22 (shaft member 2) from the jigs 31 to 35, it is possible to obtain a shaft member 2 as a finished product. In this embodiment, the fourth jig 34 is stopped at the stage at which the first jig 31 has been pushed-in to the position at which the lower end surface 21e of the shaft portion 21 is brought into contact with the upper end surface 32a of the second jig 32 (flange portion 22 is plastically deformed), and then the assembly (shaft member 2) is taken out.

As described above, the shaft portion 21 is press-fitted into the flange portion 22 and the flange portion 22 is partially and plastically deformed, whereby the caulked portion 23 is formed between the flange portion 22 and the shaft portion 21. Therefore, similarly to the conventional cases, it is possible to avoid deformation of the shaft portion 21 and the entire of the flange portion 22, which is caused by caulking. Thus, while maintaining high shape accuracy obtained at the time of press-fitting (perpendicularity) or high surface accuracy obtained at the time of working individual components, fixation strength can be increased by simultaneous adoption of press-fitting and caulking.

Further, of the press-fitting step and the caulking step, at least the caulking step is performed in the state in which both the end surfaces 22a and 22b of the flange portion 22 are bound, whereby caulking can be performed while maintaining the posture of the flange portion 22 with respect to the shaft portion 21 at the time of press-fitting. In addition, caulking can be performed while maintaining the surface accuracy of both the bound end surfaces 22a and 22b. Specifically, as in this embodiment, in the case where load (binding force) to the flange portion 22 is increased in proportion to lowering amounts of the fourth jig 34 and the fifth jig 35, the flange portion 22 is bound with binding force higher than that at the time of press-fitting. Therefore, even in the case where positional deviation and the like occur between the shaft portion 21 and the flange portion 22 at the time of press-fitting by any possibility, the positional deviation can be corrected by binding of the jigs 31 to 33.

Figure 6:
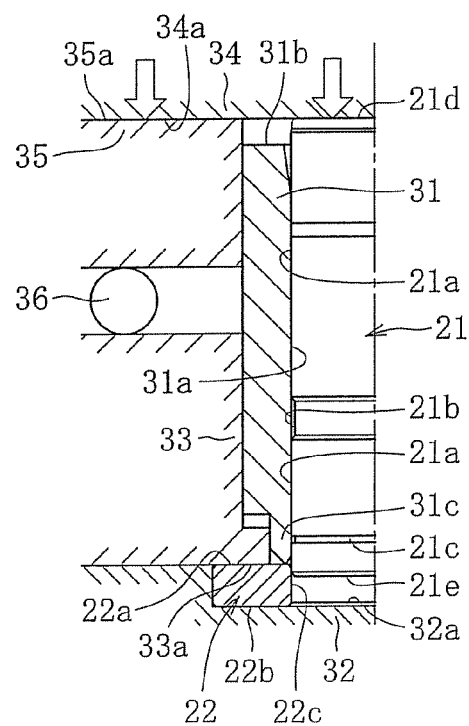
FIG. 6 is a sectional view conceptually illustrating an example of the manufacturing step of the shaft member.

In addition, as described above, by gradually increasing the bounding force acting on the flange portion 22 with use of the elastic body 36 and the like, or at the initial stage of press-fitting, for example, by allowing horizontal movement of the flange portion 22 to some extent while maintaining a press-fit posture of the flange portion 22 with respect to the shaft portion 21, it is possible to exert a guiding function of some kind. Accordingly, press-fitting can be performed in the state in which positional relationship between the flange portion 22 and the shaft portion 21 is preferable. Note that, in this case, as illustrated in FIGS. 5 and 6, with the provision of a guide surface in advance by chamfering or the like to the end portion on the introduction side of one of or both the shaft portion 21 and the flange portion 22, press-fitting can be performed in a more appropriate posture.

Further, in this embodiment, the flange portion 22 is bound by the second jig 32 and the third jig 33 even during press-fitting, and hence it is possible to press-fit the shaft portion 21 in the state in which the press-fit posture of the shaft portion 21 with respect to the flange portion 22 is appropriately maintained, or while flatness or runout accuracy (perpendicularity) of both the end surfaces 22a and 22b of the flange portion 22 is corrected. Further, when press-fitting is performed in the state in which the press-fit posture is appropriately maintained, there is no risk of causing positional deviation after the press-fitting, which is preferable.

Further, in this embodiment, of the upper end surface 22a of the flange portion 22, the inner region with respect to the thrust bearing surface is plastically deformed (inward protruding portion 22d is formed), and hence surface accuracy of the thrust bearing surface is not deteriorated. Further, it is possible to ensure the bearing area by subjecting the flange portion 22 to plastic deformation while excluding the region which substantially acts as the thrust bearing surface.

Further, in this embodiment, surfaces (inner peripheral surface of holding hole 31a, upper end surface 32a, and lower end surface 33a), which are brought into contact with the respective bearing surfaces of the jigs 31 to 33, are formed in advance with high accuracy, and positional accuracy of the jigs 31 to 33 is set to higher level. Accordingly, it is possible to perform press-fitting and caulking fixation in the state of maintaining perpendicularity between the radial bearing surface 21a and the thrust bearing surface (upper end surface 22a) to high level.

Further, in this embodiment, the sizes of axial gaps between the fourth jig 34 which receives the driving force from the drive mechanism (driving force for up-and-down movement in this case) and each of the shaft portion 21, the fifth jig 35, and the first jig 31 become larger in the stated order. With this structure, by lowering the fourth jig 34, it is possible to realize the above-mentioned loading process (after press-fitting of the shaft portion 21 is started, the bounding force in the axial direction is imparted to the flange portion 22, and then, a caulking process is performed on the flange portion 22). Thus, it suffices that a single drive system (drive mechanism) is provided, making it possible to reduce facility cost. Further, it is possible to perform all the steps including press-fitting, correction, and caulking by a series of the jigs 31 to 35 in conjunction with each other, which is preferable in terms of productivity.

Further, as in this embodiment, in the case performing press-fitting of the shaft portion 21 along with correction, press-fitting can be performed while involving a considerable amount of press-fit allowance, and fixation means combined with press-fitting and bonding can be also adopted. In the case of using press-fitting and bonding simultaneously, it is possible to make reinforcement of the fixation strength by the adhesive, and hence light press-fitting or the like can be adopted. If it suffices that the press-fit allowance is small, assembly accuracy is easily obtained by that much. Therefore, by performing press-fit fixation along with caulking, it is possible to obtain the shaft member 2 excellent in fixation strength and shape accuracy (assembly accuracy).

Note that, in the above-mentioned embodiment, the case is described where the plastic working portion 31c having a tapered leading end is pressed against the upper end surface 22a of the flat flange portion 22, whereby the pressed region is plastically deformed to the inner peripheral side. However, as a matter of course, the present invention is not limited thereto. As long as caulking can be performed by inward plastic deformation, the shape of the plastic working portion 31c is arbitraly.

Further, it is not necessary for the plastically worked surface of the flange portion 22 to be flat, and protrusions and the like, which allow the flange portion 22 to be easily deformed inward, may be provided. Further, it is unnecessary to plastically deform the flange portion 22 (form inward protruding portion 22d) over the entire periphery thereof. In consideration of required fixation strength or easiness of plastic working, the caulked portion 23 may be provided by intermittently forming multiple inward protruding portions 22d over the circumferential direction on the inner periphery of the upper end surface 22a.

Figure 9:
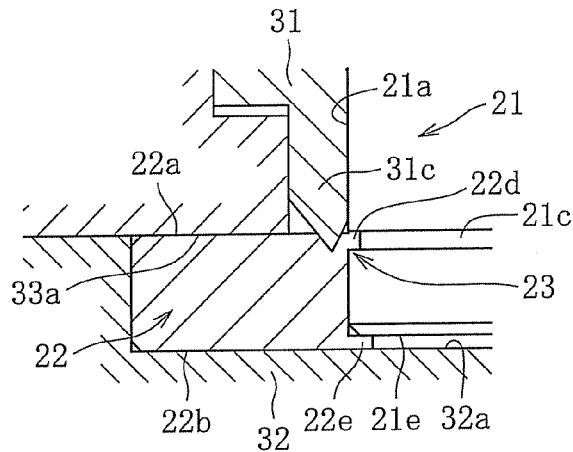
FIG. 9 is a sectional view conceptually illustrating an example of the shaft member according to another mode.

Further, in this embodiment, the case is illustrated where the caulked portion 23 is provided at the upper end in the axial direction (the side of upper end surface 22a) of the press-fit region between the shaft portion 21 and the flange portion 22. However, it is also possible to adopt a structure in which a smaller diameter portion is formed in advance on the other end side of the flange portion 22, and to perform fastening fixation by the smaller diameter portion and the caulked portion 23 (inward protruding portion 22d). For example, as illustrated in FIG. 9, it is also possible to cause a smaller diameter portion 22e to protrude from the side of the lower end surface 22b of the flange portion 22, and possible to caulk the flange portion 22 at a position at which the smaller diameter portion 22e and the lower end surface 21e of the shaft portion 21. As a matter of course, the caulked portion 23 may be formed at both the axial ends by improving the jigs and the drive mechanism.

Figure 10:
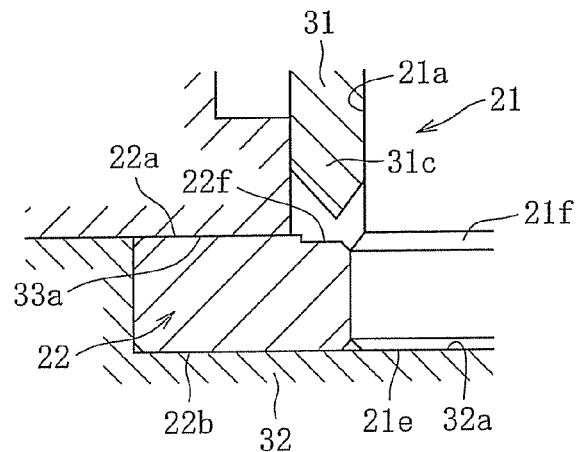
FIG. 10 is a sectional view conceptually illustrating an example of the shaft member according to another mode.
Figure 11:
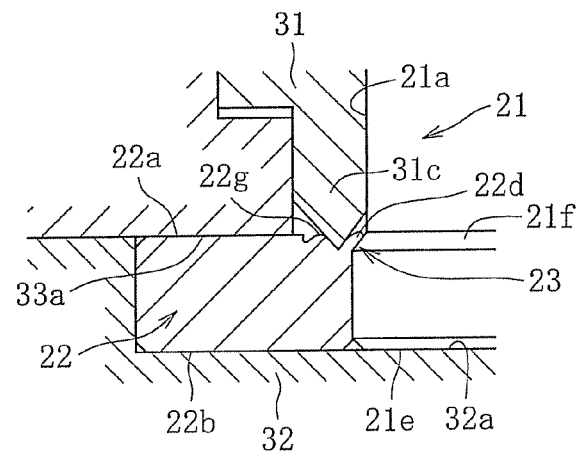
FIG. 11 is a sectional view conceptually illustrating an example of the shaft member according to another mode.

Further, in this embodiment, the case is illustrated where the groove-like smaller diameter portion 21c is provided at a position at which plastic deformation of the flange portion 22 to the radially inner side, which is caused by a caulking process, can be released toward the shaft portion 21. However, other structures may be adopted. For example, as illustrated in FIG. 10, of the outer peripheral surface of the shaft portion 21, the shaft portion 21, which is provided with a step 21f (having a tapered shape in this case) provided between the radial bearing surface 21a and the press-fit region of the outer peripheral surface, is press-fitted into the flange portion 22. Further, similarly to the above, by performing plastic working on the upper end surface 22a of the flange portion 22 by means of the plastic working portion 31c, as illustrated in FIG. 11, it is possible to release plastic deformation having occurred in the flange portion 22 toward the radially smaller side with respect to the step 21f provided to the shaft portion 21. In this case, as described above, it is preferable that the smaller diameter portion 22e be provided at the axial lower end of the flange portion 22, or the caulked portion 23 be provided at each of the axial ends thereof.

Note that, in the case of providing the step 21f as described above, it is also effective to adopt a structure in which a region 22f of the flange portion 22, which is to be subjected to plastic working, is somewhat lower (thinner) in advance than the other regions (upper end surface 22a in this case). By performing plastic working on the flange portion 22 structured as described above, as illustrated in FIG. 11, for example, it is possible to suppress a hump portion 22g generated toward the thrust bearing surface as a result of plastic deformation from protruding with respect to the upper end surface 22a (to the side opposite to lower end surface 22b). Accordingly, thrust bearing performance can be ensured by preventing interference of the hump portion 22g to the thrust bearing surface as much as possible while ensuring fixing force imparted from the caulked portion 23.

Further, plastic working of the flange portion 22, which is performed by means of the plastic working portion 31c, may be started at the time of completion of press-fitting of the shaft portion 21. When the caulking step of the flange portion 22 is started at the point in time of completion of the press-fitting, the fixing force imparted from the caulked portion 23 can be further increased. In this case, it is necessary to divide the fourth jig 34 so as to press-in downward the shaft portion 21 and the plastic working portion 31c independently of each other, and to provide drive mechanisms of multiple systems for independently driving (moving up-and-down) those.

Further, in this embodiment, binding of the flange portion 22 by means of the second jig 32 and the third jig 33 is started after press-fitting of the shaft portion 21 is started. However, the binding and the press-fitting may be simultaneously started. Alternatively, for the purpose of correcting positional deviation caused by press-fitting, it is also possible to start the binding (correction) at an arbitrary stage during the caulking step somewhat before the completion of the press-fitting or after the completion of the press-fitting.

Further, in this embodiment, the case illustrated where the caulked portion 23 is formed between the flange portion 22 and the shaft portion 21 by partially performing plastic working on the flange portion 22. However, the present invention is not limited thereto. For example, as long as surface accuracy of the radial bearing surfaces 21a and 21a (circularity or coaxiality) can be maintained at high level, it is also possible to partially perform plastic working on the shaft portion 21 and form the caulked portion 23 with the flange portion 22. Further, in this case, in order that the partial plastic deformation of the shaft portion 21 (for example, projection in a radially outer side) can be realized by as small load as possible, while not shown, for example, a protruding portion in the axial direction is provided on the lower end side of the shaft portion 21, and the caulked portion may be formed by bending the protruding portion radially outward at the time of completion of press-fitting or after the completion thereof.

Further, in this embodiment, there is described the case where the shaft portion 21 is press-fitted into the hole of the flange portion 22 and the plastic working portion 31b is lowered until the lower end surface 21e of the shaft portion 21 is brought into contact with the upper end surface 32a of the second jig 32, for the purpose of obtaining a predetermined press-fit allowance. However, the above-mentioned press-fitting or caulking mode is merely an example. For example, for the purpose of compensating deviation of dimension tolerance (average value, or its allowance range) generated in working processes of the shaft portion 21 and the flange portion 22, it is possible to set the caulking force based on the press-fitting force when the shaft portion 21 is press-fitted to the flange portion.

Description is made below while taking the structure illustrated in FIG. 5 as an example. First, press-fitting force at the stage at which press-fitting of the shaft portion 21 with respect to the flange portion 22 is started (FIG. 6) is detected, for example, by a loadcell and the like provided to the fourth jig 34, as reaction force received by the shaft portion 21 from the flange portion 22. Then, based on the detected press-fitting force, a tightening allowance (press-fit allowance) between the shaft portion 21 and the flange portion 22 is estimated. When the tightening allowance can be estimated, it is possible to predict the fastening force obtained in this case (by press-fitting). Therefore, in order that sum of fixing force by the press-fitting and fixing force by the caulking becomes constant, a maximum value of load required in caulking is set depending on the estimated tightening allowance. Then, at the time of caulking process (FIG. 7 and FIG. 8), reaction force received from the flange portion 22 by the first jig 31 having the plastic working portion 31c is detected by the loadcell provided to the fourth jig 34 while continuing plastic working. At the stage at which the detected value of the caulking load reaches the predetermined maximum value of the caulking load, the fourth jig 34 and the first jig 31 is stopped.

In this manner, by controlling the maximum value of the caulking force (caulking load), it is possible to maintain constant fixing force between the shaft portion 21 and the flange portion 22 of the shaft member 2 as a finished product even when there is a variation in press-fit allowance depending on combination of the shaft portion 21 and the flange portion 22 to be press-fitted with each other. Therefore, it is possible to improve yield rate, whereby the shaft member 2 of high quality can be stably provided.

Note that, while in the above description, there is described the case where the caulking force (or caulking amount) is set so that the sum total of the fixing force by press-fitting and the fixing force by caulking is fixed, the caulking amount may be set based on other criteria. For example, a threshold value of the press-fitting force may be set in advance, and the setting may be performed so that fixed caulking force is imparted when detected value of the press-fitting force is higher than the threshold value, whereas increased amount of the caulking force to be imparted is set according to a difference from the threshold value when the detected value of the press-fitting force is lower than the threshold value. Alternatively, the caulking force may be set so that the fixed caulking force is imparted only when the detected value of the press-fitting force is lower than the above-mentioned threshold value and the sum of the fixing force by press-fitting and the fixing force by caulking always satisfies the threshold value.

Further, each reaction force of the press-fitting force and the caulking force may be detected by a loadcell provided to the fourth jig 34. In addition, the reaction force to be detected may be separately detected, or total value thereof may be detected. As a matter of course, it is possible to provide detection portions separately if press-fitting of the shaft portion 21 and caulking process on the flange portion 22 are performed by separate drive mechanisms. Alternatively, it is also possible to detect reaction force by providing loadcell and the like to the first jig 31 for performing caulking process directly. Further, if maximum value of the caulking load can be converted into lowering amount of the plastic working portion 31c (pushing-in amount to flange portion 22), the caulking amount can be controlled by controlling position of the first jig 31 having the plastic working portion 31c.

Further, the present invention can be also applied to the fluid dynamic bearing device having structure other than the structure illustrated in FIG. 2.

For example, while in the embodiment illustrated in FIG. 2, there is described the case where the outer peripheral surface of the shaft portion 21 is used as the radial bearing surface 21a, and the upper end surface 22a and the lower end surface 22b of the flange portion 22 are used as the thrust bearing surfaces, the present invention is not limited thereto. For example, it is possible to apply the present invention to the shaft member of the fluid dynamic bearing device having a structure in which only the upper end surface 22a is used as the thrust bearing surface.

Figure 12:
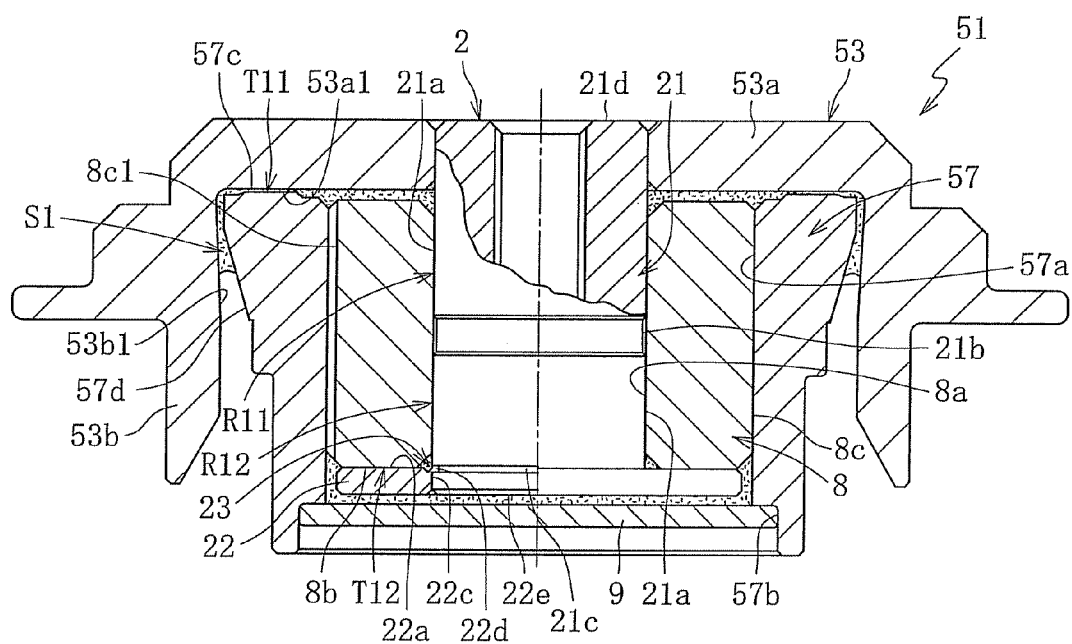
FIG. 12 is a sectional view of a fluid dynamic bearing device according to another structure.

FIG. 12 illustrates a sectional view of a fluid dynamic bearing device 51 having a structure in which only the upper end surface 22a is used as the thrust bearing surface. The characteristics (differences from fluid dynamic bearing device 1 of FIG. 2) of the fluid dynamic bearing device 51 are as follows. That is, in the fluid bearing device 51, a hub 53 fixed to an upper end (opposite side to flange portion 22) of a shaft portion 21 mainly includes a disk portion 53a positioned on an opening side (upper side) of a housing 57, and a cylindrical portion 53b extending downward in the axial direction from an outer peripheral portion of the disk portion 53a. Further, on an upper end surface 57c of the housing 57, there are provided regions where the dynamic pressure grooves are formed having the arrangement mode, for example, illustrated in FIG. 4 (opposite in spiral directions), thereby forming a thrust bearing gap of a second thrust bearing portion T12 with a lower end surface 53a1 of the opposed disk portion 53a.

On an outer periphery of the housing 57, there is formed a tapered sealing surface 57d having a diameter gradually increased upward. The tapered sealing surface 57d forms, with an inner peripheral surface 53b1 of the cylindrical portion 53b, an annular seal space S1 having a radial dimension gradually decreased toward the closed side (lower side) to an opening side (upper side) of the housing 57. Note that, in FIG. 12, an inner peripheral surface 57a and a fixing surface 57b of the housing 57 correspond to the inner peripheral surface 7a and the fixing surface 7b of the housing 7 in FIG. 2, respectively. The structures other than the above are the same as those in FIG. 2, and hence the description thereof is omitted.

Even in the case of using only the upper end surface 22a of the flange portion 22 as the thrust bearing surface as described above, it is possible to maintain, by using both press-fitting and caulking and forming the caulked portion 23 by partially performing plastic deformation on the flange portion 22, surface accuracy of the radial bearing surface 21a and the thrust bearing surface, and perpendicularity between those bearing surfaces at high level even after the caulking process. Further, the shaft member 2 having high fixing strength can be obtained.

Further, as described above, by performing the above-mentioned press-fitting and the caulking fixation to surfaces brought into contact with the bearing surfaces of the jigs 31 to 33 (inner peripheral surface of holding hole 31a, upper end surface 32a, or lower end surface 33a) being formed to be highly accurate in advance, it is possible to obtain the shaft portion 2 having high perpendicularity between the radial bearing surface 21a and the thrust bearing surface (upper end surface 22a).

Note that, while in the above description, the housing 7 and 57, and the bearing sleeve 8 are separated, it is also possible to integrate (integrally form by the same material, or insert one member and die mold the other member) two or more members selected from members constituting the fixed side of the fluid dynamic bearing device 1 and 51 in a range capable of assembling. For example, in the structure illustrated in FIG. 2, the housing 7 and the bearing sleeve 8, the housing 7 and the lid member 9, or the housing 7 and the seal member 10 can be integrated. It is also possible to integrate the housing 7, the bearing sleeve 8, and the seal member 10. Further, in the structure illustrated in FIG. 12, the housing 57 and the bearing sleeve 8, or the housing 57 and the lid member 9 can be integrated.

In the following, a second embodiment of the present invention is described with reference to FIGS. 13 to 22. Herein, the second embodiment is an example of the embodiment according to the first aspect of the present invention.

Figure 13:
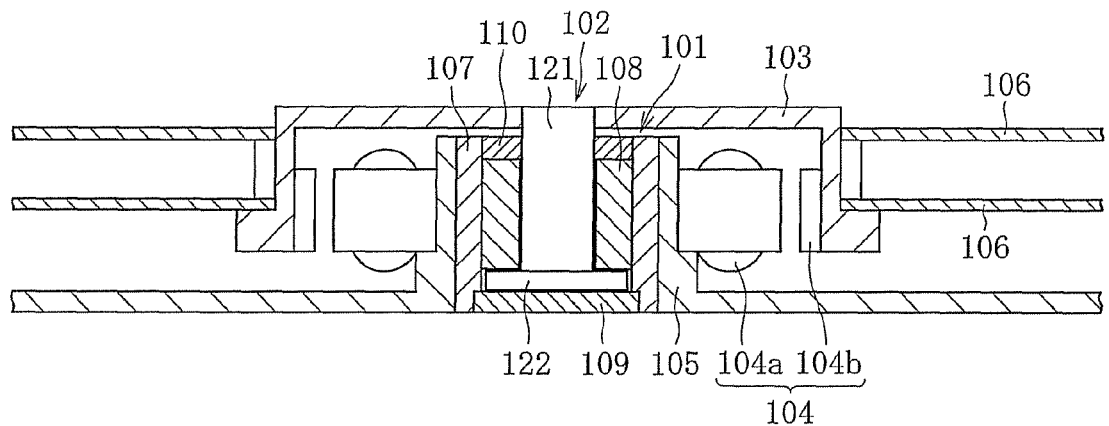
FIG. 13 is a sectional view of a spindle motor provided with a fluid dynamic bearing device according to a second embodiment of the present invention.

FIG. 13 is a sectional view of a spindle motor according to the second embodiment of the present invention, which is provided with a fluid dynamic bearing device 101. The spindle motor is used as a disk drive motor for an HDD, which is provided with a magnetic disk, and includes the fluid dynamic bearing device 101 for supporting a shaft member 102 attached with a hub 103 in a radial direction and in a non-contact manner, a drive portion 104 constituted by a stator coil 104*a* and a rotor magnet 104*b* opposed to each other through an intermediation of, for example, a radial gap, and a bracket 105. The stator coil 104*a* is fixed to the bracket 105, and the rotor magnet 104*b* is fixed to the hub 103. A housing 7 of the fluid dynamic bearing device 101 is fixed to an inner periphery of the bracket 105. Further, as illustrated in the figure, a disk 106 (two in FIG. 13) is held on the hub 103. In the spindle motor constituted as described above, when the stator coil 104*a* is energized, the rotor magnet 104*b* is rotated with excitation force generated between the stator coil 104*a* and the rotor magnet 104*b*. In accordance therewith, the disk 106 held on the hub 103 is integrally rotated with the shaft member 102.

Figure 14:
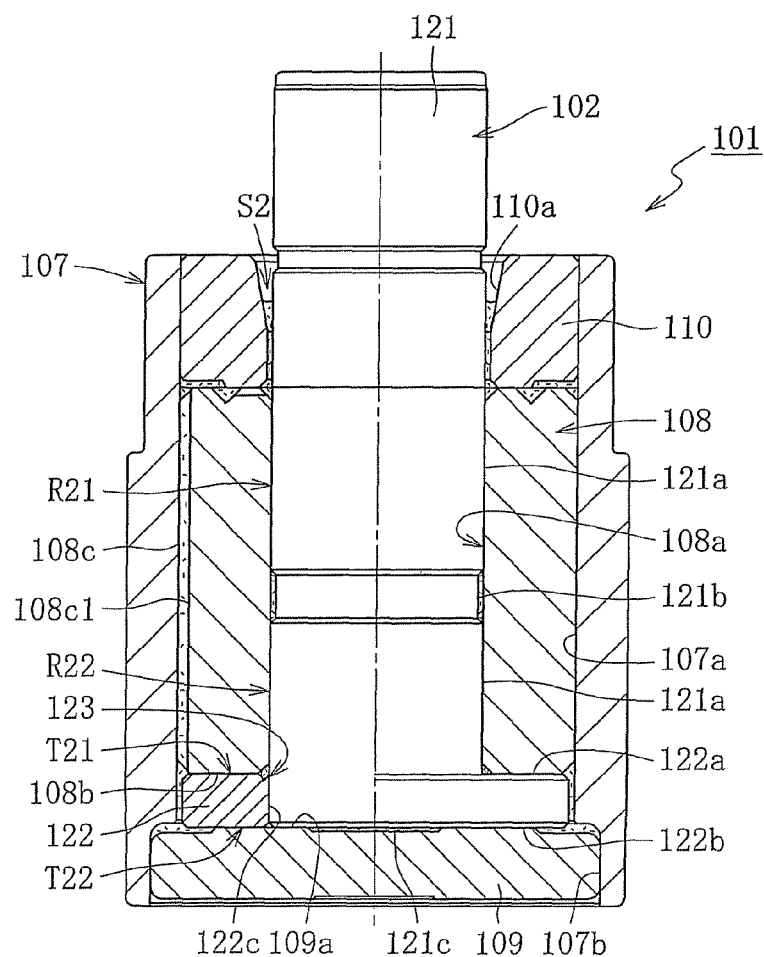
FIG. 14 is a sectional view of the fluid dynamic bearing device.

FIG. 14 illustrates the fluid dynamic bearing device 101. The fluid dynamic bearing device 101 mainly includes the housing 107, a bearing sleeve 108 fixed to the inner periphery of the housing 107, a lid member 109 for closing one end of the housing 107, a seal member 110 arranged on the opening side of the other end of the housing, and the shaft member 102 rotated relatively to the housing 107, the bearing sleeve 108, and the seal member 110.

The housing 107 is formed into a cylindrical shape with use of a metal material such as brass or a resin material, and exhibits a mode in which both axial ends thereof are opened. To an inner peripheral surface 107*a* of the housing 107, an outer peripheral surface 108*c* of the bearing sleeve 108 is fixed by appropriate means such as bonding (including loose bonding and press-fit bonding), press-fitting, or welding (including ultrasonic welding and laser welding). Further, on the lower end side of the inner peripheral surface 107*a*, there is formed a fixation surface 107*b*, which is described below and larger than the inner peripheral surface 107*a* in diameter, for fixing the lid member 109.

The bearing sleeve 108 is formed into a cylindrical shape with use of a porous body made of a sintered metal or the like. In this embodiment, the bearing sleeve 108 is formed into a cylindrical shape with use of a porous body made of a sintered metal including copper as a main component, and is fixed to the inner peripheral surface 107*a* of the housing 107 by bonding. The bearing sleeve 108 may be formed of a porous body made of a non-metallic material such as a resin or ceramic, or may be formed of, except the porous body such as a sintered metal, a material having a structure free from inner holes, or a structure having holes of a size which prevents passage of a lubricating oil.

Figure 15:
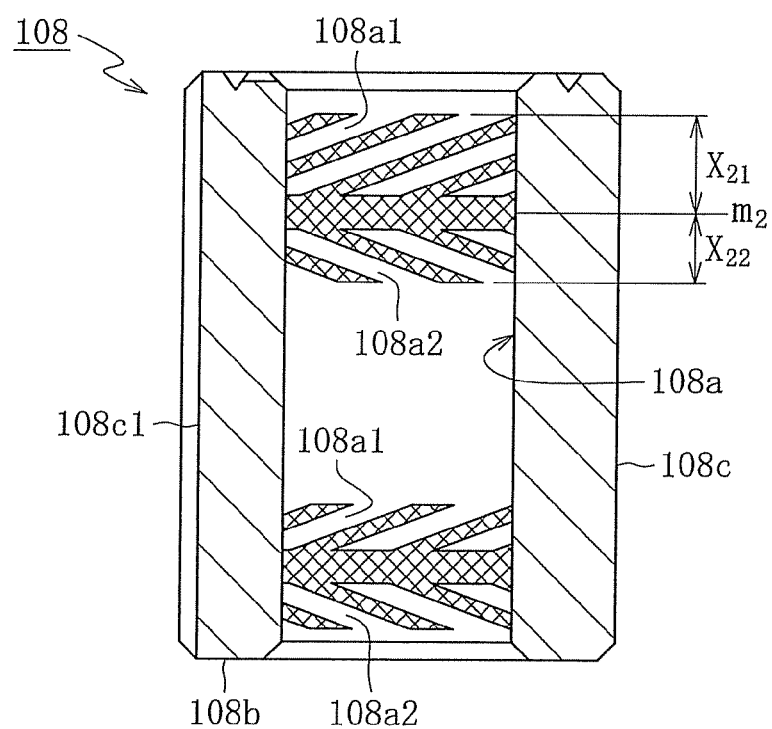
FIG. 15 is a sectional view of the bearing sleeve.

In the entire or a part of a region of an inner peripheral surface 108*a* of the bearing sleeve 108, regions where multiple dynamic pressure grooves are arranged are formed as a radial dynamic pressure generating portion. In this embodiment, as illustrated in FIG. 15, for example, two regions where multiple dynamic pressure grooves 108*a*1 and 108*a*2 having inclination angles different from each other are arranged in a herringbone pattern are formed while being axially separated from each other. In this embodiment, for the purpose of intentionally generating circulation of a lubricating oil inside the bearing, the region on one side (upper side in this case), where the dynamic pressure grooves 108*a*1 and 108*a*2 are arranged, is formed asymmetrically in the axial direction. When description thereof is made with reference to a mode illustrated in FIG. 15, an axial dimension X21 of the region on the upper side with respect to an axial center m2 (seal member 110 side), where the dynamic pressure grooves 108*a*1 are arranged, is larger than an axial dimension X22 of the region on the lower side, where the dynamic pressure grooves 108*a*2 are arranged.

Figure 16:
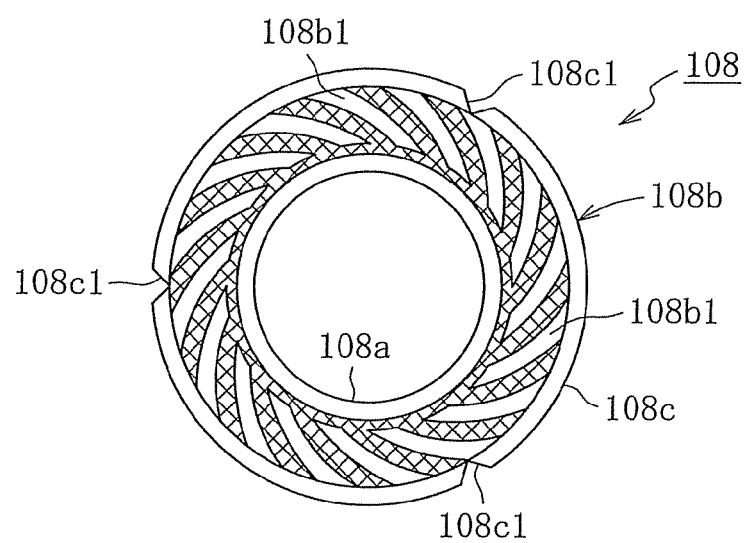
FIG. 16 is a plan view of the end surface of the bearing sleeve, which is opposed to the flange portion.

In the entire or a part of a region of a lower end surface 108*b* of the bearing sleeve 108, as illustrated in FIG. 16, for example, a region where multiple dynamic pressure grooves 108*b*1 are arranged in a spiral pattern is formed as a thrust dynamic pressure generating portion. In the state of a finished product, the region where the dynamic pressure grooves 108*b*1 are formed is opposed to an upper end surface 122*a* of a flange portion 122 described below, and at the time of the rotation of the shaft member 102, a thrust bearing gap of a first thrust bearing portion T21 described below is formed between the region and the upper end surface 122*a* (refer to FIG. 14).

In an outer peripheral surface 108*c* of the bearing sleeve 108, there are formed multiple axial grooves 108*c*1 extending in the axial direction. Mainly during use of the fluid dynamic bearing device 101, for example, in the case where excess and deficiency of the lubricating oil occur in the inner space of the bearing, those axial grooves 108*c*1 play a role of immediately solving this undesirable state so as to restore an appropriate state.

The lid member 109 for closing the lower end side of the housing 107 is formed of a metal material, a resin material, or the like, and is fixed to the fixation surface 107*b* provided at the lower end in the inner periphery of the housing 107. In this case, as a fixation means for the lid member 109, similarly to the case of the bearing sleeve 108, it is possible to adopt arbitrary means such as bonding, press-fitting, or welding.

In the entire or a part of a region of an upper end surface 109*a* of the lid member 109, there is formed a region where dynamic pressure grooves are arranged, the region exhibiting an arrangement mode similar to, for example, that of FIG. 16 (opposite in spiral direction). In the state of a finished product, the region where dynamic pressure grooves are arranged (thrust dynamic pressure generating portion) is opposed to a lower end surface 122*b* of the flange portion 122, and at the time of the rotation of the shaft member 102, a thrust bearing gap of a second thrust bearing portion T22 described below is formed between the region and the lower end surface 122*b* (refer to FIG. 14).

In this embodiment, the seal member 110 as a sealing means is formed of a metal material and a resin material separately from the housing 107, and is fixed to the inner periphery of the upper end of the housing 107 by arbitrary means such as press-fitting, bonding, or welding.

On the inner periphery of the seal member 110, there is formed a sealing surface 110*a* having a tapered surface, and a seal space S2 is formed between the sealing surface 110*a* and the outer peripheral surface of a shaft portion 121 described below. In the state in which the lubricating oil is filled inside the fluid dynamic bearing device 101, the oil surface of the lubricating oil is constantly maintained within the range of the seal space S2.

The shaft member 102 is constituted by the shaft portion 121 and the annular flange portion 122 having a hole provided at the center thereof, in which the lower end of the shaft portion 121 is fixed. As illustrated in FIG. 14, on the outer periphery of the shaft portion 121, there is formed a radial bearing surface 121a opposed in the radial direction to each of the regions where the dynamic pressure grooves 108a1 and 108a2 are arranged, the regions being provided on the inner peripheral surface 108a of the bearing sleeve 108. In this embodiment, two radial bearing surfaces 121a are provided while being axially separated from each other. Between those radial bearing surfaces 121a and 121a, there is provided a thinned portion 121b having a diameter smaller than that of the radial bearing surfaces 121a.

The lower end of the shaft portion 121 is press-fitted to the flange portion 122. Further, at the axial end portion of the press-fit region (bearing sleeve 108 side in this case) of the shaft portion 121, there is provided a caulked portion 123 with respect to the flange portion 122.

Note that, it is preferable that the shaft portion 121 be formed of a material excellent in strength, rigidity, abrasion resistance, and the like, such as stainless steel, and that the flange portion 122 be formed of a material excellent in plastic workability at the time of the caulking process in comparison with that of the shaft portion 121, such as brass.

After the components described above are assembled, the inner space of the bearing is filled with the lubricating oil, whereby the fluid dynamic bearing device 101 as a finished product is obtained. Here, as a lubricating oil filled in the fluid dynamic bearing device 101, various oils can be used. As a lubricating oil provided to the fluid dynamic bearing device for a disk drive such as an HDD, in consideration of changes in temperature during use and transportation thereof, it is possible to suitably use an ester-based lubricating oil excellent in low evaporation rate and low viscosity, for example, a lubricating oil including dioctyl sebacate (DOS) or dioctyl azelate (DOZ).

In the fluid dynamic bearing device 101 constituted as described above, when the shaft member 102 is rotated, the regions where the dynamic pressure grooves 108a1 and 108a2 of the bearing sleeve 108 are arranged are opposed to the radial bearing surfaces 121a and 121a of the shaft portion 121 through an intermediation of radial bearing gaps. Then, in accordance with the rotation of the shaft member 102, in any of the upper and lower regions where the dynamic pressure grooves 108a1 and 108a2 are arranged, the lubricating oil is pressed to an axial center m2 of the dynamic pressure grooves 108a1 and 108a2, and the pressure thereof is increased. Owing to the dynamic pressure effect of the dynamic pressure grooves 108a1 and 108a2 as described above, a first radial bearing portion R21 and a second radial bearing portion R22 for rotatably supporting the shaft member 102 in the radial direction in a non-contact manner are formed so as to be constituted at two positions while being separated from each other, respectively.

Simultaneously, in a thrust bearing gap between the region where the dynamic pressure grooves 108b1 are arranged, the region being provided to the lower end surface 108b of the bearing sleeve 108, and the upper end surface 122a of the flange portion 122 opposed thereto, and in a thrust bearing gap between the region where the dynamic pressure grooves are arranged, the region being provided to the upper end surface 109a of the lid member 109, and the lower end surface 122b of the flange portion 122, oil films of the lubricating oil are respectively formed owing to the dynamic pressure effect of the dynamic pressure grooves. Then, owing to the pressures of the oil films, a first thrust bearing portion T21 and a second thrust bearing portion T22 for supporting the shaft member 102 in the thrust direction in a non-contact manner are constituted, respectively.

Hereinafter, an example of the manufacturing step of the shaft member 102 is described with reference to FIGS. 17, 18A, and 18B.

Figure 17:
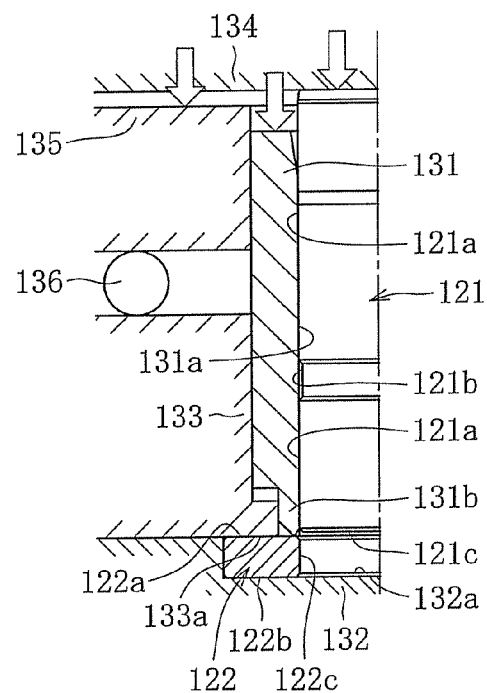
FIG. 17 is a sectional view conceptually illustrating an example of the manufacturing step of the shaft member.

FIG. 17 is a schematic view of a device used in an assembly of the shaft member 102. This device mainly includes a first jig 131 holding the shaft portion 121, a second jig 132 holding the flange portion 122 positioned below the first jig 131, and a third jig 133 capable of holding or binding the flange portion 122 with the second jig 132.

Further, in this embodiment, above the shaft portion 121, there is provided a fourth jig 134 pushing-in the shaft portion 121 toward the side of the flange portion 122 by an appropriate drive mechanism, and a fifth jig 135 is provided between the third jig 133 and the fourth jig 134. In this case, the fifth jig 135 is provided, with an elastic body 136 being intermediately provided between itself and the third jig 133 positioned below. When receiving downward load from the fourth jig 134, the fifth jig transmits the load to the third jig 133 via the elastic body 136. In this case, downward displacement of the fifth jig 135 is absorbed by compression and deformation of the elastic body 136 depending on the load.

The first jig 131 has a hole 131a in which the shaft portion 121 is inserted and held. Further, an upper end surface 132a of the second jig 132 holds and binds the flange portion 122 together with a lower end surface 133a of the third jig 133 positioned thereabove. Therefore, a dimension and a shape of the hole 131a need to be formed highly accurately so as to hold and bind the radial bearing surfaces 121a and 121a of the shaft portion 121 without involving backlash. Similarly, shapes (flatness and the like) of the upper end surface 132a and the lower end surface 133a need to be formed highly accurately so as to hold and bind without gap the both end surfaces 122a and 122b of the flange portion 122 including the thrust bearing surface.

In addition, in the shaft member 102 of this type, bearing performance depends on perpendicularity between the radial bearing surface 121a and the thrust bearing surface (upper end surface 122a). Therefore, in order that high perpendicularity can be obtained between those bearing surfaces, it is preferable to increase the perpendicularity between the hole 131a and the upper end surface 132a, and between the hole 131a and the lower end surface 133a by performing highly accurate working thereon. As a matter of course, both the jigs 132 and 133 are subjected to highly accurate working so that high parallelism can be obtained between the upper end surface 132a and the lower end surface 133a, which axially bind the flange portion 122.

Below the first jig 131, there is provided a plastic working portion 131b for performing a caulking process on an inner periphery of the flange portion 122 along with lowering of the first jig 131 and for forming the caulked portion 123 with the shaft portion 121. In this embodiment, as illustrated in FIG. 18A, the plastic working portion 131b has a shape in which radial width dimension thereof becomes smaller toward the lower end side (as becoming closer to flange portion 122 side), and includes a first tapered surface 131b1 positioned on the outer peripheral side thereof, and a second tapered surface 131b2 positioned on the inner peripheral side thereof.

Here, regarding a shape of the flange portion 122 facing the plastic working portion 131b, on an inner periphery of the upper end surface 122a of the flange portion 122, there is formed a relief portion 122d obtained by excluding a part of the flange portion 122 when assuming that there is provided an entirely flat upper end surface 122a. In the flange portion 122 illustrated in FIG. 18A, the relief portion 122d is constituted by a lower flat surface 122d1 which is retracted through an intermediation of a step by a predetermined amount from the same flat surface position as the upper end surface 122a toward the side of the lower end surface 122b. Therefore, in the state in which the shaft portion 121 and the flange portion 122 are installed to the jigs 131 to 135, the plastic working portion 131b is positioned above the relief portion 122d of the flange portion 122, or brought into contact with the lower flat surface 122d1 constituting the relief portion 122d.

Further, on an inner peripheral surface 122c of the flange portion 122 constituting a hole into which the shaft portion 121 is to be press-fitted, there is formed a notched groove 122e as a larger diameter portion. The notched groove 122e is provided to the vicinity of the relief portion 122d to be subjected to a caulking process, and notched volume thereof is reduced by being subjected to the caulking process. Further, an inner diameter of the inner peripheral surface 122c excluding the notched groove 122e is formed, in expectation of a predetermined press-fit allowance, so as to be smaller than the outer diameter of the lower end portion of the shaft portion 121 to be press-fitted at the stage before press-fitting.

Hereinafter, there is described an example of an assembly step of the shaft member 102 when using a device having the above-mentioned structure. In this embodiment, there is described the case where downward load is applied to the shaft portion 121, the fifth jig 135, and the first jig 131 in this order, and substantial press-fitting and caulking process are performed under the binding of the flange portion 122.

First, from the state illustrated in FIG. 17, the fourth jig 134 is lowered, and the lower end of the shaft portion 121 is press-fitted into the hole of the flange portion 122. Then, at the stage at which press-fit posture of the shaft portion 121 with respect to the flange portion 122 is stabilized, the fifth jig 135 is started to be pushed-in downward by the fourth jig 134, whereby downward load is transmitted to the third jig 133 through an intermediation of the elastic body 136. Therefore, the press-fitting of the shaft portion 121 progresses while both the end surfaces 122a and 122b of the flange portion 122 are bound between the third jig 133 and the second jig 132.

At the stage at which press-fitting of the shaft portion 121 is continued in the state of binding the flange portion 422 as described above, and the press-fitting thereof is completed to some extent, the fourth jig 134 is brought into contact with the first jig 131, and the first jig 131 is pushed-in toward the relief portion 122d provided to the flange portion 122. In this manner, by performing plastic working (caulking process) on the relief portion 122d by the plastic working portion 131b provided at the lower end of the first jig 131, as illustrated in FIG. 18B, the caulked portion 123 is formed with the shaft portion 121. The above-mentioned caulking process is continuously performed under binding of the flange portion 122.

In this case, to a portion of the relief portion 122d subjected to the caulking process by the plastic working portion 131b, a concave portion 122f conforming with the shape of the plastic working portion 131b is formed. Further, on the outer peripheral side of the concave portion 122f, a hump portion (first hump portion) 122g1 is formed by the caulking process. Here, the caulking process is performed at the position separated from the radially outer end of the relief portion 122d to the inner peripheral side thereof, and hence the first hump portion 122g1 occurs on the outer diameter portion of the relief portion 122d, to be precise, on the outer diameter portion of the lower flat surface 122d1 constituting the relief portion 122d. Further, of the relief portion 122d, a portion on the inner peripheral side of the concave portion 122f formed by being subjected to the caulking process, a second hump portion 122g2 is formed.

In this way, at the stage at which the shaft portion 121 is press-fitted to the flange portion 122, and the caulked portion 123 is formed between the shaft portion 121 and the flange portion 122, lowering of the fourth jig 134 is stopped, and the integrated assembly formed of the shaft portion 121 and the flange portion 122 is taken out from the jigs 131 to 135, thereby obtaining the shaft member 102 as the finished product. In this embodiment, the fourth jig 134 is stopped at the stage at which the first jig 131 is pushed in until a lower end surface 121c of the shaft portion 121 is brought into contact with the upper end surface 132a of the second jig 132 (at the stage at which flange portion 122 is plastically deformed), and the assembled product (shaft member 102) is taken out.

In this way, the shaft portion 121 is press-fitted to the flange portion 122, and the flange portion 122 is partially plastically deformed to form the caulked portion 123 between the shaft portion 121 and the flange portion, whereby it is possible to impart between the shaft portion 121 and the flange portion 122 fastening force by press-fitting and fastening force by caulking, and possible to improve fixation strength. Further, deformation (plastic deformation) of the flange portion 122 partially occurs, and hence it is possible to improve the fixation strength in the state of maintaining high shape accuracy (perpendicularity) obtained at the time of press-fitting, or high surface accuracy obtained at the time of working of individual components.

In addition, the relief portion 122d is provided in advance on the inner periphery of the upper end surface 122a of the flange portion 122, and the caulking process is performed on the relief portion 122d. Thus, plastic flow generated by the caulking process is absorbed by the relief portion 122d formed in the periphery of the concave portion 122f. Therefore, an amount of plastic deformation (plastic flow) generated toward the outer peripheral side of the concave portion 122f can be reduced, and the height of the first hump portion 122g1 can be reduced. In particular, as in this embodiment, in the case where the first hump portion 122g1 is formed on the lower flat surface 122d1, the amount by which the first hump portion 122g1 protrudes to the bearing sleeve 108 side with respect to the thrust bearing surface can be reduced by the step between the lower flat surface 122d1 and the upper end surface 122a. With this, interference of the first hump portion 122g1 with the thrust bearing surface is alleviated or solved, and hence excellent bearing performance can be exerted. Specifically, the height of the first hump portion 122g1 protruding from the thrust bearing surface is set equal to 3 µm or less, more preferably, set equal to 2 µm or less, whereby it is possible to avoid substantial interference with bearing performance, and possible to ensure preferable bearing performance.

Further, as in this embodiment, when the inner peripheral portion of the upper end surface 122a is brought close to the lower end surface 122b side with respect to the flush surface with the thrust bearing surface to thereby form the relief portion 122d, the protruding amount of the first hump portion 122g1 is easily controlled owing to the retreating amount of the lower flat surface 122d1 constituting the relief portion 122d.

Further, in this embodiment, the notched groove 122e as the larger diameter portion is provided on the inner peripheral surface 122c of the flange portion 122. Thus, deformation such as warp generated in the entire flange portion 122 by press-fitting is avoided from being promoted by the caulking process performed on any end surface (upper end surface 122a, in this case), whereby it is possible to maintain the shape of the flange portion 122 with high accuracy.

Figure 19A:
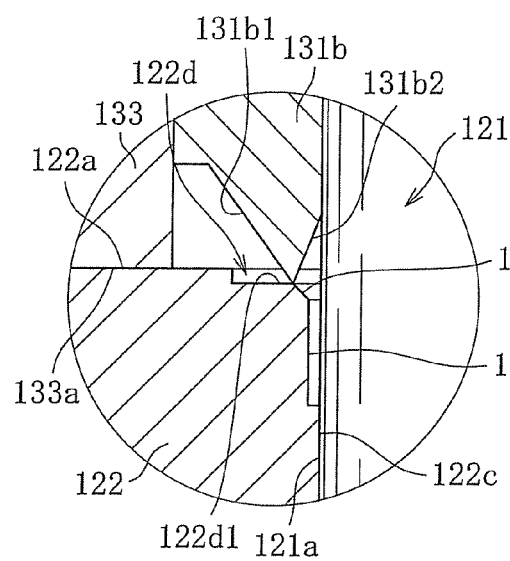
FIG. 19A is an enlarged sectional view illustrating another example of the relief portion before being subjected to the caulking process by the plastic working portion.
Figure 19B:
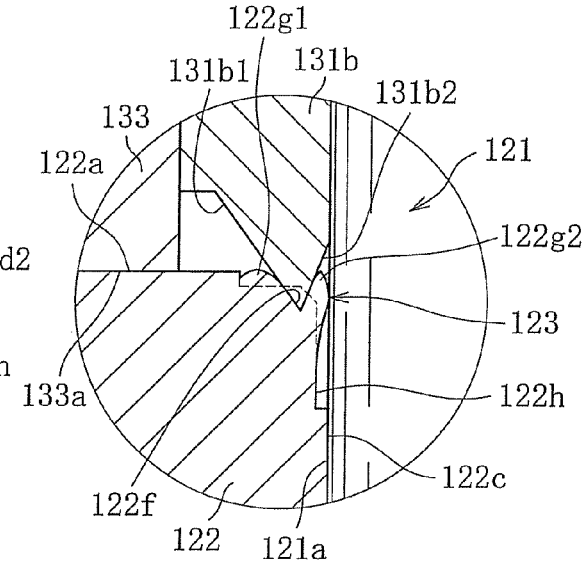
FIG. 19B is an enlarged sectional view illustrating another example of the relief portion after being subjected to the caulking process by the plastic working portion.

Note that, in this embodiment, there is described the case where the notched groove 122e is formed as the smaller diameter portion on the inner peripheral surface 122c. However, as a matter of course, other modes can be adopted. That is, as long as the plastic deformation generated by the caulking process on the relief portion 122*d* can be absorbed by the space formed by press-fitting between the shaft portion 121 and the smaller diameter portion, an arbitrary shape can be adopted. For example, as illustrated in FIG. 19A, as the smaller diameter portion, a larger diameter surface 122*h* having a diameter larger than that of the inner peripheral surface 122*c* can be formed at the upper end of the inner peripheral surface 122*c*. In this case, as illustrated in FIG. 19B, the second hump portion 122*g*2 is generated by the caulking process on the inner peripheral side of the relief portion 122*d*, and plastic deformation is generated toward the shaft portion 121, whereby the caulked portion 123 is formed between the shaft portion 121 and the flange portion 122.

Further, in this embodiment, surfaces (inner peripheral surface of hole 131*a*, upper end surface 132*a*, and lower end surface 133*a*), which are brought into contact with the respective bearing surfaces of the jigs 131 to 133, are formed in advance with high accuracy, and positional accuracy of the jigs 131 to 133 is set to higher level. Accordingly, it is possible to perform press-fitting and caulking fixation in the state of maintaining perpendicularity between the radial bearing surface 121*a* and the thrust bearing surface provided on the upper end surface 122*a* to high level.

Further, in this embodiment, of the press-fitting step and the caulking step, at least caulking process is performed in the state in which both the end surfaces 122*a* and 122*b* of the flange portion 122 are bound, and hence it is possible to perform caulking while maintaining the posture of the flange portion 122 with respect to the shaft portion 121 at the time of press-fitting. Further, it is possible to perform caulking while maintaining surface accuracy of both the bound end surfaces 122*a* and 122*b* to be bound. In particular, as in this embodiment, in the case of adopting the structure in which the load (binding force) to the flange portion 122 is increased in accordance with the lowering amounts of the fourth jig 134 and the fifth jig 135, the flange portion 122 is bound with higher binding force than that imparted at the time of press-fitting. Therefore, even if, at the time of press-fitting, positional deviation or the like is generated between the shaft portion 121 and the flange portion 122, it is possible to correct such positional deviation by binding of the jigs 131 to 133.

Further, in this embodiment, even at the time of press-fitting, the flange portion 122 is bound by the second and third jigs 132 and 133, and hence it is possible to press-fit the shaft portion 121 in the state of appropriately maintaining the press-fit posture of the shaft portion 121 with respect to the flange portion 122, or while correcting flatness and runout accuracy (perpendicularity) of both the end surfaces 122*a* and 122*b* of the flange portion 122. Further, if press-fitting is performed while appropriately maintaining the press-fit posture, there is no fear that positional deviation after press-fitting is generated, which is preferable.

Further, as in this embodiment, in the case of performing press-fitting of the shaft portion 121 along with correction, press-fitting can be performed while involving a considerable amount of press-fit allowance, and fixation means combined with press-fitting and bonding can be also adopted. In the case of using press-fitting and bonding simultaneously, it is possible to make reinforcement of the fixation strength by the adhesive, and hence light press-fitting or the like can be adopted. If it suffices that the press-fit allowance is small, assembly accuracy is easily obtained by that much. Therefore, by performing press-fit fixation along with caulking, it is possible to obtain the shaft member 102 excellent in fixation strength and shape accuracy (assembly accuracy).

Figure 18A:
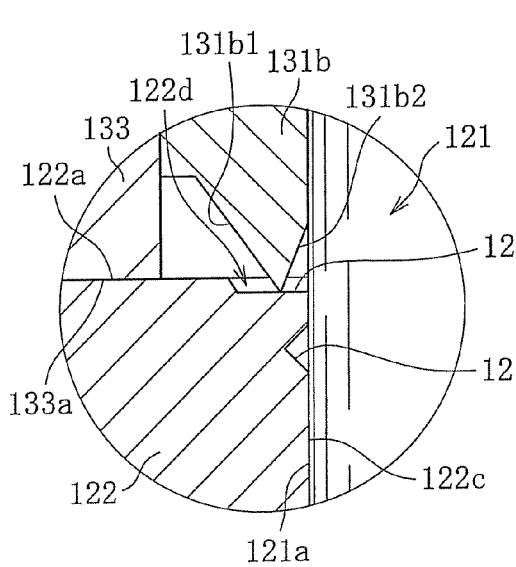
FIG. 18A is an enlarged sectional view illustrating an example of a relief portion before being subjected to the caulking process by the plastic working portion.
Figure 18B:
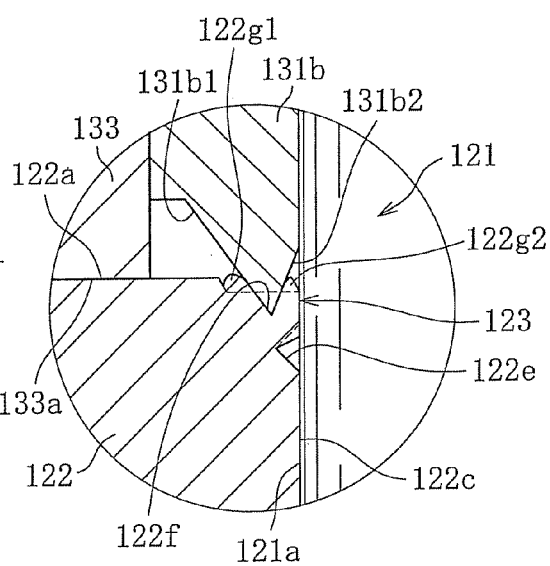
FIG. 18B is an enlarged sectional view illustrating an example of the relief portion after being subjected to the caulking process by the plastic working portion.
Figure 20A:
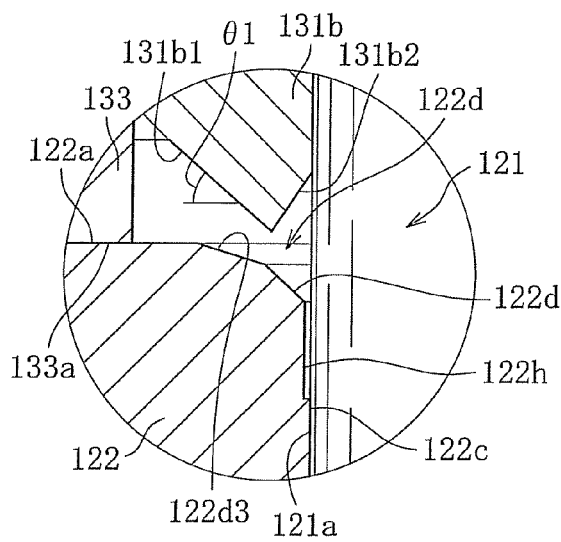
FIG. 20A is an enlarged sectional view illustrating another example of the relief portion before being subjected to the caulking process by the plastic working portion.
Figure 20B:
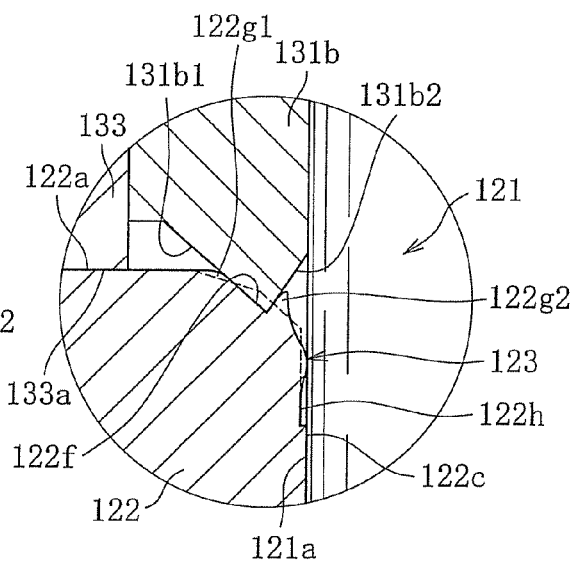
FIG. 20B is an enlarged sectional view illustrating another example of the relief portion after being subjected to the caulking process by the plastic working portion.

Note that, regarding the relief portion 122*d*, the case where the lower flat surface 122*d*1 is formed through the step with the upper end surface 122*a* is exemplified in FIG. 18A. However, as a matter of course, other shapes can be adopted. FIG. 20A illustrates the example thereof, and the relief portion 122*d* illustrated in the figure is continuous with a first tapered surface 122*d*2 on the radially outer side of the first tapered surface 122*d*2, and is constituted by a second tapered surface 122*d*3 having a smaller inclination angle with respect to the thrust bearing surface than that of the first tapered surface 122*d*2. Here, the first tapered surface 122*d*2 is continuous with the larger diameter surface 122*h* constituting the smaller diameter portion on the radially inner side thereof, and the second tapered surface 122*d*3 is continuous with the upper end surface 122*a* on the radially outer side thereof.

Further, in the illustrated example, as the plastic working portion 131*b*, one having a small inclination angle θ1 (equal to 45° or less, for example) with respect to the horizontal surface of the tapered surface on the outer peripheral side (first tapered surface 131*b*1) is used to perform the caulking process. The caulking process is performed on the relief portion 122*d* using the plastic working portion 131*b* of this structure, whereby plastic deformation to the outer peripheral side of the portion subjected to the caulking process occurs along the first tapered surface 131*b*1 of the plastic working portion 131*b*. Accordingly, the first hump portion 122*g*1 formed by such plastic deformation exhibits a gentle shape. Further, such plastic deformation occurs as the first hump portion 122*g*1 on the second tapered surface 122*d*3 having a relatively small (gentle) inclination angle, and hence the inclination of the surface of the first hump portion 122*g*1 can approach the horizontal level. Owing to the above-mentioned operation, the surface of the first hump portion 122*g*1 can be used as a part of the thrust bearing surface formed on the upper end surface 122*a* of the flange portion 122. In this case, as a matter of course, it is important to appropriately set the inclination angle θ1 of the first tapered surface 131*b*1 of the plastic working portion 131*b*, the inclination angle of the second tapered surface 122*d*3 of the relief portion 122*d* with respect to the horizontal surface, or the caulking amount (pushing-in amount of plastic working portion 131*b*).

Figure 21A:
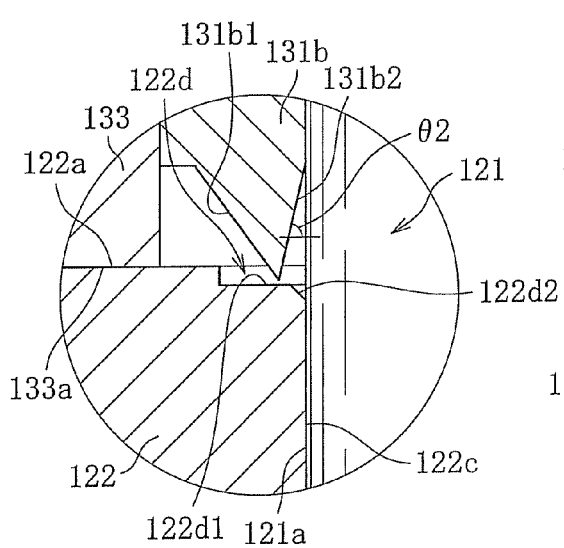
FIG. 21A is an enlarged sectional view illustrating another example of a relief portion before being subjected to the caulking process by the plastic working portion.
Figure 21B:
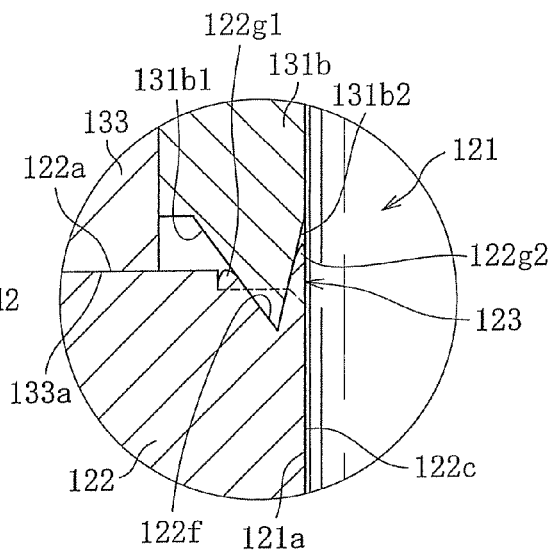
FIG. 21B is an enlarged sectional view illustrating another example of a relief portion after being subjected to the caulking process by the plastic working portion.

Further, regarding the plastic working portion 131*b*, as illustrated, for example, in FIG. 21A, one having a large inclination angle θ2 with respect to the horizontal surface of the tapered surface on the inner peripheral side (second tapered surface 131*b*2) can be used to perform the caulking process. In this case, plastic deformation to the inner peripheral side of the portion subjected to the caulking process occurs along the second tapered surface 131*b*2 of the plastic working portion 131*b*. Accordingly, the second hump portion 122*g*2 formed by such plastic deformation exhibits a steep shape protruding upward. Therefore, the second hump portion 122*g*2 is formed so as to be brought into intimate contact with the shaft portion 121, whereby it is possible to form the caulked portion 123 between the second hump portion 122*g*2 and the shaft portion 121. In this case, as the second hump portion 122*g*2 protrudes more greatly (has larger height), the fastening area with the shaft portion 121 is increased. As a result, the fixing force by this caulking can be increased.

As a matter of course, the plastic working portion 131*b* is not limited to the above-mentioned example, and an arbitrary mode can be adopted.

Further, in this embodiment, the case where the caulked portion 123 is provided at the axial upper end (on the side of upper end surface 122*a*) of the press-fit region between the shaft portion 121 and the flange portion 122 is exemplified. However, the caulking process may be performed on the inner periphery of the lower end surface 122b of the flange portion 122 by an appropriate jig. In this case, the caulked portions 123 are formed at the axial both ends of the flange portion 122, and hence it is possible to determine whether or not caulking is performed on the other end side in accordance with the required retention force (fixing force) and the application therefor. Alternatively, in accordance with variation of press-fitting force, instead of adjusting the caulking force on one end side, it is possible to determine whether or not caulking is performed on the other end side.

Further, in this embodiment, there is described the case where the first jig 131 and the fourth jig 134 are brought into contact with each other at the stage of pushing in (press-fitting) the shaft portion 121 until a slight gap is generated between the lower end surface 121c of the shaft portion 121 and the upper end surface 132a of the second jig 132 opposed thereto. However, plastic working of the flange portion 122 by the plastic working portion 131b may be started after completion of press-fitting of the shaft portion 121. If the caulking step of the flange portion 122 is started at the point in time when press-fitting is completely terminated, it is possible to further increase the fixing force by the caulked portion 123. In this case, the fourth jig 134 is divided for independently pushing in the shaft portion 121 and the plastic working portion 131b downward, and a drive mechanism of multiple systems is necessary for independently driving (moving up and down) them.

Further, in this embodiment, binding of the flange portion 122 by the second jig 132 and the third jig 133 is started after starting the press-fitting of the shaft portion 121. However, the binding may be started simultaneously with the start of press-fitting. Alternatively, for the purpose of correcting positional deviation due to press-fitting, it is possible to start binding (correction) in an arbitrary stage during the caulking step just before completion of press-fitting, or after completion of press-fitting.

Further, in this embodiment, there is described the case where the shaft portion 121 is press-fitted into the hole of the flange portion 122 and the plastic working portion 131b is lowered until the lower end surface 121c of the shaft portion 121 is brought into contact with the upper end surface 132a of the second jig 132, for the purpose of obtaining a predetermined press-fit allowance. However, the above-mentioned press-fitting or caulking mode is merely an example. For example, for the purpose of compensating deviation of dimension tolerance (average value, or its allowance range) generated in working processes of the shaft portion 121 and the flange portion 122, it is possible to set the caulking force based on the press-fitting force when the shaft portion 121 is press-fitted to the flange portion 122.

Further, the present invention can be also applied to the fluid dynamic bearing device having structure other than the structure illustrated in FIG. 14.

For example, while in the embodiment illustrated in FIG. 14, there is described the case where the outer peripheral surface of the shaft portion 121 is used as the radial bearing surface 121a, and the upper end surface 122a and the lower end surface 122b of the flange portion 122 are used as the thrust bearing surfaces, the present invention is not limited thereto. For example, it is possible to apply the present invention to the shaft member of the fluid dynamic bearing device having a structure in which only the upper end surface 122a of both the end surfaces 122a and 122b is used as the thrust bearing surface.

Figure 22:
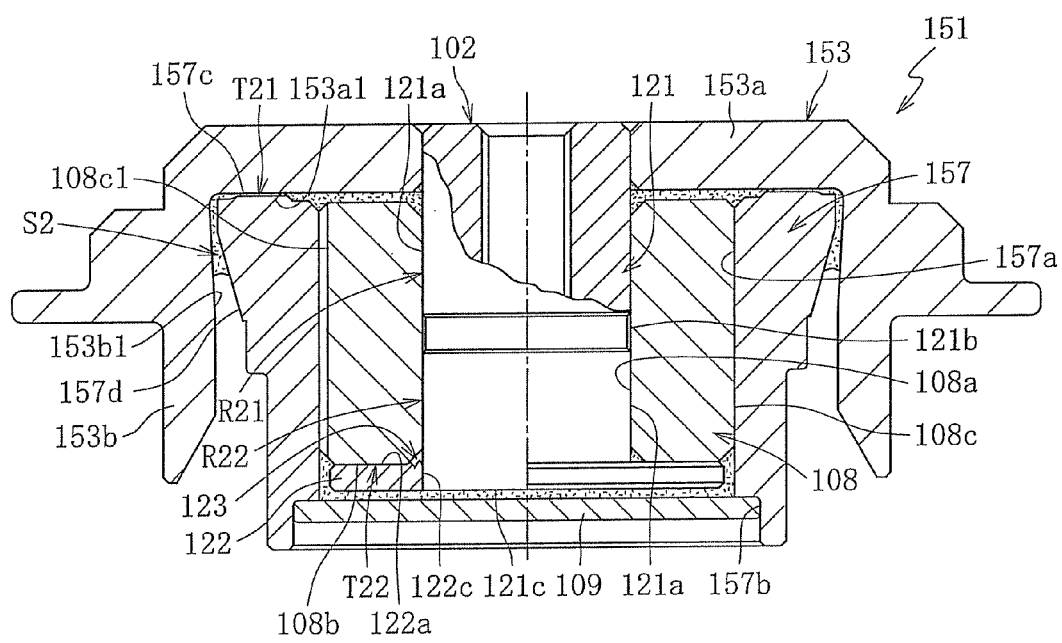
FIG. 22 is a sectional view of a fluid dynamic bearing device according to another structure.
Figure 23A:
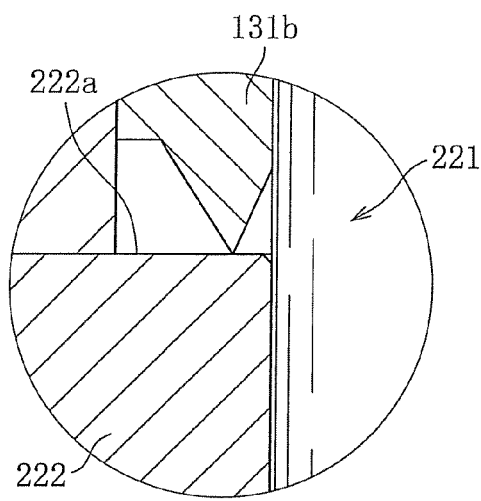
FIG. 23A is an enlarged sectional view illustrating an aspect of the caulking process, that is, a flange portion before being subjected to the caulking process by the plastic working portion.
Figure 23B:
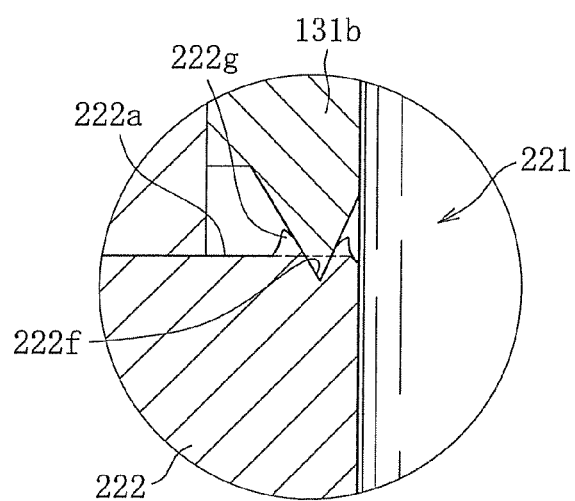
FIG. 23B is an enlarged sectional view illustrating an aspect of the caulking process, that is, the flange portion after being subjected to the caulking process by the plastic working portion.

FIG. 22 illustrates a sectional view of a fluid dynamic bearing device 151 having a structure in which only the upper end surface 122a is used as the thrust bearing surface. The characteristics (differences from fluid dynamic bearing device 101 of FIG. 14) of the fluid dynamic bearing device 151 are as follows. That is, in the fluid dynamic bearing device 151, a hub 153 fixed to an upper end (opposite side to flange portion 122) of a shaft portion 121 mainly includes a disk portion 153a positioned on an opening side (upper side) of a housing 157, and a cylindrical portion 153b extending downward in the axial direction from an outer peripheral portion of the disk portion 153a. Further, on an upper end surface 157c of the housing 157, there are provided regions where the dynamic pressure grooves are formed having the arrangement mode, for example, illustrated in FIG. 16 (opposite in spiral directions), thereby forming a thrust bearing gap of a second thrust bearing portion T22 with a lower end surface 153a1 of the opposed disk portion 153a.

On an outer periphery of the housing 157, there is formed a tapered sealing surface 157d having a diameter gradually increased upward. The tapered sealing surface 157d forms, with an inner peripheral surface 153b1 of the cylindrical portion 153b, an annular seal space S2 having a radial diameter gradually decreased toward the opening side (upper side) from the closed side (lower side) of the housing 157. Note that, in FIG. 22, an inner peripheral surface 157a and a fixing surface 157b of the housing 157 correspond to the inner peripheral surface 107a and the fixing surface 107b of the housing 107, respectively. The structures other than the above are the same as those in FIG. 14, and hence the description thereof is omitted.

In this way, even when only the upper end surface 122a of the flange portion 122 is used as the thrust bearing surface, press-fitting and caulking are used simultaneously, and the caulking process is performed on the relief portion provided on the inner periphery of the upper end surface 122a of the flange portion 122. As a result, adverse effect caused by the hump portion on the bearing surface accuracy is suppressed, whereby it is possible to maintain the surface accuracy of the radial bearing surface 121a, the thrust bearing surface, and the like, and perpendicularity between those bearing surfaces. As a matter of course, the shaft member 102 having high fixation strength can be obtained by press-fitting and caulking.

Note that, while in the above description, the housing 107 and 157, and the bearing sleeve 108 are separated, it is also possible to integrate (integrally form by the same material, or insert one member and die mold the other member) two or more members selected from members constituting the fixed side of the fluid dynamic bearing device 101 and 151 in a range capable of assembling. For example, in the structure illustrated in FIG. 14, the housing 107 and the bearing sleeve 108, the housing 107 and the lid member 109, or the housing 107 and the seal member 110 can be integrated. It is also possible to integrate the housing 107, the bearing sleeve 108, and the seal member 110. Further, in the structure illustrated in FIG. 22, the housing 157 and the bearing sleeve 108, or the housing 157 and the lid member 109 can be integrated. As a matter of course, the present invention is applicable to the shaft member integrally having the flange portion provided with the sealing surface at the outer periphery thereof.

In the following, a third embodiment of the present invention is described with reference to FIGS. 24 to 31. Herein, the third embodiment is an example of the embodiment according to the third aspect of the present invention.

Figure 24:
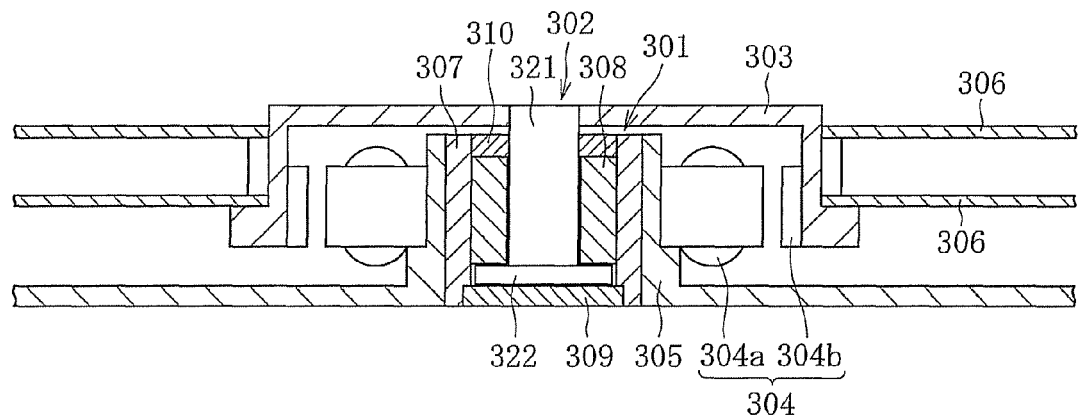
FIG. 24 is a sectional view of a spindle motor provided with a fluid dynamic bearing device according to a third embodiment of the present invention.

FIG. 24 is a sectional view of a spindle motor according to the third embodiment of the present invention, which is provided with a fluid dynamic bearing device 301. The spindle motor is used as a disk drive motor for an HDD, which is provided with a magnetic disk, and includes the fluid dynamic bearing device 301 for supporting a shaft member 302 attached with a hub 303 in a radial direction and in a non-contact manner, a drive portion 304 constituted by a stator coil 304a and a rotor magnet 304b opposed to each other through an intermediation of, for example, a radial gap, and a bracket 305. The stator coil 304a is fixed to the bracket 305, and the rotor magnet 304b is fixed to the hub 303. A housing 7 of the fluid dynamic bearing device 301 is fixed to an inner periphery of the bracket 305. Further, as illustrated in the figure, a disk 306 (two in FIG. 24) is held on the hub 303. In the spindle motor constituted as described above, when the stator coil 304a is energized, the rotor magnet 304b is rotated with excitation force generated between the stator coil 304a and the rotor magnet 304b. In accordance therewith, the disk 306 held on the hub 303 is integrally rotated with the shaft member 302.

Figure 25:
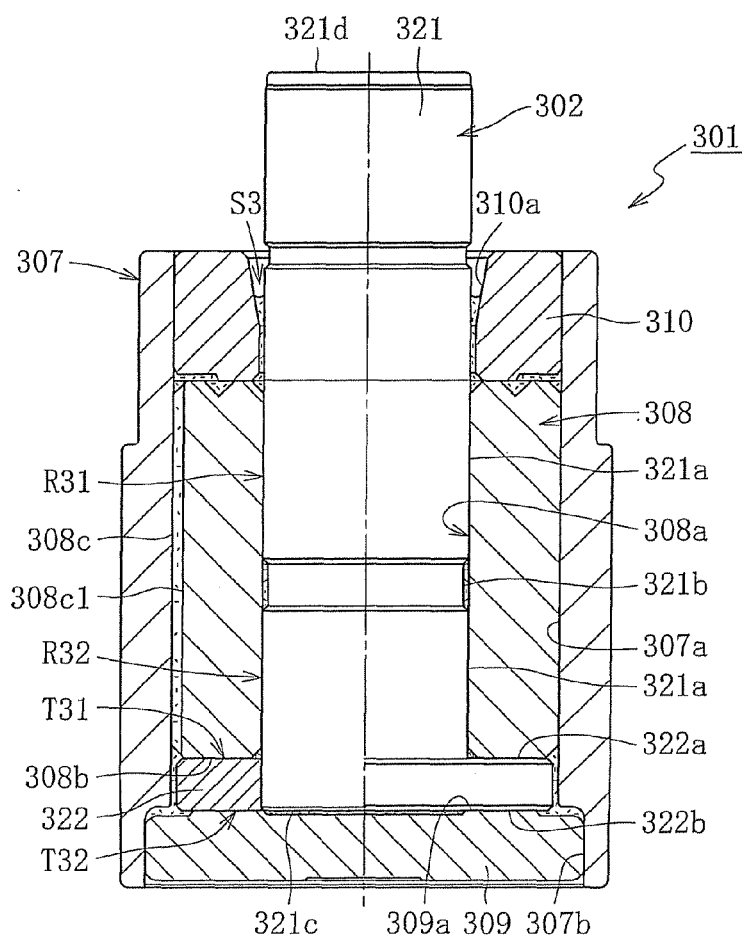
FIG. 25 is a sectional view of the fluid dynamic bearing device.

FIG. 25 illustrates the fluid dynamic bearing device 301. The fluid dynamic bearing device 301 mainly includes the housing 307, a bearing sleeve 308 fixed to the inner periphery of the housing 307, a lid member 309 for closing one end of the housing 307, a seal member 310 arranged on the opening side of the other end of the housing 307, and the shaft member 302 rotated relatively to the housing 307, the bearing sleeve 308, and the seal member 310.

The housing 307 is formed into a cylindrical shape with use of a metal material such as brass or a resin material, and exhibits a mode in which both axial ends thereof are opened. To an inner peripheral surface 307a of the housing 307, an outer peripheral surface 308c of the bearing sleeve 308 is fixed by appropriate means such as bonding (including loose bonding and press-fit bonding), press-fitting, or welding (including ultrasonic welding and laser welding). Further, on the lower end side of the inner peripheral surface 307a, there is formed a fixation surface 307b, which is described below and larger than the inner peripheral surface 307a in diameter, for fixing the lid member 309.

The bearing sleeve 308 is formed into a cylindrical shape with use of a porous body made of a sintered metal or the like. In this embodiment, the bearing sleeve 308 is formed into a cylindrical shape with use of a porous body made of a sintered metal including copper as a main component, and is fixed to the inner peripheral surface 307a of the housing 307 by bonding. Here, the bearing sleeve 308 may be formed of a porous body made of a non-metallic material such as a resin or ceramic, or may be formed of, except the porous body such as a sintered metal, a material having a structure free from inner holes, or a structure having holes of a size which prevents passage of a lubricating oil.

Figure 26:
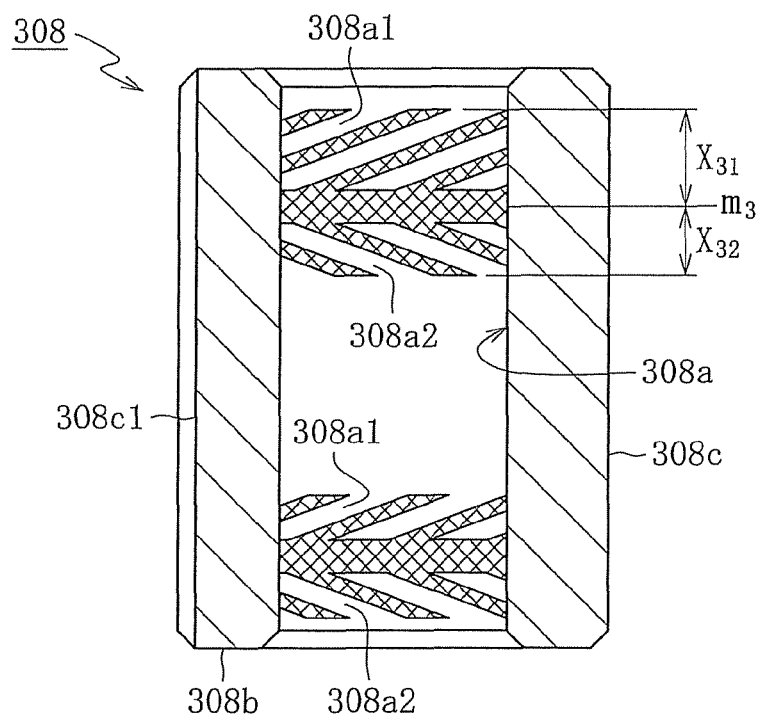
FIG. 26 is a sectional view of the bearing sleeve.

In the entire or a part of a region of an inner peripheral surface 308a of the bearing sleeve 308, regions where multiple dynamic pressure grooves are arranged are formed as a radial dynamic pressure generating portion. In this embodiment, as illustrated in FIG. 26, for example, two regions where multiple dynamic pressure grooves 308a1 and 308a2 having inclination angles different from each other are arranged in a herringbone pattern are formed while being axially separated from each other. Note that, in this embodiment, for the purpose of intentionally generating circulation of a lubricating oil inside the bearing, the region on one side (upper side in this case), where the dynamic pressure grooves 308a1 and 308a2 are arranged, is formed asymmetrically in the axial direction. When description thereof is made with reference to a mode illustrated in FIG. 26, an axial dimension X31 of the region on the upper side with respect to an axial center m3 (seal member 310 side), where the dynamic pressure grooves 308a1 are arranged, is larger than an axial dimension X32 of the region on the lower side, where the dynamic pressure grooves 308a2 are arranged.

Figure 27:
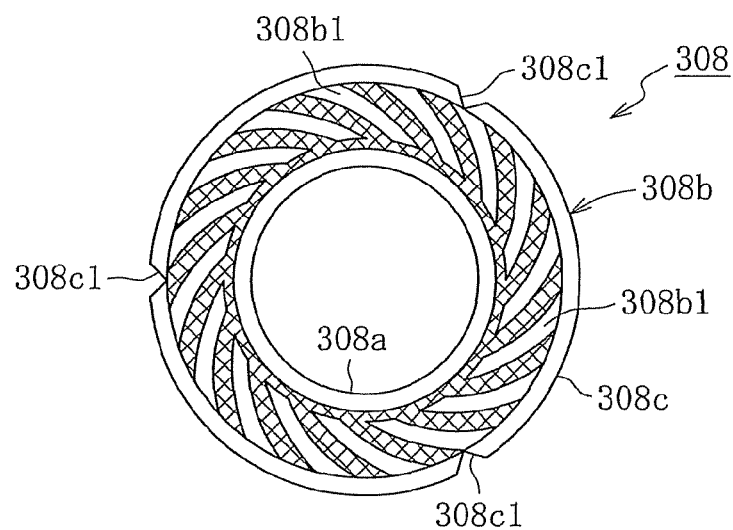
FIG. 27 is a plan view of the end surface of the bearing sleeve, which is opposed to the flange portion.

In the entire or a partially annular region of a lower end surface 308b of the bearing sleeve 308, as illustrated in FIG. 27, for example, a region where multiple dynamic pressure grooves 308b1 are arranged in a spiral pattern is formed as a thrust dynamic pressure generating portion. In the state of a finished product, the region where the dynamic pressure grooves 308b1 are formed is opposed to an upper end surface 322a of a flange portion 322 described below, and at the time of the rotation of the shaft member 302, a thrust bearing gap of a first thrust bearing portion T31 described below is formed between the region and the upper end surface 322a (refer to FIG. 25).

In an outer peripheral surface 308c of the bearing sleeve 308, there are formed multiple axial grooves 308c1 extending in the axial direction. Mainly during use of the fluid dynamic bearing device 301, for example, in the case where excess and deficiency of the lubricating oil occur in the inner space of the bearing, those axial grooves 308c1 play a role of immediately solving this undesirable state so as to restore an appropriate state.

The lid member 309 for closing the lower end side of the housing 307 is formed of a metal material, a resin material, or the like, and is fixed to the fixation surface 307b provided at the lower end in the inner periphery of the housing 307. As a fixation means, similarly to the case of the bearing sleeve 308, it is possible to adopt arbitrary means such as bonding, press-fitting, or welding.

In the entire or a partially annular region of an upper end surface 309a of the lid member 309, there is formed, as a thrust dynamic pressure generating portion, a region where dynamic pressure grooves are arranged, the region exhibiting an arrangement mode similar to, for example, that of FIG. 27 (opposite in spiral direction). In the state of a finished product, the region where dynamic pressure grooves are arranged is opposed to a lower end surface 322b of the flange portion 322, and at the time of the rotation of the shaft member 302, a thrust bearing gap of a second thrust bearing portion T32 described below is formed between the region and the lower end surface 322b (refer to FIG. 25).

In this embodiment, the seal member 310 as a sealing means is formed of a metal material and a resin material separately from the housing 307, and is fixed to the inner periphery of the upper end of the housing 307 by arbitrary means such as press-fitting, bonding, or welding.

On the inner periphery of the seal member 310, there is formed a sealing surface 310a having a tapered surface, and a seal space S3 is formed between the sealing surface 310a and the outer peripheral surface of a shaft portion 321 described below. In the state in which the lubricating oil is filled inside the fluid dynamic bearing device 301, the oil surface of the lubricating oil is constantly maintained within the range of the seal space S3.

The shaft member (shaft member for fluid dynamic bearing device) 302 is constituted by the shaft portion 321, and the annular flange portion 322 press-fitted and fixed to the lower end of the shaft portion 321. In this embodiment, as illustrated in FIG. 25, on the outer periphery of the shaft portion 321, radial bearing surfaces 321a are provided at two points while being separated from each other in the axial direction, the radial bearing surfaces 321a being opposed to the regions where the dynamic pressure grooves 308a1 and 308a2, which are provided on the inner peripheral surface 308a of the bearing sleeve 308, are formed. Between the radial bearing surfaces 321a and 321a, there is provided a thinned portion 321b having a smaller diameter than that of the radial bearing surfaces 321a. Note that, while the shaft portion 321 is made of a relatively hard material such as SUS steel in consideration of strength and sliding appropriately, the flange portion 322 is preferably made of a relatively soft material such as brass, in consideration mainly of workability. However, this combination should not be construed restrictively, and materials for the respective components can be selected as appropriate.

After the components described above are assembled, the inner space of the bearing is filled with the lubricating oil, whereby the fluid dynamic bearing device 301 as a finished product is obtained. Here, as a lubricating oil filled in the fluid dynamic bearing device 301, various oils can be used. As a lubricating oil provided to the fluid dynamic bearing device for a disk drive such as an HDD, in consideration of changes in temperature during use and transportation thereof, it is possible to suitably use an ester-based lubricating oil excellent in low evaporation rate and low viscosity, for example, a lubricating oil including dioctyl sebacate (DOS) or dioctyl azelate (DOZ).

In the fluid dynamic bearing device 301 constituted as described above, when the shaft member 302 is rotated, the regions where the dynamic pressure grooves 308a1 and 308a2 of the bearing sleeve 308 are arranged are opposed to the radial bearing surfaces 321a and 321a of the bearing portion 321 through an intermediation of radial bearing gaps. Then, in accordance with the rotation of the shaft member 302, in any of the upper and lower regions where the dynamic pressure grooves 308a1 and 308a2 are arranged, the lubricating oil is pressed to an axial center m3 of the dynamic pressure grooves 308a1 and 308a2, and the pressure thereof is increased. Owing to the dynamic pressure effect of the dynamic pressure grooves 308a1 and 308a2 as described above, a first radial bearing portion R31 and a second radial bearing portion R32 for rotatably supporting the shaft member 302 in the radial direction in a non-contact manner are formed so as to be constituted at two positions while being separated from each other, respectively.

Simultaneously, in a thrust bearing gap between the region where the dynamic pressure grooves 308b1 are arranged, the region being provided to the lower end surface 308b of the bearing sleeve 308, and the upper end surface 322a of the flange portion 322 opposed thereto, and in a thrust bearing gap between the region where the dynamic pressure grooves are arranged, the region being provided to the upper end surface 309a of the lid member 309, and the lower end surface 322b of the flange portion 322, oil films of the lubricating oil are respectively formed owing to the dynamic pressure effect of the dynamic pressure grooves. Then, owing to the pressures of the oil films, a first thrust bearing portion T31 and a second thrust bearing portion T32 for supporting the shaft member 302 in the thrust direction in a non-contact manner are constituted, respectively.

Hereinafter, an example of the manufacturing step of the shaft member 302 is described with reference to FIGS. 28A, 28B, and 28C.

The shaft member 302 having the above-mentioned structure is formed through a step of press-fitting the lower portion of the shaft portion 321 into a hole 322c provided in the flange portion 322, and a step of correcting the posture of the flange portion 322 with respect to the shaft portion 321 after completion of press-fitting.

Figure 28A:
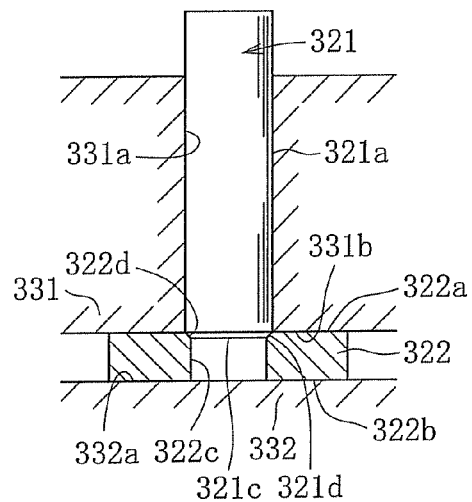
FIG. 28A is a sectional view conceptually illustrates another example of the manufacturing method for a shaft member, that is, an arrangement relationship between the shaft portion and the flange portion before press-fitting.
Figure 28B:
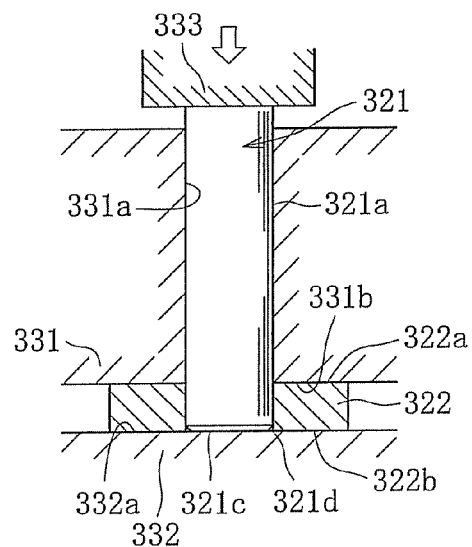
FIG. 28B is a sectional view conceptually illustrates another example of the manufacturing method for a shaft member, that is, an arrangement relationship between the shaft portion and the flange portion at the time of completion of press-fitting.
Figure 28C:
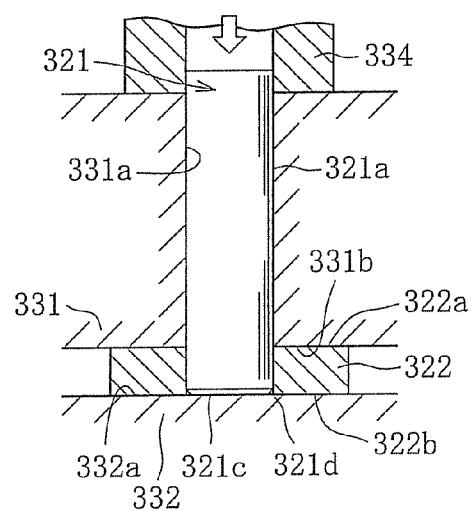
FIG. 28C is a sectional view conceptually illustrating an example of the manufacturing method for a shaft member, that is, an arrangement relationship between the shaft portion and the flange portion at the stage at which, after completion of press-fitting, corrective force is imparted to the flange portion.

FIGS. 28A to 28C conceptually illustrate an example of the press-fitting step and the correcting step for the flange portion 322 of the shaft portion 321. For example, FIG. 28A illustrates an arrangement relationship between the shaft portion 321 and the flange portion 322 before press-fitting, in which the shaft portion 321 is inserted to an inside of a cylindrical inner peripheral surface 331a of a first jig 331, and held therein. Further, the flange portion 322 is held between a lower end surface 331b of the first jig 331 and an upper end surface 332a of a second jig 332 positioned below the first jig 331.

Here, all of the cylindrical inner peripheral surface 331a and the lower end surface 331b provided in the first jig 331 and the upper end surface 332a provided in the second jig 332 are brought into contact with the bearing surfaces of the shaft member 302, and correct the surface accuracy and shape accuracy of those bearing surfaces. Thus, it is important to perform the finishing process on the cylindrical inner peripheral surface 331a, the lower end surface 331b, and the upper end surface 332a with high accuracy.

Further, in the shaft member 302 of this type, in terms of the fact that perpendicularity between the radial bearing surface 321a and the thrust bearing surface (upper end surface 322a) affects the bearing performance, it is desirable to enhance the perpendicularity between the cylindrical inner peripheral surface 331a and the lower end surface 331b by performing the process thereon in advance with high accuracy. In order to obtain high parallelism between the lower end surface 331b and the upper end surface 332a which bind the flange portion 322 in the axial direction, as a matter of course, both the jigs 331 and 332 are subjected to the process and arranged with high accuracy. As an example, the cylindrical inner peripheral surface 331a is subjected to the process so as to have the inner diameter dimension larger by 3 μm to 7 μm than the outer diameter of the shaft portion 321 to be press-fitted. Further, the process is performed so that each perpendicularity between the cylindrical inner peripheral surface 331a and the lower end surface 331b and between the cylindrical inner peripheral surface 331a and the upper end surface 332a is set equal to 3 μm or less, and those jigs 331 and 332 are disposed.

In the state prior to press-fitting, the outer diameter dimension of the shaft portion 321 is set larger than the inner diameter dimension of the hole 322c of the flange portion 322, and a value of substantial press-fit allowance is obtained by subtracting the inner diameter dimension of the hole 322c from the outer diameter dimension of the shaft portion 321. In this case, the dimensions for the respective components are set so that the diameter amount of press-fit allowance is set equal to 10 μm or more and equal to 30 μm or less, preferably, equal to 15 μm or more and equal to 20 μm or less. Note that, in this embodiment, chamfer portions 321d and 322d are respectively formed at the press-fit side end portion of the shaft portion 321 and the press-fit side end portion of the hole 322c of the flange portion 322. As illustrated in FIG. 28A, at the stage prior to press-fitting, the chamfer portion 321d provided on the shaft portion 321 is brought into contact with the chamfer portion 322d provided on the flange portion 322.

As described above, in the state in which the shaft portion 321 and the flange portion 322 are installed in the first jig 331 and the second jig 332, a first pressurizing member 333 is lowered by an appropriate drive mechanism to pressurize the shaft portion 321 (refer to FIG. 28B). With this, press-fitting of the shaft portion 321 with respect to the flange portion 322 is started. Note that, at the time of pressurizing the shaft portion 321, owing to mutual action of the chamfer portion 321d of the shaft portion 321 and the chamfer portion 322d of the flange portion 322, which are brought into contact with each other, coaxial alignment is performed (mainly in the horizontal direction) on the flange portion 322 with respect to the shaft portion 321.

In this way, by pushing down the first pressurizing member 333, the shaft portion 321 is press-fitted into the hole 322c of the flange portion 322, and lowering of the first pressurizing member 333 is stopped at the point in time when press-fitting of the shaft portion 321 is completed. In this embodiment, as illustrated in FIG. 28B, at the point in time when press-fitting is performed until a lower end surface 321c of the shaft portion 321 reaches the same height level of a lower end surface 322b of the flange portion 322, pressurizing (press-fitting) by the first pressurizing member 333 is stopped.

Then, after completion of press-fitting, instead of the first pressurizing member 333, a second pressurizing member 334 is arranged above the first jig 331 and the shaft portion 321, and the second pressurizing member 334 is lowered. With this, the first jig 331 is pressurized, and the flange portion 322 is compressed by the lower end surface 331b of the first jig 331 and the upper end surface 332a of the second jig 332 (refer to FIG. 28C). Such a compression work is performed in the state in which the shaft portion 321 is held in the cylindrical inner peripheral surface 331a of the first jig 331, whereby the posture of the flange portion 322 with respect to the shaft portion 321 is corrected in conformity with the shapes of the jigs 331 and 332. Specifically, each perpendicularity between the radial bearing surfaces 321a and 321a and both the end surfaces 322a and 322b having the thrust bearing surfaces is improved (for example, improved to be equal to 5 µm or less). Further, at the same time, both the end surfaces 322a and 322b of the flange portion 322 are corrected, and surface accuracy and shape accuracy (here, parallelism) of those surfaces are improved.

In this way, after the shaft portion 321 is press-fitted to the flange portion 322, corrective force is imparted by the jigs 331 and 332 to correct the posture of the flange portion 322 with respect to the shaft portion 321, whereby it is possible to appropriately correct deformation, distortion of posture, and the like which are generated by press-fitting. In particular, as in this embodiment, corrective force is imparted to the flange portion 322, whereby it is possible to effectively correct both the end surfaces 322a and 322b of the flange portion 322 relatively apt to generate deformation due to the differences in material and shape. According to the above description, it is possible to obtain the shaft member 302 excellent in accuracy of the radial bearing surfaces 321a provided in the shaft portion 321 and the flange portion 322, and the thrust bearing surfaces (both end surfaces 322a and 322b), and excellent in perpendicularity between those bearing surfaces.

Further, in this embodiment, after completion of press-fitting, the posture of the flange portion 322 with respect to the shaft portion 321 is corrected. In this way, if correction is performed after completion of press-fitting, a mechanism used for press-fitting and a mechanism (in particular, drive mechanism) used for correction can be separately provided, and hence it is possible to impart to the flange portion 322, for example, load (corrective force) larger than load applied by the first pressurizing member 333. With this, magnitude of corrective force can be adjusted freely, and it is possible to impart to the shaft portion 321 and the flange portion 322 corrective force appropriate to the press-fit modes and the sizes thereof.

Further, in this embodiment, corrective force is imparted to the press-fit region of the flange portion 322 or the vicinity thereof to thereby perform correction. As described above, press-fitting is performed along with deformation of at least any one of members, and particularly in the press-fit region, the local plastic deformation easily occurs. Thus, entire of both the end surfaces 322a and 322b, which include the inner peripheral edge of the flange portion 322 serving as the press-fit region or the vicinity thereof, are compressed by the first jig 331 and the second jig 332, whereby it is possible to perform correction effectively, and possible to correct deformation of the flange portion 322 itself and the fixation posture of the flange portion 322 with respect to the shaft portion 321 with high accuracy.

Further, as in this embodiment, as long as correction is performed after completion of press-fitting, the imparting direction of corrective force and the structure according to this step are arbitrary. For example, as illustrated in the figure, by pressurizing the first jig 331 that holds the shaft portion 321 and the flange portion 322, correction can be performed on the flange portion 322. In addition, by pushing (pressurizing) the second jig 332 or a jig corresponding thereto against the flange portion 322 held by the first jig 331, correction can be performed as well.

Note that, in the manufacturing step illustrated in FIGS. 28A to 28C, there is described the case where correction is performed on the posture of the flange portion 322 with respect to the shaft portion 321 after completion of press-fitting of the shaft portion 321. However, also at the stage other than this, for example, in the process of press-fitting, correction can be performed on the shaft portion 321 and the flange portion 322.

Figure 29A:
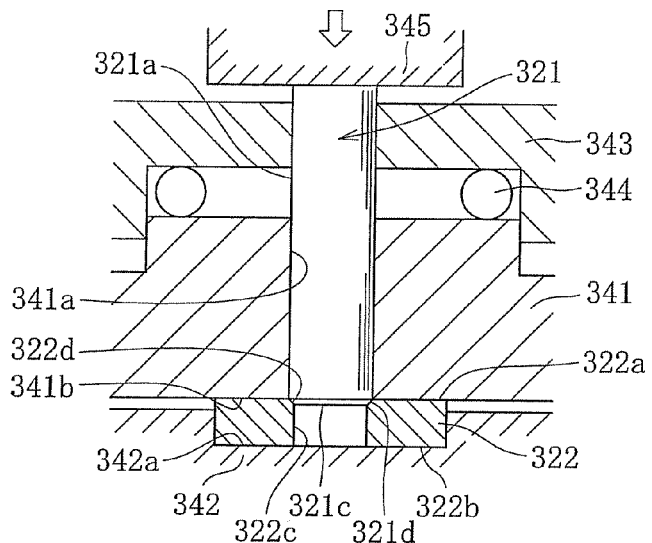
FIG. 29A is a sectional view conceptually illustrates another example of the manufacturing method for a shaft member, that is, an arrangement relationship between the shaft portion and the flange portion before press-fitting.
Figure 29B:
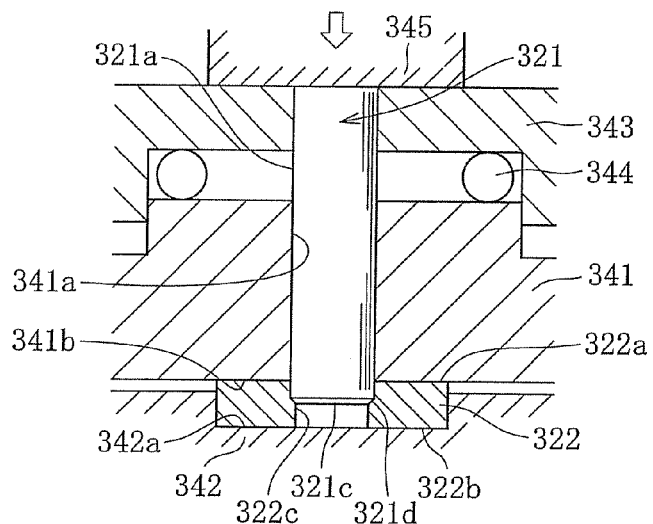
FIG. 29B is a sectional view conceptually illustrates another example of the manufacturing method for a shaft member, that is, an arrangement relationship between the shaft portion and the flange portion in the middle of press-fitting.
Figure 29C:
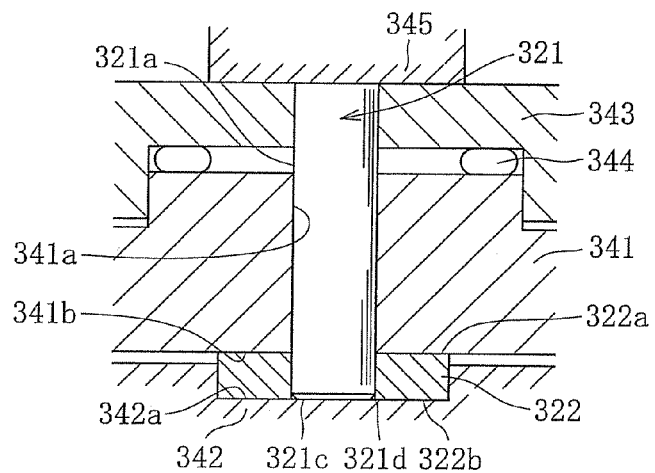
FIG. 29C is a sectional view conceptually illustrates another example of the manufacturing method for a shaft member, that is, an arrangement relationship between the shaft portion and the flange portion at the time of completion of press-fitting.

FIGS. 29A to 29C conceptually illustrate a press-fitting step according to an example thereof. In this example, as illustrated in FIG. 29A, a third jig 344 is disposed between the first jig 331 holding the shaft portion 321 and a pressurizing member 345 pushing in the shaft portion 321 toward the flange portion 322 side. This jig 344 is provided so as to interpose an elastic body 343 (including O-ring, spring, and the like) between itself and a first jig 341 positioned therebelow. When the third jig 344 is applied with downward load from the pressurizing member 345, this load is transmitted to the first jig 341 through an intermediation of the elastic body 343. Further, in this case, the elastic body 343 is compressed depending on the load, thereby absorbing downward displacement of the third jig 344.

A second jig 342, which is brought into contact with the lower end surface 322b of the flange portion 322, covers the outer periphery of the flange portion 322 in this example, and binds, at the time of press-fitting, movement of the flange portion 322 along with the first jig 331. In this case, in order that the chamfer portions 321d and 322d provided to the shaft portion 321 and the flange portion 322 function, specifically, there is provided a gap enough to enable a slight positional alignment in the horizontal direction between the flange portion 322 and the shaft portion 321. The finishing process is performed with high accuracy on all of a cylindrical inner peripheral surface 341a and a lower end surface 341b of the first jig 341 which are brought into contact with the radial bearing surfaces 321a and 321a and the thrust bearing surfaces (both end surface 322a and 322b), and an upper end surface 342a of the second jig 342. As the specific working accuracy, the same values as those in the manufacturing step illustrated in FIGS. 28A to 28C can be exemplified.

When the device having the above-mentioned structure is used, fixation of the shaft portion 321 and the flange portion 322 is performed as follows.

First, in the state illustrated in FIG. 29A, the pressurizing member 345 is lowered by an appropriate drive mechanism. Then, the shaft portion 321 brought into contact with the pressurizing member 345 is pushed down to thereby start press-fitting to the flange portion 322. At this stage (at the time of start of press-fitting), the opposite press-fit side end portion of the shaft portion 321 protrudes with respect to the third jig 344 (refer to FIG. 29A).

After press-fitting is started in this way, at the stage at which the shaft portion 321 is press-fitted by a predetermined length (for example, stage at which press-fit posture of shaft portion 321 with respect to flange portion 322 is stabilized), the pressurizing member 345 is brought into contact with the third jig 344 (at the stage illustrated in FIG. 29B). Then, the pressurizing member 345 is further lowered, and the third jig 344 is pressurized downward, whereby downward load is applied to the first jig 341 through an intermediation of the elastic body 343. Therefore, while both the end surfaces 322a and 322b of the flange portion 322 are compressed by the first jig 341 and the second jig 342, press-fitting of the shaft portion 321 progresses.

In this way, the pressurizing member 345 is pushed down to thereby press-fit the shaft portion 321 into the hole 322c of the flange portion 322, and at the same time, corrective force of a predetermined magnitude (here, elastic restoring force of elastic body 343) is imparted to the flange portion 322 to thereby correct the posture of the flange portion 322 with respect to the shaft portion 321. Then, at the point in time when press-fitting of the shaft portion 321 to the flange portion 322 is completed, lowering of the pressurizing member 345 is stopped. FIG. 29C illustrates the state in which pushing-in of the shaft portion 321 is stopped at the point in time when the lower end surface 321c of the shaft portion 321 reaches the same height level of the lower end surface 322b of the flange portion 322. Here, perpendicularity of the obtained press-fit product (shaft member 302) between the radial bearing surfaces 321a of the shaft portion 321 and both the end surfaces 322a and 322b of the flange portion 322 is corrected to be equal to 5 µm or less.

In this way, at the stage at which press-fitting of the shaft portion 321 to the flange portion 322 is started and the press-fitting progresses to some extent, the posture of the flange portion 322 with respect to the shaft portion 321 is corrected, whereby it is possible to perform press-fitting while appropriately correct deformation, distortion of posture, and the like which are generated by press-fitting. In particular, as in this embodiment, correction is started at the midpoint of press-fitting, and press-fitting is performed while gradually increasing corrective force to the flange portion 322, whereby it is possible to sequentially correct deformation generated in the flange portion 322 by press-fitting, or distortion with respect to the posture in an appropriate state in the state in which the deformation or distortion remains small. Therefore, load necessary for correction becomes small as a whole.

Further, according to such a method (structure), press-fitting and correction can be performed by the single pressurizing member 345. Thus, it suffices that a single drive mechanism (drive system) for imparting press-fitting force and corrective force is provided, making it possible to reduce facility cost. Further, it is possible to perform press-fitting and correction by a series of the jigs 341 to 345 in conjunction with each other, which is preferable in terms of productivity.

As described above, there are described the manufacturing methods of the shaft member 302 for the fluid dynamic bearing device exemplified in FIGS. 28A to 28C, and FIGS. 29A to 29C. However, as a matter of course, other press-fit fixation means can be adopted.

Figure 30A:
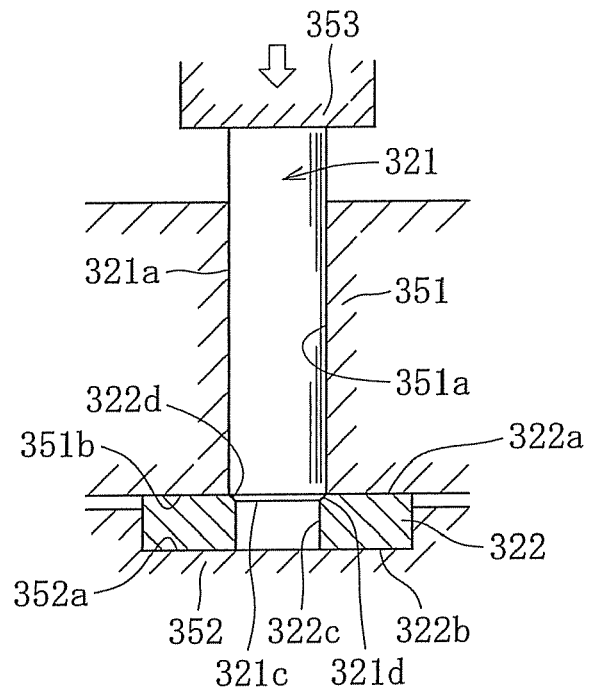
FIG. 30A is a sectional view conceptually illustrates another example of the manufacturing method for a shaft member, that is, an arrangement relationship between the shaft portion and the flange portion before press-fitting.
Figure 30B:
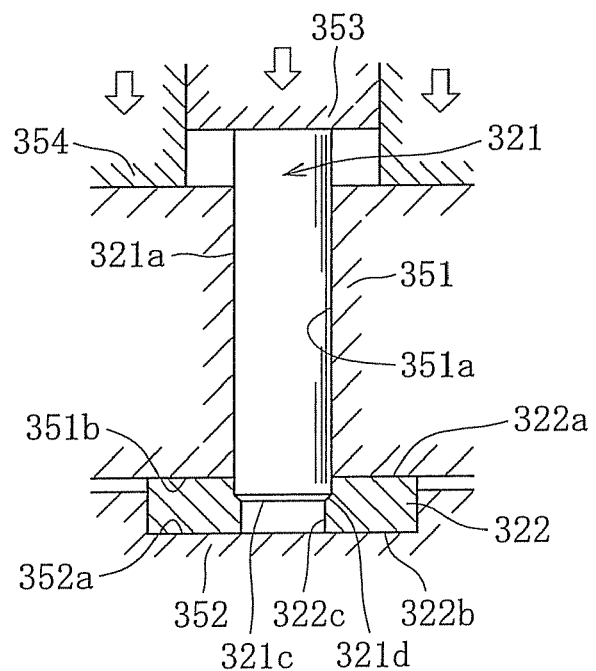
FIG. 30B is a sectional view conceptually illustrates another example of the manufacturing method for a shaft member, that is, an arrangement relationship between the shaft portion and the flange portion in the middle of press-fitting.

FIGS. 30A and 30B conceptually illustrate a manufacturing method for the shaft member 302 according to an example thereof. The press-fit fixation device illustrated in the figure has the same structure as that of the press-fit fixation device illustrated in FIGS. 28A to 28C in terms of being provided with a first jig 351 and a second jig 352, and a first pressurizing member 353 and a second pressurizing member 354, but has correction start timing different from that in the manufacturing step illustrated in FIGS. 28A to 28C.

That is, as illustrated in FIG. 30A, in the state in which the shaft portion 321 and the flange portion 322 are held by the jigs 351 and 352, the first pressurizing member 353 is lowered by a single drive mechanism to push down the shaft portion 321 brought into contact with the pressurizing member 353. With this, press-fitting of the shaft portion 321 to the flange portion 322 is started. At this stage (at the time of start of press-fitting), the opposite press-fit side end portion of the shaft portion 321 protrudes with respect to the first jig 351 (refer to FIG. 30A).

Then, at the stage at which the press-fitting progresses to some extent, the second pressurizing member 354 is lowered using a drive mechanism provided separately from the drive mechanism for the first pressurizing member 353 so as to be brought into contact with the first jig 351 (in the state illustrated in FIG. 30B). In this embodiment, the second pressurizing member 354 is positioned on the outer periphery of the first pressurizing member 353, and configured to be capable of moving up and down both the pressurizing members 353 and 354 individually and separately from each other.

Then, the second pressurizing member 354 is further lowered, and the first jig 351 is pressurized downward, whereby both the end surfaces 322a and 322b of the flange portion 322 are compressed between the second jig 352 and the first jig 351, and at the same time, press-fitting of the shaft portion 321 progresses.

In this way, the second pressurizing member 354 is pushed down individually and separately from the first pressurizing member 353, whereby the shaft portion 321 is press-fitted into the hole 322c of the flange portion 322, and the posture of the flange portion 322 with respect to the shaft portion 321 is corrected. Further, at the point in time when press-fitting of the shaft portion 321 to the flange portion 322 is completed, lowering of the first pressurizing member 353 is stopped.

In this way, at the stage at which press-fitting of the shaft portion 321 to the flange portion 322 is started and the press-fitting progresses to some extent, the posture of the flange portion 322 with respect to the shaft portion 321 is corrected, whereby it is possible to perform press-fitting while appropriately correcting deformation, distortion of posture, and the like which are generated by press-fitting. Further, as in this embodiment, if the pressurizing member (first pressurizing member 353) and drive mechanism used for press-fitting, and the pressurizing member (second pressurizing member 354) and drive mechanism used for correction are provided separately from each other, it is possible to impart load (corrective force) of an appropriate magnitude to the flange portion 322 without constraint of press-fitting force by the first pressurizing member 353.

Further, in the illustrated example, there is described the case where the end portion of the shaft portion 321, which has substantially the same dimension as that of the radial bearing surfaces 321a, is press-fitted into the hole 322c of the flange portion 322. However, the shaft portion 321 may be a so-called stepped shaft in which its press-fit portion has a small diameter. In this case, press-fitting is performed until a stepped surface of the shaft portion 321 is brought into contact with the upper end surface 322a of the flange portion 322, whereby it is possible to easily grasp and manage the press-fit position.

Further, in the illustrated example, there is described the case where the end portion of the shaft portion 321 is press-fitted into the hole 322c of the flange portion 322 while involving a predetermined press-fit allowance. However, the present invention is applicable, for example, to press-fitting along with bonding (press-fit bonding). In the case of press-fit bonding, fixing force can be compensated by an adhesive, and hence it is possible to reduce press-fit allowance in comparison with the case of press-fitting alone. Alternatively, the adhesive functions as a kind of lubricant at the time of press-fitting. Thus, even when large press-fit allowance is made, by supplying the adhesive in advance, it is possible to reduce friction force at the time of press-fitting to perform press-fitting with small load. Further, as in the illustrated example, if the chamfer portion 321d is provided at the introduced-side end portion of the shaft portion 321, when press-fitting is performed along with bonding, the adhesive supplied in advance to the press-fit region is pushed out to the lower end surface 322b side of the flange portion 322. Accordingly, the chamfer portion 321d provided to the shaft portion 321 can function as a kind of adhesive pool.

Further, in the above description, there is described the case where, in the state in which the shaft portion 321 is held and bound, the flange portion 322 is nipped and pressurized by the jigs (first jig 331, 341, and 351, and second jig 332, 342, and 352) to thereby impart corrective force. However, the imparting mode of corrective force is not limited thereto. That is, correction may be realized by imparting corrective force to the flange portion 322 by a jig other than the above-mentioned ones, or by imparting corrective force in the radial direction (force directed to a direction in which flange portion 322 is reduced in diameter from the outer periphery thereof) alone or in combination with corrective force in the axial direction. Further, by imparting corrective force to the shaft portion 321, correction of the posture (perpendicularity) can be realized, and corrective force can be imparted to both the shaft portion 321 and the flange portion 322.

Note that, the press-fit fixation device used in the above description is merely an example, and an arbitrary structure can be adopted as long as the manufacturing method of the shaft member 302 according to the present invention can be realized.

Further, the present invention can be also applied to the fluid dynamic bearing device having structure other than the structure illustrated in FIG. 25.

For example, while in FIG. 25, there is described the case where the outer peripheral surface of the shaft portion 321 is used as the radial bearing surface 321a, and the upper end surface 322a and the lower end surface 322b of the flange portion 322 are used as the thrust bearing surfaces, the present invention is not limited thereto. For example, it is possible to apply the present invention to the shaft member of the fluid dynamic bearing device having a structure in which only the upper end surface 322a or only the lower end surface 322b of both the end surfaces 322a and 322b is used as the thrust bearing surface.

Figure 31:
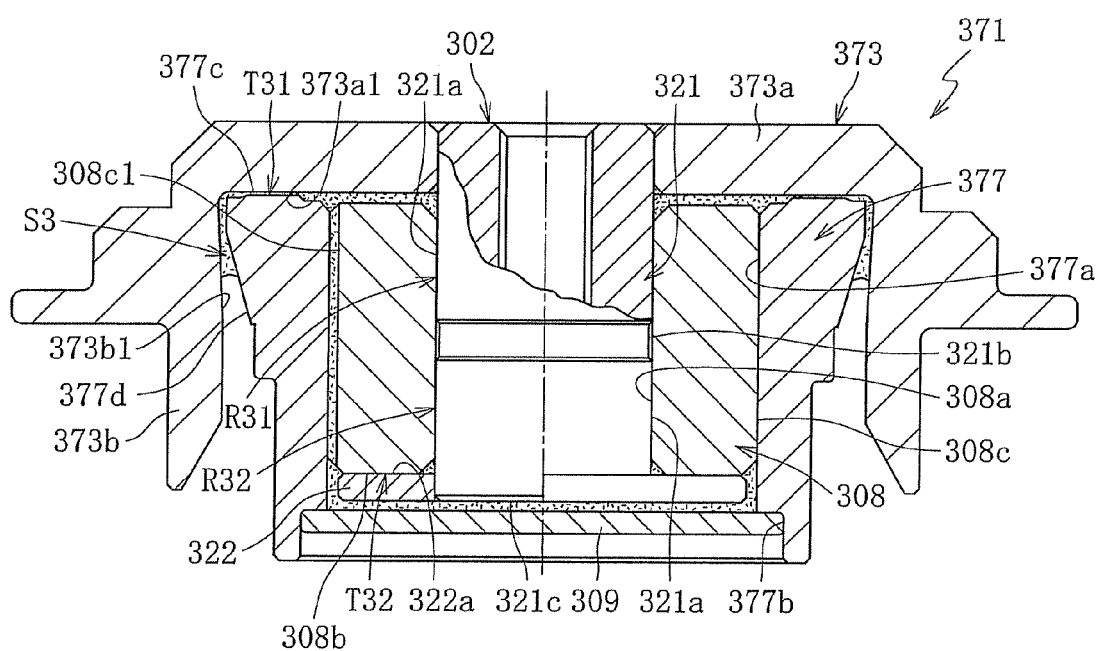
FIG. 31 is a sectional view of a fluid dynamic bearing device according to another structure.

FIG. 31 illustrates a sectional view of a fluid dynamic bearing device 371 having a structure in which only the upper end surface 322a is used as the thrust bearing surface. The characteristics (differences from fluid dynamic bearing device 301 of FIG. 25) of the fluid dynamic bearing device 371 are as follows. That is, in the fluid dynamic bearing device 371, a hub 373 fixed to an upper end (opposite side to flange portion 322) of a shaft portion 321 mainly includes a disk portion 373a positioned on an opening side (upper side) of a housing 377, and a cylindrical portion 373b extending downward in the axial direction from an outer peripheral portion of the disk portion 373a. Further, on an upper end surface 377c of the housing 377, there are provided regions where the dynamic pressure grooves are formed having the arrangement mode, for example, illustrated in FIG. 27 (opposite in spiral directions), thereby forming a thrust bearing gap of a second thrust bearing portion T32 with a lower end surface 373a1 of the opposed disk portion 373a.

On an outer periphery of the housing 377, there is formed a tapered sealing surface 377d having a diameter gradually increased upward. The tapered sealing surface 377d forms, with an inner peripheral surface 373b1 of the cylindrical portion 373b, an annular seal space S3 having a radial dimension gradually decreased toward the closed side (lower side) to an opening side (upper side) of the housing 377. Note that, in FIG. 31, an inner peripheral surface 377a and a fixing surface 377b of the housing 377 correspond to the inner peripheral surface 307a and the fixing surface 307b of the housing 307 in FIG. 25, respectively. The structures other than the above are the same as those in FIG. 25, and hence the description thereof is omitted.

In this way, even when only the upper end surface 322a of the flange portion 322 is used as the thrust bearing surface, if corrective force is imparted to one of or both of the shaft portion 321 and the flange portion 322 after completion of press-fitting or in the press-fitting process, it is possible to obtain the shaft member 302 which has high fixation strength, is excellent in surface accuracy of bearing surfaces, and has high perpendicularity between the radial bearing surfaces 321a and the thrust bearing surface (upper end surface 322a).

Note that, while in the above description, the housing 307 and 377, and the bearing sleeve 308 are separated, it is also possible to integrate (integrally form by the same material, or insert one member and die mold the other member) two or more members selected from members constituting the fixed side of the fluid dynamic bearing device 301 and 371 in a range capable of assembling. For example, in the structure illustrated in FIG. 25, the housing 307 and the bearing sleeve 308, the housing 307 and the lid member 309, or the housing 307 and the seal member 310 can be integrated. It is also possible to integrate the housing 307, the bearing sleeve 308, and the seal member 310. Further, in the structure illustrated in FIG. 31, the housing 377 and the bearing sleeve 308, or the housing 377 and the lid member 309 can be integrated.

In the following, a fourth embodiment of the present invention is described with reference to FIGS. 32 to 39. Herein, the fourth embodiment is an example of the embodiment according to the first aspect of the present invention.

Figure 32:
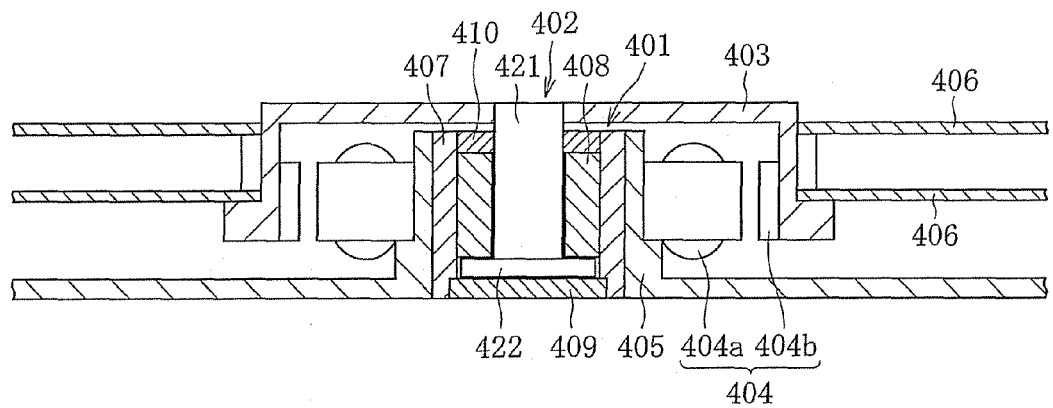
FIG. 32 is a sectional view of a spindle motor provided with a fluid dynamic bearing device according to a fourth embodiment of the present invention.

FIG. 32 is a sectional view of a spindle motor according to the fourth embodiment of the present invention, which is provided with a fluid dynamic bearing device 401. The spindle motor is used as a disk drive motor for an HDD, which is provided with a magnetic disk, and includes the fluid dynamic bearing device 401 for supporting a shaft member 402 attached with a hub 403 in a radial direction and in a non-contact manner, a drive portion 404 constituted by a stator coil 404a and a rotor magnet 404b opposed to each other through an intermediation of, for example, a radial gap, and a bracket 405. The stator coil 404a is fixed to the bracket 405, and the rotor magnet 404b is fixed to the hub 403. A housing 407 of the fluid dynamic bearing device 401 is fixed to an inner periphery of the bracket 405. Further, as illustrated in the figure, a disk 406 (two in FIG. 32) is held on the hub 403. In the spindle motor constituted as described above, when the stator coil 404a is energized, the rotor magnet 404b is rotated with excitation force generated between the stator coil 404a and the rotor magnet 404b. In accordance therewith, the disk 406 held on the hub 403 is integrally rotated with the shaft member 402.

Figure 33:
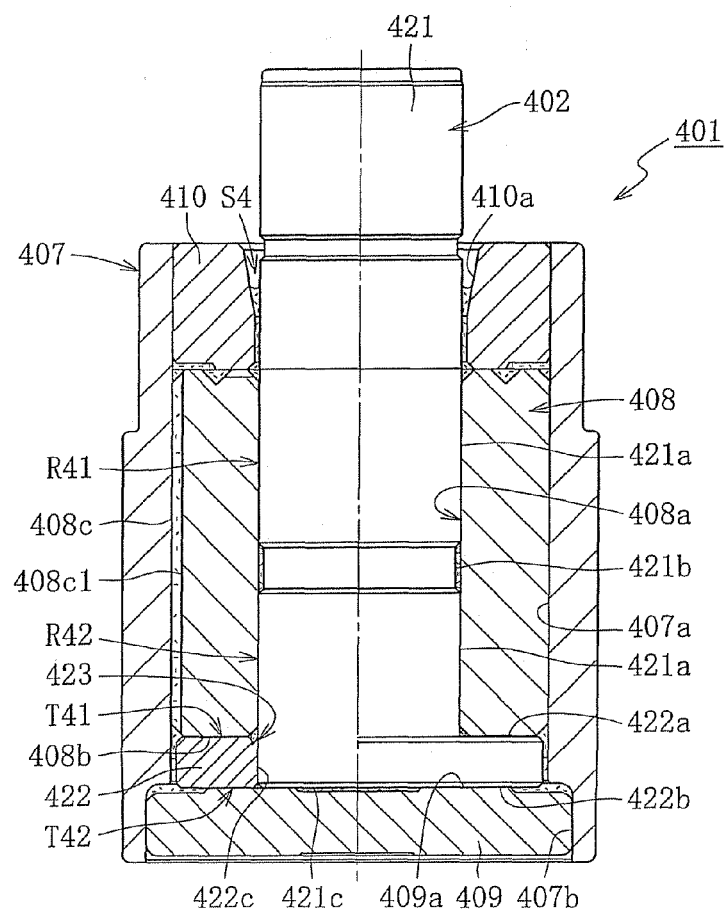
FIG. 33 is a sectional view of the fluid dynamic bearing device.

FIG. 33 illustrates the fluid dynamic bearing device 401. The fluid dynamic bearing device 401 mainly includes the housing 407, a bearing sleeve 408 fixed to the inner periphery of the housing 407, a lid member 409 for closing one end of the housing 407, a seal member 410 arranged on the opening side of the other end of the housing, and the shaft member 402 rotated relatively to the housing 407, the bearing sleeve 408, and the seal member 410.

The housing 407 is formed into a cylindrical shape with use of a metal material such as brass or a resin material, and exhibits a mode in which both axial ends thereof are opened. To an inner peripheral surface 407a of the housing 407, an outer peripheral surface 408c of the bearing sleeve 408 is fixed by appropriate means such as bonding, press-fitting, or welding. Further, on the lower end side of the inner peripheral surface 407a, there is formed a fixation surface 407b, which is described below and larger than the inner peripheral surface 407a in diameter, for fixing the lid member 409.

The bearing sleeve 408 is formed into a cylindrical shape with use of a porous body made of a sintered metal or the like. In this embodiment, the bearing sleeve 408 is formed into a cylindrical shape with use of a porous body made of a sintered metal including copper as a main component, and is fixed to the inner peripheral surface 407a of the housing 407 by bonding. The bearing sleeve 408 may be formed of a porous body made of a non-metallic material such as a resin or ceramic, or may be formed of, except the porous body such as a sintered metal, a material having a structure free from inner holes, or a structure having holes of a size which prevents passage of a lubricating oil.

Figure 34:
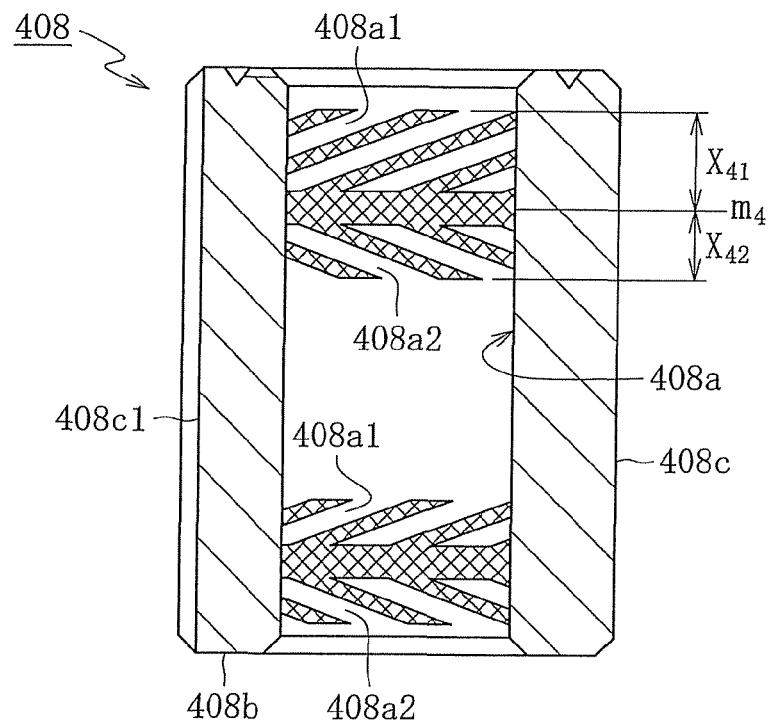
FIG. 34 is a sectional view of the bearing sleeve.

In the entire or partial region of an inner peripheral surface 408a of the bearing sleeve 408, as a radial dynamic pressure generating portion, there is formed a region where multiple dynamic pressure grooves are arranged. In this embodiment, as illustrated in FIG. 34, for example, regions where multiple dynamic pressure grooves 408a1 and 408a2 having inclination angles different from each other are arranged in a herringbone pattern are formed at two points while being separated from each other in the axial direction. Further, one of or both of the regions where the dynamic pressure grooves 408a1 and 408a2 are arranged may be formed asymmetrically in the axial direction for the purpose of intentionally generating a circulation of a lubricating oil inside the bearing. In the mode illustrated in FIG. 34, regarding the upper region where the dynamic pressure grooves 408a1 and 408a2 are arranged, an axial dimension X41 of the region where the dynamic pressure grooves 408a1 are arranged, and which is the upper side with respect to an axial center m4 (side of seal member 410), is formed so as to be larger than an axial dimension X42 of the region where the dynamic pressure grooves 408a2 are arranged, and which is the lower side with respect to the axial center.

Figure 35:
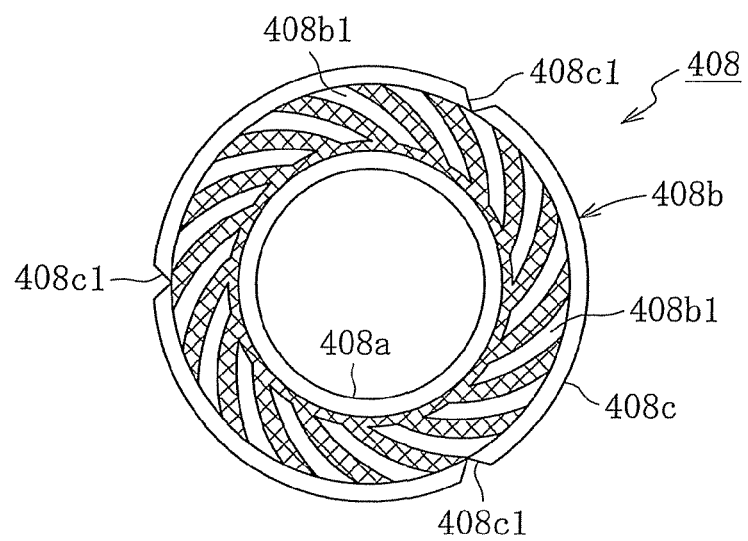
FIG. 35 is a plan view of an end surface of the bearing sleeve, which is opposed to the flange portion.

In the entire or a part of a region of a lower end surface 408b of the bearing sleeve 408, as illustrated in FIG. 35, for example, a region where multiple dynamic pressure grooves 408b1 are arranged in a spiral pattern is formed as a thrust dynamic pressure generating portion. In the state of a finished product, the region where the dynamic pressure grooves 408b1 are arranged is opposed to an upper end surface 422a of a flange portion 422 described below, and at the time of the rotation of the shaft member 402, a thrust bearing gap of a first thrust bearing portion T41 described below is formed between the region and the upper end surface 422a (refer to FIG. 33).

In an outer peripheral surface 408c of the bearing sleeve 408, there are formed multiple axial grooves 408c1 extending in the axial direction. Mainly during use of the fluid dynamic bearing device 401, for example, in the case where excess and deficiency of the lubricating oil occur in the inner space of the bearing, those axial grooves 408c1 play a role of immediately solving this undesirable state so as to restore an appropriate state.

The lid member 409 for closing the lower end side of the housing 407 is formed of a metal material, a resin material, or the like, and is fixed to the fixation surface 407b provided at the lower end in the inner periphery of the housing 407. In this case, for fixing the lid member 409, it is possible to adopt arbitrary means such as bonding, press-fitting, or welding.

In the entire or a part of a region of an upper end surface 409a of the lid member 409, there is formed a region where dynamic pressure grooves are arranged, the region exhibiting an arrangement mode similar to, for example, that of FIG. 35 (opposite in spiral direction). In the state of a finished product, the region where dynamic pressure grooves are arranged (thrust dynamic pressure generating portion) is opposed to a lower end surface 422b of the flange portion 422, and at the time of the rotation of the shaft member 402, a thrust bearing gap of a second thrust bearing portion T42 described below is formed between the region and the lower end surface 422b (refer to FIG. 33).

In this embodiment, the seal member 410 as a sealing means is formed of a metal material and a resin material separately from the housing 407, and is fixed to the inner periphery of the upper end of the housing 407 by arbitrary means such as press-fitting, bonding, or welding.

On the inner periphery of the seal member 410, there is formed a sealing surface 410a having a tapered surface, and a seal space S4 is formed between the sealing surface 410a and the outer peripheral surface of a shaft portion 421 described below. In the state in which the lubricating oil is filled inside the fluid dynamic bearing device 401, the oil surface of the lubricating oil is constantly maintained within the range of the seal space S4.

The shaft member 402 is constituted by the shaft portion 421 and the annular flange portion 422 having a hole provided at the center thereof, in which the lower end of the shaft portion 421 is fixed. As illustrated in FIG. 33, on the outer periphery of the shaft portion 421, there is formed a radial bearing surface 421a opposed in the radial direction to each of the regions where the dynamic pressure grooves 408a1 and 408a2 are arranged, the regions being provided on the inner peripheral surface 408a of the bearing sleeve 408. In this embodiment, two radial bearing surfaces 421a are provided while being axially separated from each other. Between those radial bearing surfaces 421a and 421a, there is provided a thinned portion 421b having a diameter smaller than that of the radial bearing surfaces 421a.

The lower end of the shaft portion 421 is press-fitted to the flange portion 422. Further, at the axial end portion of the press-fit region (bearing sleeve 408 side in this case) of the shaft portion 421 and the flange portion 422, there is provided a caulked portion 423 with respect to the flange portion 422.

Note that, it is preferable that the shaft portion 421 be formed of a material excellent in strength, rigidity, abrasion resistance, and the like, such as stainless steel, and that the flange portion 422 be formed of a material excellent in plastic workability at the time of the caulking process in comparison with that of the shaft portion 421, such as brass.

After the components described above are assembled, the inner space of the bearing (region indicated by scattered dots in FIG. 33) is filled with the lubricating oil, whereby the fluid dynamic bearing device 401 as a finished product is obtained. Here, as a lubricating oil filled in the fluid dynamic bearing device 401, various oils can be used. As a lubricating oil provided to the fluid dynamic bearing device for a disk drive such as an HDD, in consideration of changes in temperature during use and transportation thereof, it is possible to suitably use an ester-based lubricating oil excellent in low evaporation rate and low viscosity, for example, a lubricating oil including dioctyl sebacate (DOS) or dioctyl azelate (DOZ).

In the fluid dynamic bearing device 401 constituted as described above, when the shaft member 402 is rotated, the regions where the dynamic pressure grooves 408a1 and 408a2 of the bearing sleeve 408 are arranged are opposed to the radial bearing surfaces 421a and 421a of the bearing portion 421 through an intermediation of radial bearing gaps. Then, in accordance with the rotation of the shaft member 402, in any of the upper and lower regions where the dynamic pressure grooves 408a1 and 408a2 are arranged, the lubricating oil is pressed to an axial center m4 of the dynamic pressure grooves 408a1 and 408a2, and the pressure thereof is increased. Owing to the dynamic pressure effect of the dynamic pressure grooves 408a1 and 408a2 as described above, a first radial bearing portion R41 and a second radial bearing portion R42 for rotatably supporting the shaft member 402 in the radial direction in a non-contact manner are formed so as to be constituted at two positions while being separated from each other, respectively.

Simultaneously, in a thrust bearing gap between the region where the dynamic pressure grooves 408b1 are arranged, the region being provided to the lower end surface 408b of the bearing sleeve 408, and the upper end surface 422a of the flange portion 422 opposed thereto, and in a thrust bearing gap between the region where the dynamic pressure grooves are arranged, the region being provided to the upper end surface 409a of the lid member 409, and the lower end surface 422b of the flange portion 422 opposed thereto, oil films of the lubricating oil are respectively formed owing to the dynamic pressure effect of the dynamic pressure grooves. Then, owing to the pressures of the oil films, the first thrust bearing portion T41 and the second thrust bearing portion T42 for supporting the shaft member 402 in the thrust direction in a non-contact manner are constituted, respectively.

Hereinafter, an example of the manufacturing step of the shaft member 402 is described with reference to FIGS. 36 and 37.

Figure 36:
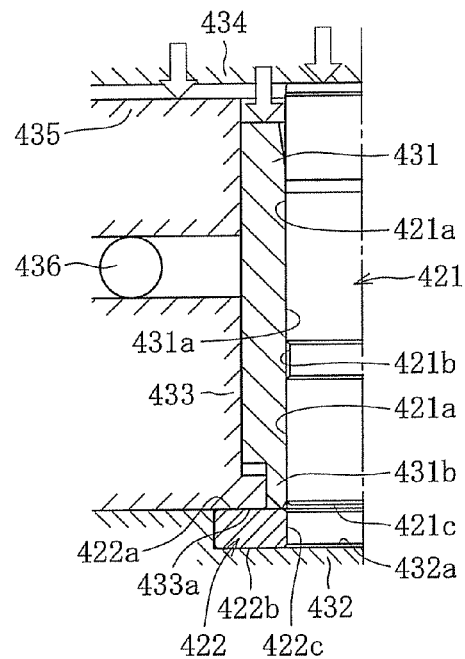
FIG. 36 is a sectional view conceptually illustrating an example of a manufacturing step of the shaft member.

FIG. 36 is a schematic view of a device used in an assembly of the shaft member 402. This device mainly includes a first jig 431 holding the shaft portion 421, a second jig 432 holding the flange portion 422 positioned below the first jig 431, and a third jig 433 capable of holding or binding the flange portion 422 with the second jig 432.

Further, in this embodiment, above the shaft portion 421, there is arranged a pressurizing member 434 for pushing-in the shaft portion 421 toward a side of the flange portion 422 by an appropriate drive mechanism. Between the pressurizing member 434 and the third jig 433, there are arranged a rigid member 435 and an elastic body 436, and when the rigid member 435 receives downward load from the pressurizing member 434, the load is transmitted to the third jig 433 through an intermediation of the elastic body 436. In this case, the elastic body 436 is compressed and deformed depending on the load, thereby absorbing compression and deformation of the third jig 433.

The first jig 431 has a hole 431a in which the shaft portion 421 is inserted and held. Further, an upper end surface 432a of the second jig 432 holds and binds the flange portion 422 together with a lower end surface 433a of the third jig 433 positioned thereabove. Therefore, a dimension and a shape of the hole 431a need to be formed highly accurately so as to hold and bind the radial bearing surfaces 421a and 421a of the shaft portion 421 without involving backlash. Similarly, shapes (flatness and the like) of the upper end surface 432a and the lower end surface 433a need to be formed highly accurately so as to hold and bind without gap the both end surfaces 422a and 422b of the flange portion 422 including the thrust bearing surface.

In addition, in the shaft member 402 of this type, bearing performance depends on perpendicularity between the radial bearing surface 421a and the thrust bearing surface (upper end surface 422a). Therefore, in order that high perpendicularity can be obtained between those bearing surfaces, it is preferable to increase the perpendicularity between the hole 431a and the upper end surface 432a, and between the hole 431a and the lower end surface 433a by performing highly accurate working thereon. As a matter of course, both the jigs 432 and 433 are subjected to highly accurate working so that high parallelism can be obtained between the upper end surface 432a and the lower end surface 433a, which axially bind the flange portion 422.

Figure 37A:
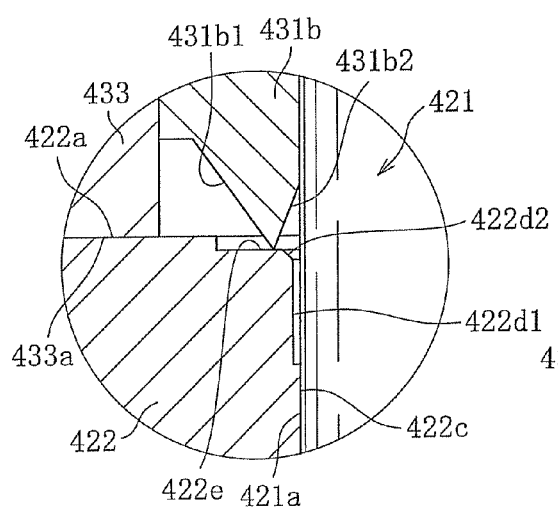
FIG. 37A is an enlarged sectional view illustrating an example of the flange portion before being subjected to the caulking process after press-fitting and of the plastic working portion for performing the caulking process on the flange portion.
Figure 37B:
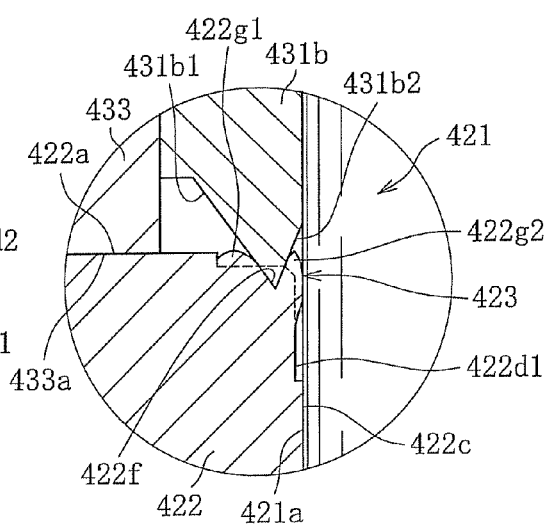
FIG. 37B is an enlarged sectional view illustrating an example of the flange portion in the state of being subjected to the caulking process by the plastic working portion.

Below the first jig 431, there is provided a plastic working portion 431b for performing a caulking process on an inner periphery of the flange portion 422 along with lowering of the first jig 431 and for forming the caulked portion 423 with the shaft portion 421. In this embodiment, as illustrated in FIG. 37A, the plastic working portion 431b has, over the entire periphery thereof, a shape in which radial width dimension thereof becomes smaller toward the lower end side (as becoming closer to flange portion 422 side), and includes a first tapered surface 431b1 positioned on the outer peripheral side thereof, and a second tapered surface 431b2 positioned on the inner peripheral side thereof.

Here, regarding a shape of the flange portion 422 facing the plastic working portion 431b, on an inner peripheral surface 422c of the flange portion 422 constituting a hole into which the shaft portion 421 is to be press-fitted, there is formed a larger diameter surface 422d1 having a diameter larger than that of a press-fitted portion of the shaft portion 421. Here, the larger diameter surface 422d1 is provided on a side of the upper end surface 422a of the inner peripheral surface 422c to be subjected to caulking process, and an inner diameter dimension thereof is appropriately determined so that a gap capable of exerting an absorbing function of deformation described below (for example, gap of several µm to several dozen µm) is formed between the larger diameter surface 422d1 and the shaft portion 421. Further, at the stage before press-fitting, an inner diameter of the inner peripheral surface 422c excluding the larger diameter surface 422d1 is, in expectation of a predetermined press-fit allowance, formed so as to be smaller than the outer diameter of the lower end portion of the shaft portion 422 to be press-fitted.

Further, on an inner periphery of the upper end surface 422a of the flange portion 422, there is formed a relief portion obtained by excluding a part of the flange portion 422 when assuming that the flange portion 422 has an entirely flat upper end surface 422a. In the case of flange portion 422 illustrated in FIG. 37A, the relief portion is constituted by a lower flat surface 422e retracted by a predetermined amount toward the side of the lower end surface 422b from the same flat position as the upper end surface 422a through a step, and the lower flat surface 422e and the larger diameter surface 422d1 are continuous with each other through a tapered surface 422d2 provided to the inner peripheral side thereof. In this case, in the state of installing the shaft portion 421 and the flange portion 422 to the jigs 431 to 433, the plastic working portion 431b is positioned above the lower flat surface 422e of the flange portion 422, or brought into contact with the lower flat surface 422e.

Hereinafter, there is described an example of an assembly step of the shaft member 402 when using a device having the above-mentioned structure. In this embodiment, there is described the case where downward load is applied to the shaft portion 421, the rigid member 435, and the first jig 431 in this order, and substantial press-fitting and caulking processes are performed while the flange portion 422 is bound.

First, from the state illustrated in FIG. 36, the pressurizing member 434 is lowered, and the lower end of the shaft portion 421 is press-fitted into the hole of the flange portion 422. Then, at the stage at which press-fit posture of the shaft portion 421 with respect to the flange portion 422 is stabilized, the rigid member 435 is started to be pushed-in downward by the pressurizing member 434, whereby downward load is transmitted to the third jig 433 through an intermediation of the elastic body 436. Therefore, the press-fitting of the shaft portion 421 progresses in the state in which both the end surfaces 422*a* and 422*b* of the flange portion 422 are bound between the third jig 433 and the second jig 432.

At the stage at which press-fitting of the shaft portion 421 is continued in the state of binding the flange portion 422 as described above, and the press-fitting thereof is completed to some extent, the pressurizing member 434 is brought into contact with the first jig 431, and the first jig 431 is pushed-in toward the lower flat surface 422*e* (relief portion) of the flange portion 422. In this manner, by performing plastic working (caulking process) on the relief portion by the plastic working portion 431*b* provided at the lower end of the first jig 431, a concave portion 422*f* having a shape conforming to the plastic working portion 431*b* is formed in the portion on which the caulking process is performed. Further, due to plastic flow (plastic deformation) toward the inner peripheral side generated in accordance with formation of the concave portion 422*f*, a gap between the larger diameter surface 422*d*1 and the shaft portion 421 is partially filled and a part of the flange portion 422 is pushed to the shaft portion 421. With this, a caulking fixation portion 423 is formed at a position adjacent to the gap remained between the flange portion 422 and the shaft portion 421. The above-mentioned caulking process is continuously performed while the flange portion 422 is bound.

In this case, on an outer peripheral side of the concave portion 422*f* formed on the lower flat surface 422*e* as the relief portion, a hump portion (first hump portion) 422*g*1 is formed by caulking process. In this embodiment, the caulking process is performed at a position apart from radially outer end of the lower flat surface 442*e* to the inner peripheral side, and hence the first hump portion 422*g*1 is generated on the lower flat surface 422*e* between the concave portion 422*f* and the upper end surface 422*a*. Further, on the inner peripheral side of the concave portion 422*f* formed by caulking process, there is formed a second hump portion 422*g*2.

In this way, at the stage at which the shaft portion 421 is press-fitted to the flange portion 422, and the caulking fixation portion 423 is formed between the shaft portion 421 and the flange portion 422, lowering of the pressurizing member 434 is stopped, and the integrated assembly formed of the shaft portion 421 and the flange portion 422 is taken out from the jigs 431 to 433, thereby obtaining the shaft member 402 as the finished product. In this embodiment, the pressurizing member 434 is stopped at the stage at which the first jig 431 is pushed in until a lower end surface 421*c* of the shaft portion 421 is brought into contact with the upper end surface 432*a* of the second jig 432 (at the stage at which flange portion 422 is plastically deformed), and the assembled product (shaft member 402) is taken out.

In this way, the shaft portion 421 is press-fitted to the flange portion 422, and the flange portion 422 is partially plastically deformed by the caulking process to form the caulking fixation portion 423 between the shaft portion 421 and the flange portion, whereby it is possible to impart between the shaft portion 421 and the flange portion 422 fastening force by press-fitting and fastening force by caulking, and possible to improve fixation strength. Further, deformation (plastic deformation) of the flange portion 422 partially occurs, and hence it is possible to improve the fixation strength in the state of maintaining high shape accuracy (perpendicularity) obtained at the time of press-fitting, or high surface accuracy obtained at the time of working of individual components.

Further, on the inner peripheral surface 422*c* of the flange portion 422, there is provided the larger diameter surface 422*d*1 as a larger diameter portion. In the state of press-fitting the shaft portion 421, a gap is formed with the outer peripheral surface of the shaft portion 421, and the gap is filled by deformation of the flange portion 422 due to caulking process. By performing caulking process in this manner, the deformation (plastic flow) of the flange portion 422 generated at the time of caulking process is absorbed by the gap between the larger diameter surface 422*d*1 and the shaft portion 421, whereby deformation amount to the outer peripheral side with respect to the portion subjected to the caulking (concave portion 422*f* in this case) is reduced. Therefore, it is possible to prevent deformation such as warp generated entirely in the flange portion 422 due to press-fitting from being promoted by caulking process performed on any end surface (upper end surface 422*a* in this case), and possible to maintain flatness of the upper end surface 422*a* and the lower end surface 422*b* constituting the thrust bearing surfaces, and perpendicularity with respect to the shaft portion 421 to be highly accurate.

Further, as in this embodiment, by forming the gap between the larger diameter surface 422*d*1 and the shaft portion 421 on the inner peripheral side (inner side in the radial direction) of the concave portion 422*f* formed by caulking process, plastic deformation becomes more likely to be generated toward the shaft portion 421 side at the time of caulking process, and hence the deformation to the outer peripheral side can be further reduced.

With this, the upper end surface 422*a* is prevented from being pushed and extended toward the outer peripheral side as much as possible, whereby deformation of the entire flange portion 422 can be reduced. Particularly in this embodiment, press-fitting and caulking processes are performed on the flange portion 422 having the larger diameter surface 422*d*1 formed between the shaft portion 421 and the flange portion 422 in advance in a region where the caulking fixation portion 423 is to be formed, and hence it is possible to form the caulking fixation portion 423 by deformation generated on the inner peripheral side of the flange portion 422 due to caulking process, in a region on which the press-fit fixation is not performed. Therefore, fixing force by the caulking fixation portion 423 can be effectively obtained.

Further, in this embodiment, the lower flat surface 422*e* is provided in advance as the relief portion on the inner periphery of the upper end surface 422*a* of the flange portion 422, and the caulking process is performed on the lower flat surface 422*e*, and hence the plastic flow generated by the caulking process is absorbed by the relief portion (step between upper end surface 422*a* and lower flat surface 422*e*) formed in the periphery of the concave portion 422*f*. Therefore, it is possible to reduce the amount of plastic deformation (plastic flow) generated toward the outer peripheral side of the concave portion 422*f* to reduce height of the first hump portion 422*g*1. In particular, as in this embodiment, in the case where the first hump portion 422*g*1 is formed on the lower flat surface 422*e*, it is possible to reduce the protruding amount of the first hump portion 422*g*1 to a bearing sleeve 408 side with respect to the thrust bearing surface by the amount of step between the lower flat surface 422e and the upper end 422a. With this, it is possible to relax or cancel the interference of the first hump portion 422g1 with the thrust bearing surface, and hence it is possible to exert excellent bearing performance. Specifically, by setting protruding height of the first hump portion 422g1 from the thrust bearing surface to be equal to 3 μm or less, or preferably equal to 2 μm or less, it is possible to prevent substantial interference with the bearing performance, and good bearing performance can be ensured.

Further, in this embodiment, of the press-fitting step and the caulking step, at least caulking process is performed in the state in which both the end surfaces 422a and 422b of the flange portion 422 are bound, and hence it is possible to perform caulking while maintaining the posture of the flange portion 422 with respect to the shaft portion 421 at the time of press-fitting. Further, it is possible to perform caulking while maintaining surface accuracy of both the end surfaces 422a and 422b to be bound. In particular, as in this embodiment, in the case of adopting the structure in which the load (binding force) to the flange portion 422 is increased in accordance with the lowering amounts of the pressurizing member 434 and the rigid member 435, the flange portion 422 is bound with higher binding force than that imparted at the time of press-fitting. Therefore, even if, at the time of press-fitting, positional deviation or the like is generated between the shaft portion 421 and the flange portion 422, it is possible to correct such positional deviation by binding of the jigs 431 to 433.

Further, in this embodiment, even at the time of press-fitting, the flange portion 422 is bound by the second and third jigs 432 and 433, and hence it is possible to press-fit the shaft portion 421 in the state of appropriately maintaining the press-fit posture of the shaft portion 421 with respect to the flange portion 422, or while correcting flatness and runout accuracy (perpendicularity) of both the end surfaces 422a and 422b of the flange portion 422. Further, if press-fitting is performed while appropriately maintaining the press-fit posture, there is no fear that positional deviation after press-fitting is generated, which is preferable.

Further, as in this embodiment, in the case of performing press-fitting of the shaft portion 421 along with correction, press-fitting can be performed while involving a considerable amount of press-fit allowance, and fixation means combined with press-fitting and bonding can be also adopted. In the case of using press-fitting and bonding simultaneously, it is possible to make reinforcement of the fixation strength by the adhesive, and hence light press-fitting or the like can be adopted. If it suffices that the press-fit allowance is small, assembly accuracy is easily obtained by that much. Therefore, by performing press-fit fixation along with caulking, it is possible to obtain the shaft member 402 excellent in fixation strength and shape accuracy (assembly accuracy).

Hereinabove, a structural example and a manufacturing step example of the shaft member 402 according to the fourth embodiment of the present invention are described. However, the present invention is not limited thereto, and it is possible to adopt a structure and a step other than the above.

Figure 38A:
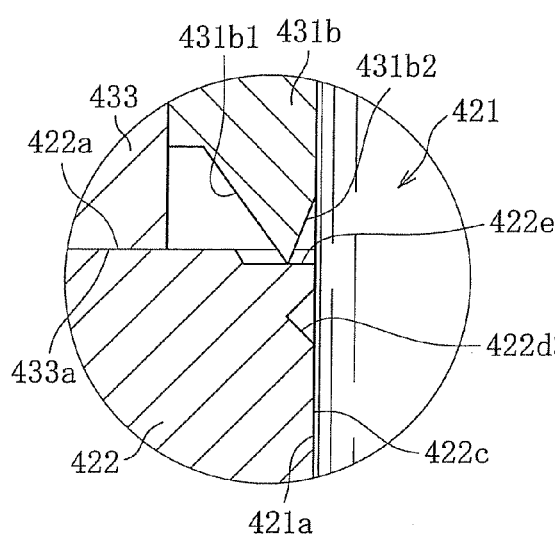
FIG. 38A is an enlarged sectional view illustrating another example of the flange portion before being subjected to the caulking process after of press-fitting and of the plastic working portion for performing the caulking process on the flange portion.

For example, in the above-mentioned embodiment, there is described the case where the gap with the outer peripheral surface of the shaft portion 421 is constituted by the larger diameter surface 422d provided to the upper end surface 422a side of the inner peripheral surface 422c, but it is also possible to adopt a mode other than the above. That is, as long as the plastic deformation generated by the caulking process on the flange portion 422 can be absorbed by the gap formed between the shaft portion 421 and the larger diameter portion due to the press-fitting, it is possible to adopt arbitrary shape and arrangement mode. FIG. 38A illustrates one example thereof, and a notched groove 422d3 as the larger diameter portion is formed on the inner peripheral surface 422c of the flange portion 422 to which the shaft portion 421 is to be press-fitted. In this case, the notched groove 422d3 is formed so that a part thereof is positioned axially directly below the concave portion 422f formed through the caulking process.

Figure 38B:
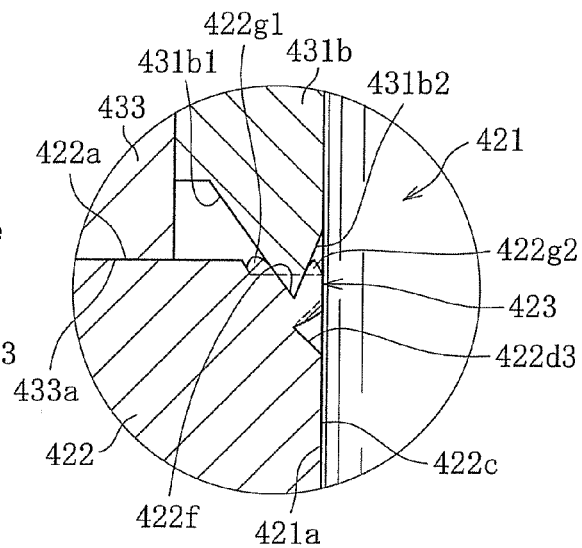
FIG. 38B is an enlarged sectional view illustrating another example of the flange portion in the state of being subjected to the caulking process by the plastic working portion.

In this case, as illustrated in FIG. 38B, deformation generated toward the inner peripheral side of a portion subjected to caulking process (concave portion 422f), or deformation (plastic flow) generated toward a low side in the axial direction is absorbed by a gap between the shaft portion 421 and the notched groove 422d3 positioned below the concave portion 422f and an inner side thereof. Therefore, it is possible to reduce the deformation generated toward the outer peripheral side thereof due to caulking process, and the shape of the flange portion 422 including the thrust bearing surface can be maintained to be good.

As a matter of course, as long as the plastic deformation of the flange portion 422 due to the caulking process can be absorbed, the gap between the flange portion 422 and the shaft portion 421 is not always necessary. For example, in the press-fit states, a hollow portion may be formed in the flange portion 422, and the deformation of the flange portion 422 due to the caulking process may be absorbed by the hollow portion. The hollow portion may be formed by, for example, closing a part of the inner peripheral surface 422c of the flange portion 422 in accordance with the press-fitting of the shaft portion 421.

Note that, in any of the embodiments, it is preferable for the portion absorbing the deformation (gap, hollow portion) to be entirely formed into a uniform shape. Further, in this case, the caulking process is preferably performed on the entire periphery of the upper end surface 422a of the flange portion 422. With the above-mentioned structure and the working mode, the deformation of the flange portion 422 becomes more uniform, and accuracy of the thrust bearing surface can be further enhanced.

Further, in the above description, there is described the case where the relief portion is constituted by the lower flat surface 422e formed through an intermediation of the step with the upper end surface 422a. However, as long as providing the effect of reducing the hump (first hump portion 422g1) generated on the outer peripheral surface side of the concave portion 422f, various modes can be adopted. For example, while not shown, it is possible to form the relief portion by multiple tapered surfaces. In this case, there can be exemplified a structure in which a tapered surface on the outer peripheral side is continuous with the upper end surface 422a at the outer peripheral end thereof, and a tapered surface on the inner peripheral side is continuous with the inner peripheral surface 422c (or larger diameter surface 422d1) at the inner peripheral end thereof.

Further, the plastic working portion 131b is not limited to the above-mentioned example, and an arbitrary mode can be adopted.

Further, in this embodiment, the case where the caulking fixation portion 423 is provided at the axial upper end (on the side of upper end surface 422a) of the press-fit region between the shaft portion 421 and the flange portion 422 is exemplified. However, the caulking process may be performed not only on the side of the upper end surface 422a but also on the inner periphery of the lower end surface 422b of the flange portion 422 by an appropriate jig. In this case, the caulking fixation portions 423 are formed at the axial both ends of the flange portion 422, and hence it is possible to determine whether or not caulking is performed on the other end side in accordance with the required retention force (fixing force) and the application therefor. Alternatively, in accordance with variation of press-fitting force, instead of adjusting the caulking force on one end side, it is possible to determine whether or not caulking is performed on the other end side.

Further, in this embodiment, there is described the case where the first jig 431 and the pressurizing member 434 are brought into contact with each other at the stage of pushing in (press-fitting) the shaft portion 421 until a slight gap is generated between the lower end surface 421c of the shaft portion 421 and the upper end surface 432a of the second jig 432 opposed thereto. However, plastic working of the flange portion 422 by the plastic working portion 431b may be started after completion of press-fitting of the shaft portion 421. If the caulking step of the flange portion 422 is started at the point in time when press-fitting is completely terminated, it is possible to further increase the fixing force by the caulking fixation portion 423.

In this case, the shaft portion 421 and the plastic working portion 431b may be formed so as to be respectively pressurized and lowered by different drive mechanisms.

Further, while in the above-mentioned embodiment, binding of the second jig 432 and the third jig 433 by the flange portion 422 is started after the start of the shaft portion 421, the binding thereof may be simultaneously started with the press-fitting. Alternatively, when aiming to correct positional deviation caused by press-fitting, it is also possible to start the binding (correction) thereof at an arbitrary stage in the caulking step a little before the finish of the press-fitting, or after the completion of the press-fitting.

Further, in the above-mentioned embodiment, there is exemplified the case in which the shaft portion 421 is press-fitted into the hole of the flange portion 422 of the shaft portion 421, and the plastic working portion 431b is lowered to the position at which the lower end surface 421c of the shaft portion 421 is brought into contact with the upper end surface 432a of the second jig 432. However, the above-mentioned press-fitting and caulking mode is merely one example. For example, for the purpose of compensating dimension tolerance (average value, or allowable width thereof) generated from respective working processes of the shaft portion 421 and the flange portion 422, it is also possible to set the caulking condition (caulking load, caulking amount of the caulking jig, and the like) based on press-fitting force when press-fitting the shaft portion 421 to the flange portion 422.

Further, the present invention is also applied to the fluid dynamic bearing device having a structure other than the above-mentioned structure.

For example, in the above-mentioned embodiment, there is exemplified the case where the outer peripheral surface of the shaft portion 421 is used as the radial bearing surface 421a, and each of the upper end surface 422a and the lower end surface 422b of the flange portion 422 is used as the thrust bearing surface. However, the present invention is not limited thereto. For example, the present invention can be also applied to the shaft member of the fluid dynamic bearing device of a structure in which only the upper end surface 422a of the end surfaces 422a and 422b is used as the thrust bearing surface.

Figure 39:
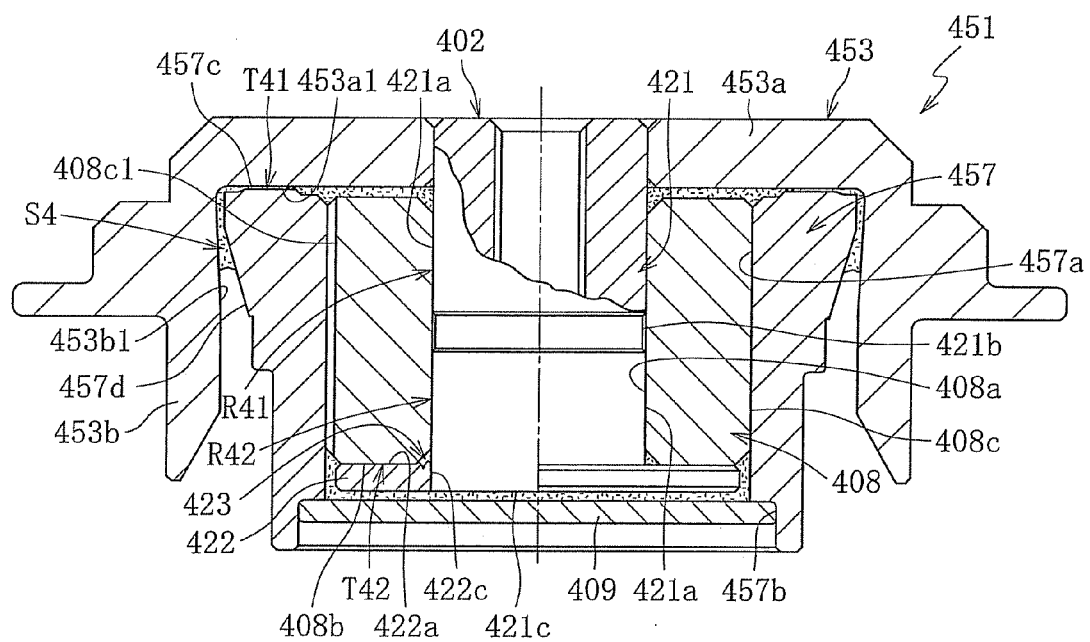
FIG. 39 is a sectional view of a fluid dynamic bearing device according to another structure.

FIG. 39 is a sectional view of the fluid dynamic bearing device 451 according to other structure. The characteristics (differences from fluid dynamic bearing device 401 of FIG. 33) are as follows. That is, in the fluid dynamic bearing device 451, a hub 453 fixed to the upper end (opposite side to flange portion 422) of the shaft portion 421 mainly includes a disk portion 453a positioned on the opening side (upper side) of the housing 457 and a cylindrical portion 453b extending downward in the axial direction from the outer peripheral portion of the disk portion 453a. Further, on an upper end surface 457c of a housing 457, there is provided dynamic pressure grooves arranged region having an arrangement mode as illustrated in, for example, FIG. 35 (opposite in spiral direction), and the thrust bearing gap of the thrust bearing portion T42 is formed with a lower end surface 453a1 of the opposed disk portion 453a.

On an outer periphery of the housing 457, there is formed a tapered sealing surface 457d having a diameter gradually increased upward. The tapered sealing surface 457d forms, with an inner peripheral surface 453b1 of the cylindrical portion 453b, an annular seal space S4 having a radial dimension gradually increased toward the opening side (upper side) from the closed side (lower side) of the housing 457. Note that, in FIG. 39, an inner peripheral surface 457a and a fixing surface 457b of the housing 457 correspond to the inner peripheral surface 407a and the fixing surface 407b of the housing 407 of FIG. 33, respectively. The structure other than the above is the same the structure illustrated in FIG. 33, and hence description thereof is omitted.

Even in the case of using only the upper end surface 422a of the flange portion 422 as the thrust bearing surface as described above, it is possible to reduce, by using both press-fitting and caulking and performing the caulking process in the state of forming a gap with the shaft portion 421 by the larger diameter portion provided to the inner periphery of the flange portion 422, the effect by the plastic deformation at the caulking process on the shape accuracy of the flange portion. As a result, it is possible to maintain surface accuracy of the radial bearing surface 421a and the thrust bearing surface, and perpendicularity between those bearing surfaces at high level. As a matter of course, the shaft member 402 having high fixing strength can be obtained by press-fitting and caulking.

Note that, while in the above-mentioned embodiment, the housings 407 and 457, and the bearing sleeve 408 are separated, it is also possible to integrate (integrally form by the same material, or insert one member and mold the other member) two or more members selected from members constituting the fixed side of the fluid dynamic bearing devices 401 and 451 in a range capable of assembling. For example, in the structure illustrated in FIG. 33, the housing 407 and the bearing sleeve 408, the housing 407 and the lid member 409, and the housing 407 and the seal member 410 can be integrated. It is also possible to integrate the housing 407, the bearing sleeve 408, and the seal member 410. Further, in the structure illustrated in FIG. 39, the housing 457 and the bearing sleeve 408, or the housing 457 and the lid member 409 can be integrated. As a matter of course, the present invention can be also applied to a shaft member integrally having a flange portion provided with a sealing surface on an outer periphery thereof.

Hereinafter, a fifth embodiment of the present invention is described with reference to FIG. 40 to FIG. 51. Herein, the fifth embodiment is an example of the embodiment according to the first aspect of the present invention.

Figure 40:
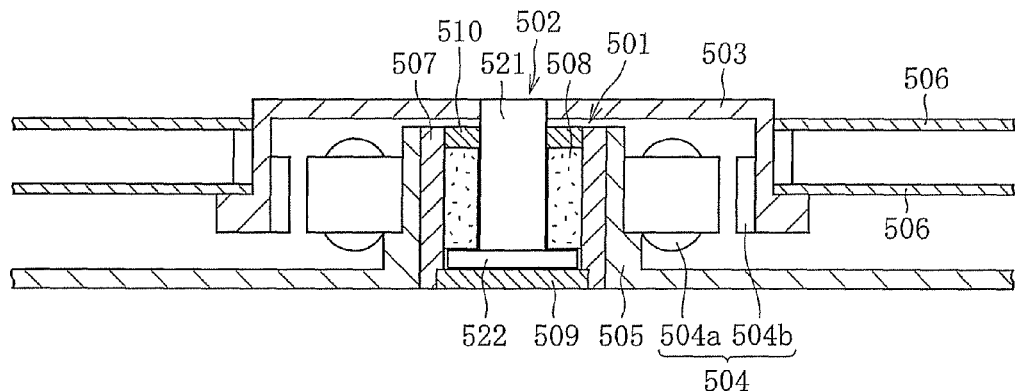
FIG. 40 is a sectional view of a spindle motor for an information apparatus provided with a fluid dynamic bearing device according to a fifth embodiment of the present invention.

FIG. 40 conceptually illustrates a structural example of a spindle motor for an information apparatus, incorporating the fluid dynamic bearing device. The spindle motor is used for a disk drive such as an HDD, and mainly includes a fluid dynamic bearing device 501 for rotatably supporting a shaft member 502, a disk hub 503 attached to the shaft member 502, a stator coil 504a and a rotor magnet 504b opposed to each other through an intermediation of, for example, a radial gap, and a bracket 505. The stator coil 504a is attached to an outer periphery of the bracket 505, and the rotor magnet 504b is attached to an inner periphery of the disk hub 503. A housing 507 of the fluid dynamic bearing device 501 is attached to an inner periphery of the bracket 505. The disk hub 503 holds one or multiple disks 506 such as magnetic disks. In the spindle motor having the above-mentioned structure, when the stator coil 504a is energized, the rotor magnet 504b rotates due to electromagnetic force between the stator coil 504a and the rotor magnet 504b, whereby the disk 506 held in the disk hub 503 rotates integrally with the shaft member 502.

Figure 41:
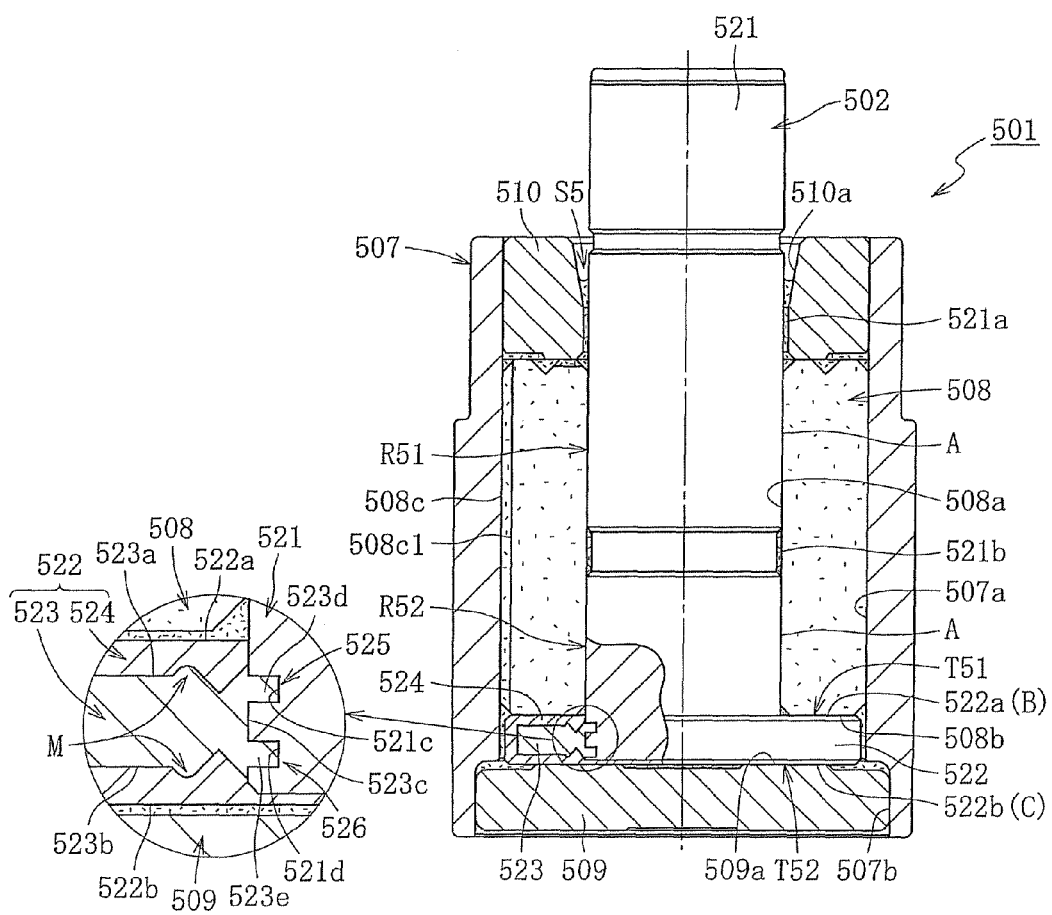
FIG. 41 is a sectional view of the fluid dynamic bearing device.

FIG. 41 illustrates the fluid dynamic bearing device 501 according to the fifth embodiment of the present invention. The fluid dynamic bearing device 501 illustrated in the figure includes the housing 507, a bearing sleeve 508 fixed to an inner periphery of the housing 507, the shaft member 502 inserted into an inner periphery of the bearing sleeve 508, a lid member 509 for sealing an opening at one end of the housing 507, and a seal member 510 for sealing an opening at the other end of the housing 507. Note that, for the sake of convenience in description, the description is hereinafter made on the assumption that a side of the seal member 510 is an upper side, and a side axially opposite thereto is a lower side.

The housing 507 is formed into a cylindrical shape by a metal material or a resin material. To an inner peripheral surface 507a of the housing 507, the bearing sleeve 508 is fixed by an appropriate means such as bonding, press-fitting, welding, and the like. On a lower end side of the inner peripheral surface 507a, a lid member fixing surface 507b having a diameter larger than that of the inner peripheral surface 507a.

The bearing sleeve 508 is formed into a cylindrical shape by a porous body of a sintered metal containing, for example, copper as an main component. The bearing sleeve 508 may also be formed by, other than the sintered metal, a soft metal material such as brass or other porous body other than the sintered metal (for example, porous resin).

Figure 42:
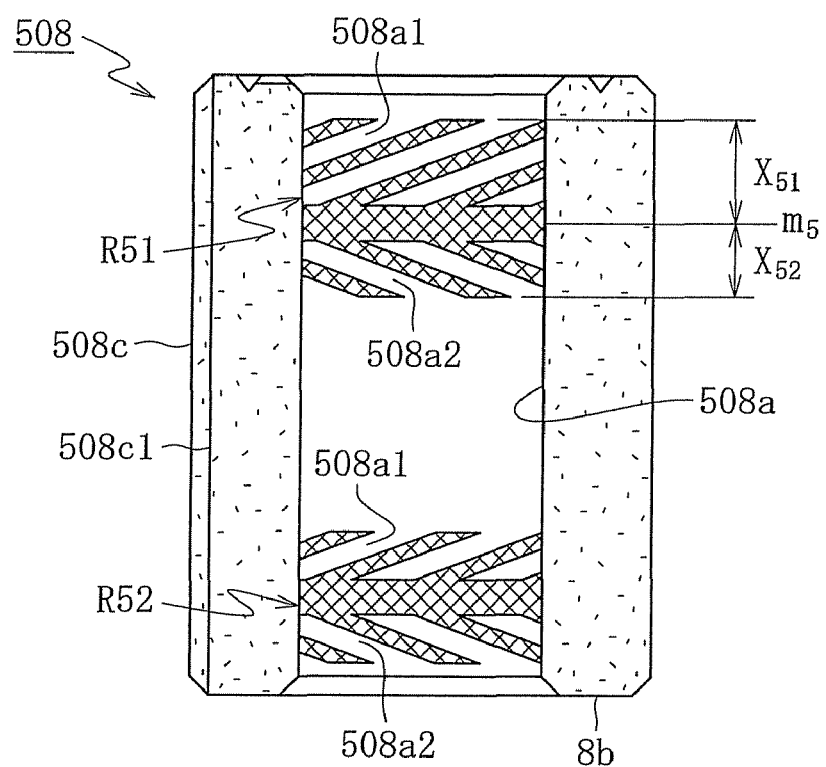
FIG. 42 is a sectional view of the bearing sleeve.

As illustrated in FIG. 42, on an inner peripheral surface 508a of the bearing sleeve 508, regions where multiple dynamic pressure groves 508a1 and 508a2 are arranged in a herringbone pattern are formed as a radial dynamic pressure generating portion at two points of the upper and lower positions while being separated from each other. In this embodiment, the upper dynamic pressure grooves 508a1 are formed to be axially asymmetrical with respect to an axial center m5 (axial center of a region between upper and lower inclined grooves), and an axial dimension X51 of a region above the axial center m5 is larger than an axial dimension X52 of a region therebelow. On the other hand, the lower dynamic pressure grooves 508a2 are formed to be axially symmetrical, and axial dimensions of the upper and lower regions thereof are equal to the axial dimension X52. By forming the dynamic pressure grooves in accordance with the above-mentioned aspect, during operation of the bearing device, fluid (for example, lubricating oil) filling a gap between the inner peripheral surface 508a of the bearing sleeve 508 and the outer peripheral surface 521a of the shaft portion 521 positively flows downward. Note that, the dynamic pressure grooves may be formed on a radial bearing surface A of the shaft portion 521 described below, and the pattern thereof may be other well-known pattern such as a spiral pattern.

On an outer peripheral surface 508c of the bearing sleeve 508, one or multiple axial grooves 508c1 opened to both end surfaces are formed. The axial groove 508c1 is provided for causing the lubricating oil filled in the inside of the bearing to flow and circulate therethrough, and during operation, the lubricating oil flows and circulates in the inside of the bearing through a fluid path formed by the axial groove 508c1 and the inner peripheral surface 507a of the housing 507. With this, an imbalanced state of pressure in the inside of the bearing is canceled, and leakage of the lubricating oil and generation of a vibration can be efficiently prevented.

The lid member 509 is formed into a disc-like shape by, for example, the metal material or the resin material, and fixed to the lid member fixing surface 507b of the housing 507 by an appropriate means such as bonding or press-fitting.

The seal member 510 is formed into a ring shape by the soft metal material such as brass, other metal material, or the resin material, fixed to an upper end portion of the inner peripheral surface 507a of the housing 507 by an appropriate means such as bonding, press-fitting, and the like. A predetermined seal space S5 is formed between the inner peripheral surface 510a of the seal member 510 and the outer peripheral surface 521a of the shaft member 521. The seal space S5 has a buffer function for absorbing a volumetric change amount accompanied with a temperature change of the lubricating oil filled in the fluid dynamic bearing device 501, and a oil surface of the lubricating oil is always within the seal space S5 in a range of supposable temperature change.

The shaft member 502 includes the shaft portion 521 and a thrust member 522 provided at the lower end of the baring portion 521, and has a hybrid structure of metal and resin as a whole. Specifically, while the shaft portion 521 is formed of the metal material, the thrust member 522 includes a metal-made flange portion 523 in which the lower end of the shaft portion 521 is inserted into a hole portion 523c provided to a shaft center, and a resin-made cover portion 524 covering a surface of the flange portion 523. The hole portion 523c is a though-hole opened to both end surfaces 523a and 523b of the flange portion 523. In this embodiment, the shaft portion 521 is formed of stainless steel, and the flange portion 523 is formed of soft metal having lower rigidity than that of the shaft member 521, such as brass.

On the outer peripheral surface 521a of the shaft portion 521, there are formed the radial bearing surfaces A and A, which are formed into smooth cylindrical surface shapes and opposed to regions where the dynamic pressure grooves 508a1 and 508a2 provided on the inner peripheral surface 508a of the bearing sleeve 508 are formed. The radial bearing surfaces A and A are formed at two points axially separate from each other. Between the radial bearing surfaces A and A, there is formed a thinned portion 521b having a diameter smaller than that of the radial bearing surface A. Further, though description is made in detail below, at the lower end of the shaft portion 521, there are formed first and second accommodating portions 521c and 521d for accommodating first and second protruding portions 523d and 523e of the flange portion 523. In this embodiment, the first and second accommodating portions 521c and 521d are formed as annular recessed grooves.

Figure 43:
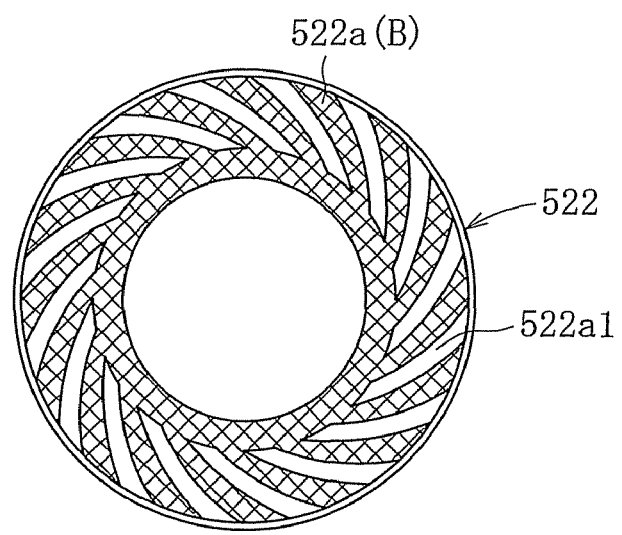
FIG. 43 is a plan view illustrating one end surface of a thrust member.

To an upper end surface 522a (cover portion 524) of the thrust bearing member 522, there is provided a region constituting a thrust bearing surface B for forming a thrust bearing gap together with a lower end surface 508b of the bearing sleeve 508. As illustrated in FIG. 43, for example, in the thrust bearing surface B, multiple dynamic pressure grooves 522a1 are arranged in a spiral pattern as the thrust dynamic pressure generating portion. Further, on the lower end surface 522b of the thrust member 522b (cover portion 524), there is provided a region constituting a thrust bearing surface C for forming a thrust bearing gap together with a lower end surface 509a of the lid member 509. On the thrust bearing surface C, while not shown, multiple dynamic pressure grooves are arranged in the spiral pattern as the thrust dynamic pressure generating portion. Note that, the dynamic pressure grooves provided on the thrust bearing surfaces B and C may be arranged in other well-known patterns such as a herringbone pattern. Further, the thrust bearing surfaces B and C may be formed into a smooth flat surface, and the dynamic pressure grooves may be formed on the lower end surface 508b of the bearing sleeve 508 and the upper end surface 509 of the lid member 509.

The fluid dynamic bearing device 501 is mainly formed of the above-mentioned components, and the lubricating oil is filled in the inner space of the housing 507 sealed by the seal member 510, the inner space including inner air cavities of the bearing sleeve. Various types of lubricating oils can be used. However, in consideration with a temperature change during use and transportation, it is suitable to use an ester-based lubricating oil having low evaporation rate and viscosity, such as dioctyl sebacate (DOS), dioctyl azelate (DOZ), and the like.

In the fluid dynamic bearing device 501 having the above-mentioned structure, when the shaft member 502 rotates, the radial bearing gaps are formed between the regions where the dynamic pressure grooves 508a1 and 508a2 of the bearing sleeve 508 are formed and the radial bearing surfaces A and A of the shaft member 521. Further, in accordance with rotation of the bearing member 502, the oil film formed in a radial bearing gap is enhanced in its oil film rigidity due to a dynamic pressure effect of the dynamic pressure grooves 5081 and 508a2, whereby the shaft member 502 is rotatably supported in a non-contact manner in the radial direction. With this, radial bearing portions R51 and R52 for rotatably supporting the shaft member 502 in the radial direction are formed at two points in the axial direction so as to be separated from each other.

Further, at the same time, thrust bearing gaps are formed between the thrust bearing surfaces B and C of the thrust member 522, and the lower end surface 508b of the bearing sleeve 508 and the upper end surface 509a of the lid member 509, respectively. Then, in accordance with the rotation of the shaft member 502, the oil film formed in both the thrust bearing gaps is enhanced in its oil film rigidity due to the dynamic pressure effect of the dynamic pressure grooves, whereby the shaft member 502 is rotatably supported in a non-contact manner in the thrust directions. With this, a first thrust bearing portion T51 and a second thrust bearing portion T52 for rotatably supporting the shaft member 502 in a non-contact manner are formed.

Next, a manufacturing method for the shaft member 502 used in the above-mentioned fluid dynamic bearing device 501 is described with reference to FIG. 44 to FIG. 48B. Note that, the shaft member 502 is manufactured through an assembly step of fixing the flange portion 523 to the lower end of the shaft portion 521, and an injection molding step of injection-molding the cover portion 524 covering the surface of the flange portion 523.

(A) Assembly Step

FIG. 44 to FIG. 47 conceptually illustrate an example of the assembly step of fixing the flange portion 523 to the lower end of the shaft portion 521. The device illustrated in the figures mainly includes a caulking die 531 holding the shaft portion 521 in an inner periphery thereof, a lower die 532 positioned below the caulking die 531 and holding the flange portion 523, a first intermediate die 533 binding the flange portion 523 in cooperation with the lower die 532, and an upper die 534 pushing the shaft portion 521 into a side of the flange portion 523 by an appropriate drive mechanism. Further, between the first intermediate die 533 and the upper die 534, there is arranged a second intermediate die 535. An elastic member 536 is interposed between the first intermediate die 533 and the second intermediate die 535. When downward load is applied from the upper die 534, the load is transmitted from the second intermediate die 535 to the first intermediate die 533 through an intermediation of the elastic member 536. The elastic member 536 compressed and deformed in accordance with the load, thereby a downward displacement of the second intermediate die 535 is absorbed.

Figure 44:
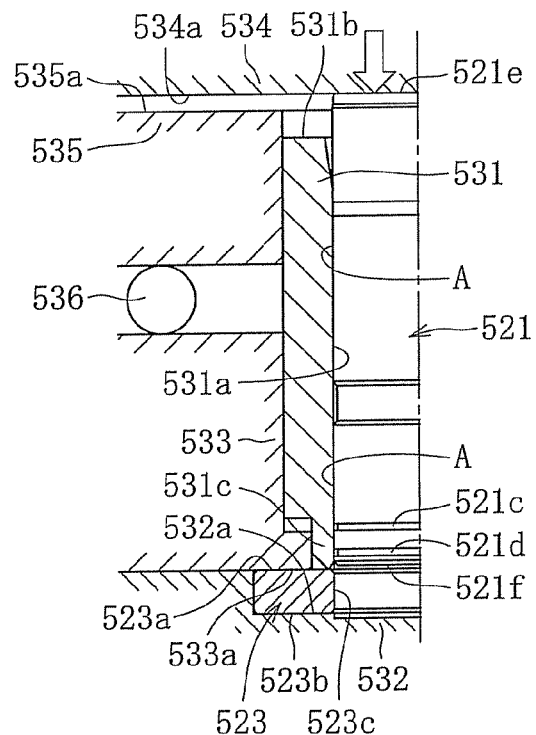
FIG. 44 is a sectional view conceptually illustrating an example of an assembly step of a shaft member and a flange portion.

Note that, at a stage at which the shaft portion 521 and the flange portion 523 are installed as illustrated in FIG. 44, the upper and lower end surfaces 523a and 523b of the flange portion 523 are formed into a smooth and flat surface without asperity. Further, the hole portion 523c of the flange portion 523 is formed to have a diameter slightly smaller than an outer diameter dimension of the shaft portion 521 so as to allow the shaft portion 521 to be press-fitted with a predetermined press-fit allowance.

The caulking die 531 includes a holding hole 531a for holding the shaft portion 521, and a plastic working portion 531c which partially plastically deforms the flange portion 523. The plastic working portion 531c has a shape tapered toward the lower end, and is brought into contact with the upper end surface 523a of the flange portion 523 in the state illustrated in FIG. 44, in which the shaft portion 521 and the flange portion 523 are arranged to each die. The lower end surface 523b of the flange portion 523 is held by the upper end surface 532a of the lower die 532, and the upper end surface 523a of the flange portion 523 is held by the lower end surface 533a of the first intermediate die 533. Therefore, the holding hole 531a of the caulking die 531 is formed to have a dimension and a shape which are highly accurate so as to be held and bound appropriately by the radial bearing surfaces A and A. Similarly, the lower end surface 533a of the first intermediate die 533 and the upper end surface 532a of the lower die 532 are formed to have highly accurate shapes (flatness and the like) so as to appropriately hold and bind the upper and lower end surfaces 523a and 523b.

In addition, in this type of the bearing member, bearing performance depends on perpendicularity between the radial bearing surface and the thrust bearing surface. In the bearing member 502 according to this embodiment, the perpendicularity is ensured at the time of formation of the cover portion 524 described below. However, when the fixation accuracy of the flange portion 523 with respect to the shaft portion 521 is too low, it becomes difficult to obtain a desired perpendicularity. Therefore, it is preferable to sufficiently enhance the perpendicularity between the holding hole 531a of the caulking die 531 and the upper end surface 532a of the lower die 532, and between the holding hole 531a of the caulking die 531 and the lower end surface 533a of the first intermediate die 533. Further, it is preferable for parallelism between the upper end surface 532a binding the both end surfaces of the flange portion 523 and the lower end surface 533a of the first intermediate die 533 to be sufficiently increased.

By using the device having the above-mentioned structure, the flange portion 523 is fixed to the lower end of the shaft portion 521 in the mode described below.

First, as illustrated in FIG. 44, the shaft portion 521 and the flange portion 523 are installed to the above-mentioned device before lowering the upper die 534, and the lower end surface 534a of the upper die 534 is brought into contact with the upper end surface 521e of the shaft portion 521. At this stage, the upper end surface 535a of the second intermediate die 535 is positioned below the upper end surface 521e of the shaft portion 521, and the upper end surface 531b of the caulking die 531 is positioned below the upper end surface 535a of the second intermediate die 535.

Figure 45:
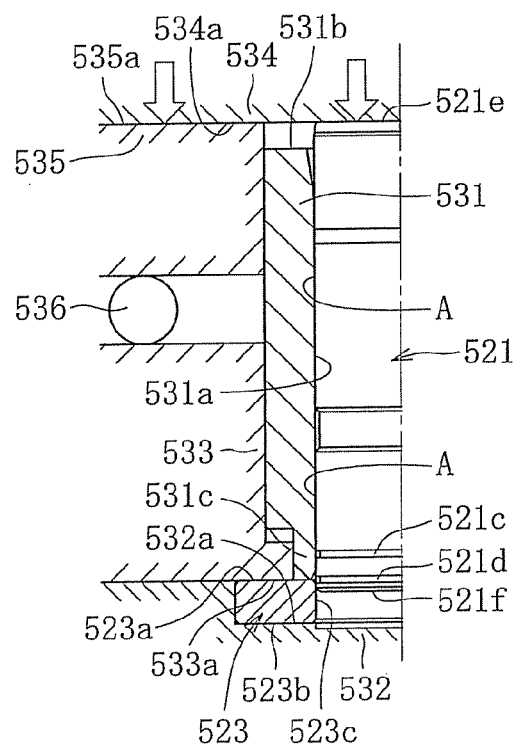
FIG. 45 is a sectional view conceptually illustrating an example of the assembly step of the shaft member and the flange portion.
Figure 46:
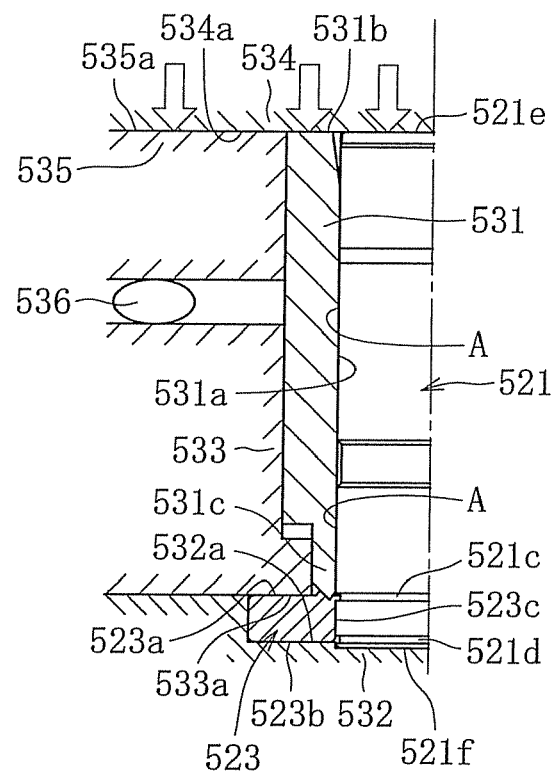
FIG. 46 is a sectional view conceptually illustrating an example of the assembly step of the shaft member and the flange portion.

Subsequently, the upper die 534 is further lowered as described in FIG. 45, and the lower end of the shaft portion 521 is press-fitted into the hole portion 523c of the flange portion 523. When the lower end of the shaft portion 521 is press-fitted by predetermined length, the lower end surface 534*a* of the upper die 534 is brought into contact with the upper end surface 535*a* of the second intermediate die 535. Then, when the upper die 534 is further lowered to pressurize the second intermediate die 535 downward, the downward load is transmitted to the first intermediate die 533 through an intermediation of the elastic member 536. Therefore, the press-fitting of the shaft portion 521 progresses in the state in which the both end surfaces 523*a* and 523*b* of the flange portion 523 are bound by the first intermediate die 533 and the lower die 532.

Figure 47:
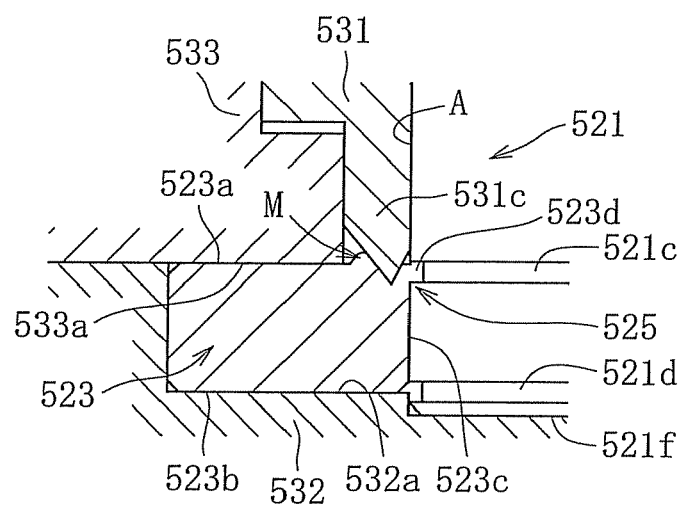
FIG. 47 is an enlarged sectional view of a main portion of FIG. 46.

As illustrated in FIG. 6, when the press-fitting of the shaft portion 521 is caused to further progress in the state in which the both end surfaces 523*a* and 523*b* of the flange portion 523 are bound as described above, the lower end surface 534*a* of the upper die 534 is brought into contact with upper end surface 531*b* of the caulking die 531. When the upper die 534 is further lowered and pressurized the caulking die 531 downward, as illustrated in FIG. 47 in an enlarged manner, the plastic working portion 531*c* of the caulking die 531 bites into the flange portion 523 and the flange portion 523 is partially subjected to plastic deformation, whereby a first protruding portion 523*d* is formed. The first protruding portion 523*d* is formed so as to protrude to a radially inner side with respect to inner peripheral surface (inner wall portion of hole portion 523*c*) of the flange portion 523, and the protruded portion is accommodated in the first accommodating portion 521*c* provided to the shaft portion 521. With this, a first caulked portion 525 is formed at the upper end of the hole portion 523*c* (press-fit region) of the flange portion 523 to which the shaft portion 521 is press-fitted and fixed. The caulking process is performed with the flange portion 523 being continuously bound by imparted load according to an amount of compressive deformation of the elastic member 536 from the first intermediate die 533 to the flange portion 523.

At the stage at which the first caulked portion 525 is formed, the lowering of the upper die 534 is stopped, each die is returned to original position. Then the integrated product of the bearing portion 521 and the flange portion 523 is taken out. The integrated product is transferred to a step of forming a second caulked portion 526 at the lower end of the hole portion 523*c* of the flange portion 523 to which the shaft member 521 is press-fitted and fixed. The second caulked portion 526 forms a second protruding portion 523*e* (refer to enlarged view of FIG. 41) by partially performing plastic deformation on the flange portion 523, and is formed by accommodating the second protruding portion 523*e* in a second accommodating portion 521*d* provided to the shaft portion 521. Though there are slight differences, a forming procedure of the second caulked portion 526 conforms to the forming procedure of the first caulked portion 525, whereby detailed description thereof is omitted here.

Note that, the second caulked portion 526 dose not necessarily need to be provided in a separate step after forming the first caulked portion 525. For example, by providing various ingenuities to the above-mentioned device, it is also possible to form the second caulked portion 526 and the first caulked portion 525 at the same time. As a matter of course, in terms of saving the manufacturing cost, both the caulked portions 525 and 526 are preferably formed at the same time. Further, the above-mentioned first and second protruding portions 523*d* and 523*e* may be formed in a circular shape, or may be formed intermittently (in circular arc shape). The shapes of the protruding portions 523*d* and 523*e* can be appropriately changed in accordance with required fastening strength and the like.

When the caulking process is performed in the state of binding both the end surfaces 523*a* and 523*b* of the flange portion 523 as described above, it is possible to perform caulking with surface accuracy of the both end surfaces 523*a* and 523*b* being maintained and posture at the time of completion of the press-fitting of the flange portion 523 with respect to the shaft portion 521 being maintained. In particular, in this embodiment there is adopted a structure in which load (binding force) with respect to the flange portion 523 gradually increases in accordance with the progress of the lowering of the upper die 534. Thus, for example, it is possible to efficiently prevent positional deviation between the shaft portion 521 and the flange portion 523 due to increase in press-fitting resistance in accordance with progress of the press-fitting, and deformation of the flange portion 523. Further, the binding force reaches maximum at the time of caulking process, and hence the positional deviation can be corrected even when the positional deviation occurs between the shaft portion 521 and the flange portion 523 at the time of press-fitting.

Further, in this embodiment, also at the time of press-fitting the shaft member 521, the flange portion 523 is bound by the lower die 532 and the first intermediate die 533, and hence the press-fitting of the shaft portion 521 can be performed while appropriately maintaining relative posture of the shaft member 521 and the flange portion 523, or correcting perpendicularity and the like of the flange portion 523. Therefore, assembly accuracy of the shaft portion 521 and the flange portion 523 is enhanced.

Further, the above-mentioned device adopts a structure in which axial gaps between the lower end surface 534*a* of the upper die 534 which receives the driving force from the drive mechanism (driving force for up-and-down movement in this case) and, each of the shaft portion 521, the second intermediate die 535, and the caulking die 531 become larger in the stated order. With this structure, it is possible to realize, by lowering the upper die 534 the press-fitting of the shaft portion 521, imparting of binding force to the flange portion 523, and the caulking process. Therefore, the single drive mechanism suffices, whereby cost of equipment can be reduced. Further, it is possible to perform by a series of dice 531 to 535 in conjunction with each other all the steps including the press-fitting, the correction, and the caulking, whereby productivity can be improved.

After manufacturing the assembly obtained by fixing the flange portion 523 to the lower end of the shaft portion 521 as described above, the assembly is transferred to the injection molding step.

(B) Injection Molding Step

Figure 48A:
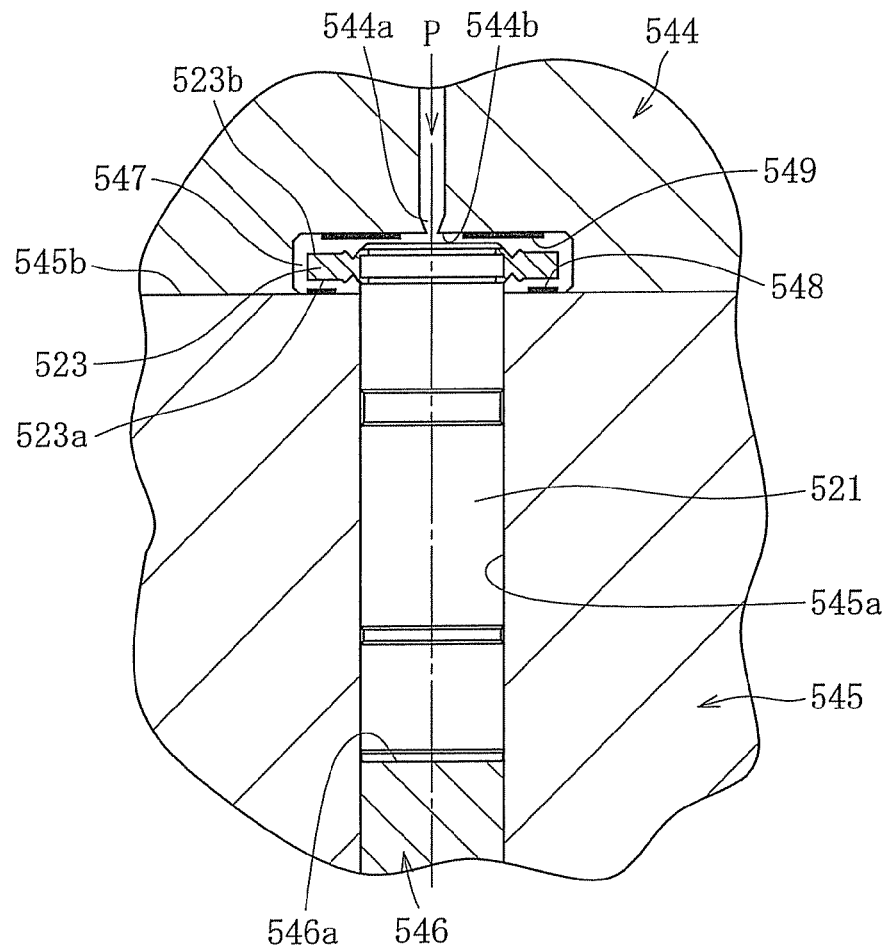
FIG. 48A is a sectional view of a main portion of a molding die used in an injection molding step of a cover portion.

In the injection molding step, the shaft portion 521 and the flange portion 523 (assembly) serve as an insertion component, and the cover portion 524 forming the thrust member 522 with reference to the radial bearing surface A of the shaft portion 521 is formed by injection molding of a molten material (molten resin in this case). FIG. 48A conceptually illustrates an example of the injection molding step. In the die illustrated in the figure, the main portion thereof is formed by a movable die 544 coaxially positioned so as to relatively move in the axial direction, and a fixed die 545, and a cavity 547 corresponding to a shape of the cover portion 524 (thrust member 522) is formed by the dice 544 and 545.

The movable die 544 is provided with a gate 544*a* for injecting and filling the molten material P in the cavity 547. Of end surfaces of the movable die 544, an end surface 544*b* axially opposed to an end surface 523*b* of the flange portion 523 through an intermediation of the cavity 547 is provided with a die portion 549 corresponding to the shapes of the dynamic pressure grooves to be provided to the thrust bearing surface C of the thrust member 522.

The fixed die 545 is provided with the accommodating portion 545a for accommodating the shaft portion 521. Of the upper end surfaces 545b of the fixed die 545, to a portion axially opposed to the upper end surface 523a of the flange portion 523 through an intermediation of the cavity 547, there is provided a die portion 548 corresponding to the shapes of the dynamic pressure grooves 522a1 to be provided to the thrust bearing surface B of the thrust member 522. In an inner periphery of the fixed die 545, there is provided a knockout pin 546 capable of relative movement in the axial direction with respect to the fixed die 545, and an upper end surface 546a of the knockout pin 546 supports the upper end surface 521e of the shaft portion 521. Note that, FIG. 48A illustrates the state in which the knockout pin 546 is in a original position. In this state, separating distance in the axial direction between the upper end surface 545b of the fixed die 545 and the upper end surface 546a of the knockout pin 546 is set to be shorter than the axial dimension of the shaft portion 521 by a predetermined amount. Therefore, in the state of accommodating the shaft portion 521 in the accommodating portion 545a, the flange portion 523 is not held in contact with the upper end surface 545 of the fixed die 545.

In this embodiment, each accuracy required for the shaft member 502, specifically, perpendicularity of the thrust bearing surface B of the thrust member 522 with respect to the radial bearing surface A of the shaft member 521, and parallelism of both the thrust bearing surfaces B and C are ensured by forming the cover portion 524. Therefore, perpendicularity of the upper end surface 545b with respect to the inner wall surface of the accommodating portion 545a of the fixed die 545, and parallelism, in an abutting state of both dies 544 and 545, of the lower end surface 544b of the movable die 544 with respect to the upper end surface 545b of the fixed die 545 are accurate enough for satisfying the required accuracy.

Incidentally, depending on thickness of the cover portion 524, there is a fear that a hump M (Hereinafter, referred to as "convex portion M". Refer to FIG. 47.) and the first and second protruding portions 523d and 523e protrude from the surface of the cover portion 524, whereby shape accuracy of the thrust bearing gap may be adversely affected. Therefore, an axial dimension of the cavity 547 is set to an axial dimension larger than width between leading end portions of both the convex portions M.

Figure 48B:
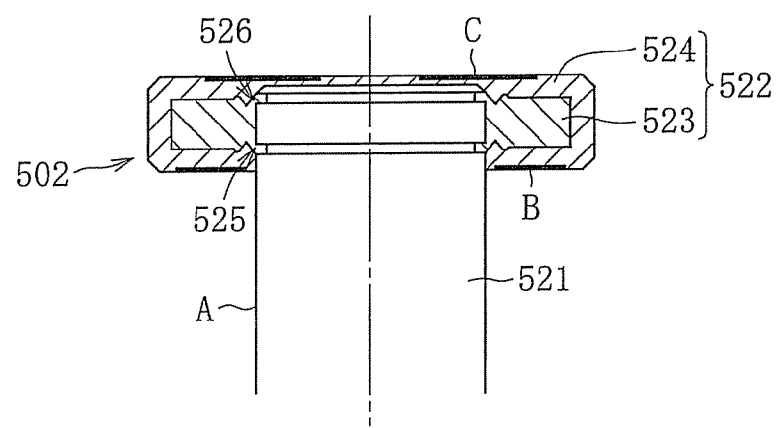
FIG. 48B is a sectional view of the flange portion after injection molding of the cover portion.

In the die having the above-mentioned structure, after inserting the shaft portion 521 into the accommodating portion 545a of the fixed die 545 to bind the radial bearing surfaces A and A of the shaft portion 521, the movable die 544 is made closer to the fixed die 545, thereby performing mold clamping. After the completion of the mold clamping, the molten material P (molten resin) is injected and filled in the cavity 547 through an intermediation of the gate 544a, thereby molding the cover portion 524. Mold opening is performed after the completion of setting of the molten resin, and then the knockout pin 546 is pushed upward. As a result, as illustrated in FIG. 48B, there are formed the flange portion 523 fixed to the lower end of the shaft portion 521, and the cover portion 524 covering the entire surface of the flange portion 523. With this, the thrust member 522 is formed, and the shaft member 502 as a finished product can be obtained. Further, on the upper and lower end surfaces 522a and 522b of the thrust member 522 (surfaces of cover portion 524), the thrust bearing surfaces B and C (dynamic pressure grooves) are molded simultaneously with the molding of the cover portion 524.

Note that, as the molten resin as the molten material P, both an amorphous resin and a crystalline resin can be used as long as they can be injected. Examples of the usable amorphous resin include polysulfone (PSU), polyether sulfone (PES), polyphenyl sulfone (PPSU), polyether imide (PEI), and the like. Further, examples of the usable crystalline resin include liquid polymer (LCP), polyether ether ketone (PEEK), polybutylene terephthalate (PBT), polyphenylene sulfide (PPS), and the like. Those base resins may be used alone, or by mixing two or more kinds of resins. Further, it is also possible to compound various fillers for giving various properties thereto to the above-mentioned resins in the arbitrary proportion.

Note that, as the molten resin P, it is also possible to use, other than the above-mentioned resins, the metal material such as low melting metal including magnesium alloy. In this case, the cover portion 524 is made of metal, thereby enabling enhancement in abrasion resistance of the thrust member 522. Further, it is also possible to form the cover portion 524 by so-called MIM molding or CIM molding.

As described above, in the present invention, the shaft portion 521 and the flange portion 523 are fixed to each other by the simultaneous use of press-fitting and caulking, and hence the strength of the shaft member 502 can be increased. Particularly in this embodiment, the caulked portions 525 and 526 are formed by partially performing plastic deformation on the flange portion 523, and hence it is possible to prevent deformation, due to the caulking, of the shaft portion 521 or the entire flange portion 523. As a matter of course, the entire flange portion 523 may be plastically deformed as long as the deformation amount of the entire flange portion 523 can be kept within a minute range. Further, in the present invention, it is possible to obtain the strong fixed state with simpler equipment than that in the laser welding, whereby the manufacturing cost of the shaft portion 502 can be reduced.

Further, the hole portion 523c of the flange portion 523, into which the shaft portion 521 is press-fitted, is formed as a through-hole, and hence the caulked portions 525 and 526 can be formed at both ends of the hole portion 523c, whereby the strength of the shaft member 502 can be further increased.

Further, both end surfaces (entire flange portion 523 in this embodiment) opposed to the thrust bearing gap of the flange portion 523 are covered with the cover portion 524, whereby it is possible to prevent accuracy of the thrust bearing gap from being deteriorated by the convex portion M and the protruding portions 523d and 523e, which are formed along with the formation of the caulked portions 535 and 526, in other words, to prevent rotation accuracy in the thrust direction from being adversely affected. In addition, accuracy required for the shaft member 502, specifically, perpendicularity of the thrust bearing surfaces B and C with respect to the radial bearing surface A of the shaft portion 521, parallelism between the thrust bearing surfaces B and C, and the like are ensured at the time of formation of the cover portion 524. Therefore, it is possible to moderate requirements for quality in the steps including manufacture of the flange portion 523, press-fitting of the shaft portion 521 to the flange portion 523, and formation of the caulked portions 525 and 526, thereby enabling further reduction in manufacturing cost.

While the fifth embodiment of the present invention has been describe above, the present invention is not limitedly applied to the fluid dynamic bearing device 501 having the structure as illustrated in FIG. 41. Hereinafter, modifications of the fluid dynamic bearing device to which the present invention can be applied are described with reference to the drawings. Note that, in the fluid dynamic bearing device described below, the same components as those described above are denoted by the same reference symbols, and description is made only of different components.

Figure 49:
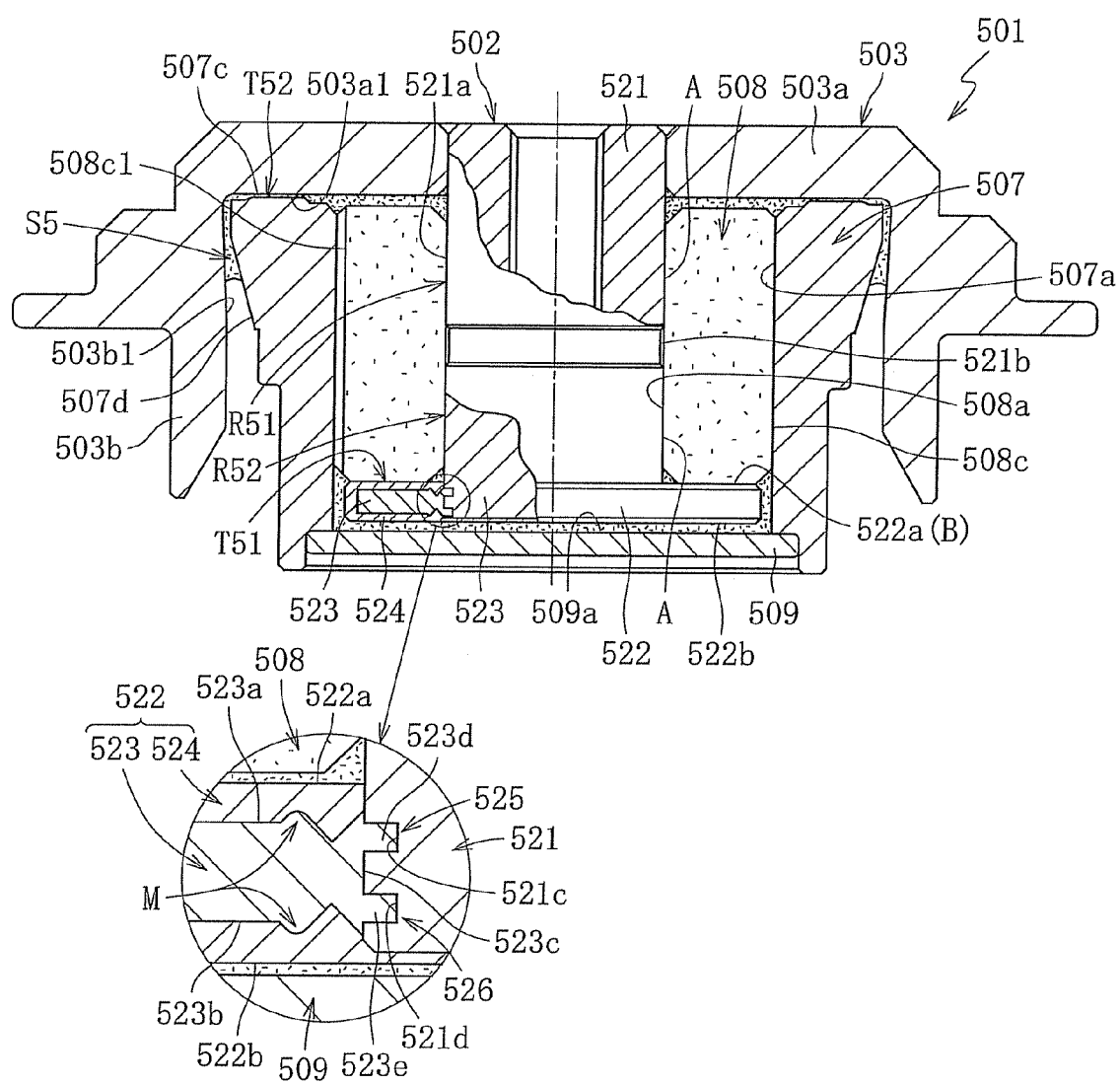
FIG. 49 is a sectional view illustrating a first modification of the fluid dynamic bearing device of the present invention.

FIG. 49 illustrates a first modification of the fluid dynamic bearing device of the present invention. The fluid dynamic bearing device illustrated in the figure is different from one illustrated in FIG. 41 mainly in that the thrust bearing surface C is not formed on the lower end surface 522b of the thrust member 522 of the shaft portion 502 and the second thrust bearing portion T52 is provided between a lower end surface 503a1 of a disk portion 503a of a disk hub 503 fixed to the upper end of the shaft portion 521 and an upper end surface 507c of the housing 507, and that the seal space S5 is provided between a tapered outer peripheral surface of the housing 507 and an inner peripheral surface 503b1 of a cylindrical portion 503b of the disk hub 503.

Figure 50:
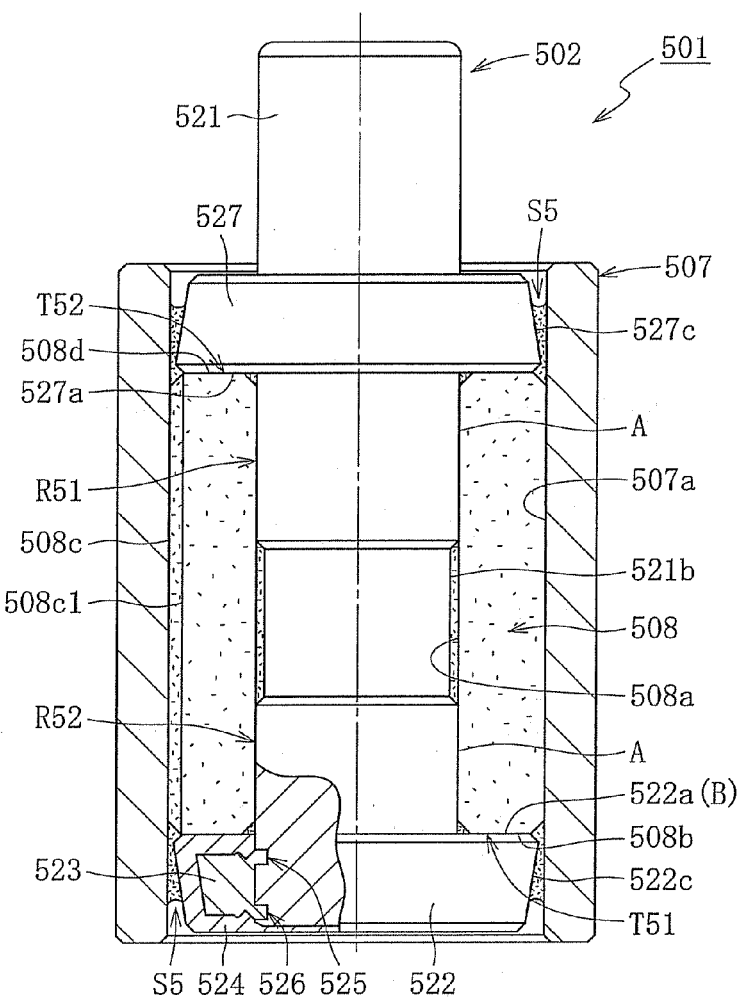
FIG. 50 is a sectional view illustrating a second modification of the fluid dynamic bearing device of the present invention.

FIG. 50 illustrates a second modification of the fluid dynamic bearing device of the present invention. The fluid dynamic bearing device illustrated in the figure is different from one illustrated in FIG. 41 mainly in that the shaft portion 502 further includes a second flange portion 527 fixed to a substantially central portion in the axial direction of the shaft portion 521, and the second thrust bearing portion T52 is provided between a lower end surface 527a of the second flange portion 527 and an upper end surface 508d of the bearing sleeve 508, and that each of an outer peripheral surface 522c of the thrust bearing member 522 and an outer peripheral surface 527c of the second flange portion 527 form a seal space S5 together with the inner peripheral surface 507a of the housing 507. In this structure also, the above-mentioned structure of the present invention can be applied to the integrated product of the shaft portion 521 and the thrust member 522 (flange portion 523) provided to the lower end of the shaft portion 521.

While in the above-mentioned structure, the accommodating portions 521c and 521d for accommodating the protruding portions 523d and 523e are provided to the shaft portion 521, the accommodating portions 521c and 521d are not necessarily provided. Whether or not to provide them may be determined in consideration of required fastening strength and the like. Further, in the above-mentioned structure, there is described the case where plastic working is performed on the flange portion 523 to thereby fix the shaft portion 521 and the flange portion 523 by caulking, but they may be fixed by caulking by performing plastic working on the shaft portion 521.

Figure 51:
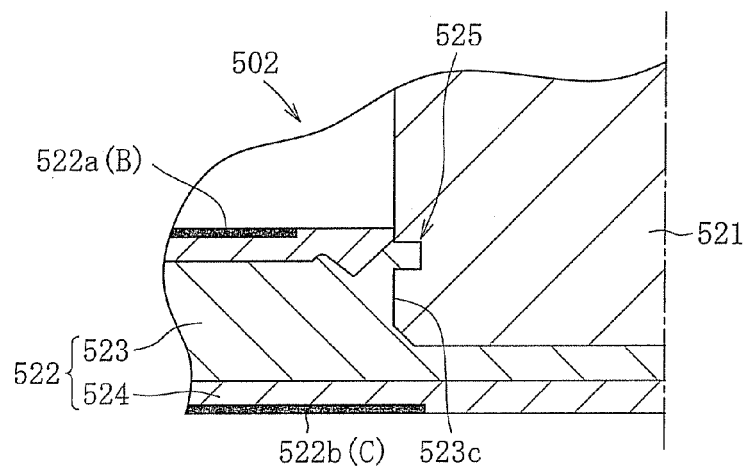
FIG. 51 is an enlarged sectional view of a main portion of the shaft member according to another modification.

Further, in the above-mentioned structure, the hole portion 523c of the flange portion 523 is formed as a through-hole, and the caulked portions 525 and 526 are formed at both ends of the hole portion 523c. However, as illustrated in FIG. 51, the hole portion 523c may be formed into the recessed shape, and the caulked portion 525 may be formed only at the upper end portion of the hole portion 523c.

Further, in the above-mentioned structure, the thrust member 522 is formed by forming the cover portion 524 so as to cover the entire surface of the flange portion 523. However, the cover portion 524 is not necessarily formed so as to cover the entire surface of the flange portion 523, and may formed on the end surface of the surface of the flange portion 523, which faces the thrust bearing gap. Specifically, the cover portion may be formed on the both end surfaces 523a and 523b of the flange portion 523 in the fluid dynamic bearing device 501 illustrated in FIG. 41, and may be formed only on the upper end surface 523a of the flange portion 523 in the fluid dynamic bearing device illustrated in FIGS. 49 and 50. However, in the fluid dynamic bearing device illustrated in FIG. 50, the seal spaces S5 are formed by the outer peripheral surfaces of the thrust member 522, and hence, in terms of improving the sealing appropriately, it is preferable to form the cover portion 524 on the outer peripheral surface of the flange portion 523.

Further, in the fluid dynamic bearing devices described above, the housing 507 and the bearing sleeve 508 are formed as separate members. However, the present invention can be suitably applied to the fluid dynamic bearing device in which the housing 507 and the bearing sleeve 508 are integrated. Further, it is also possible to integrate the lid member 509 or the seal member 510 with the housing 507.

Further, hereinabove, there is exemplified a structure in which the dynamic pressure effect of the lubricating oil is generated by the dynamic pressure grooves of the herringbone pattern and the spiral pattern as the radial bearing portions R51 and R52 and the thrust bearing portions T51 and T52. However, it is also possible to adopt, a so-called step bearing, a multi-arc bearing, or non-circular bearing as the radial bearing portions R51 and R52, and the so-called step bearing and a corrugated bearing as the thrust bearing portions T51 and T52. Further, hereinabove, there is exemplified a structure in which the radial bearing portions are provided at two points in the axial direction. However, the radial bearing portions may be provided at one position or three or more positions in the axial direction.

Further, hereinabove, description is made of the case of forming the both the radial bearing portions R51 and R52 by the dynamic pressure bearing. However, it is also possible to form one of or both of the radial bearing portions R51 and R52 by a bearing other than the dynamic pressure bearing. For example, while not shown, it is also possible to form a so-called perfectly circular bearing by forming the radial bearing surface A of the shaft member 502 into a perfectly circular shape, and forming the inner peripheral surface 508a of the bearing sleeve 508 opposed thereto as a perfectly circular inner peripheral surface.

In the following, a sixth embodiment of the present invention is described with reference to FIGS. 52 to 60. Herein, the sixth embodiment is an example of the embodiment according to the second aspect of the present invention.

Figure 53:
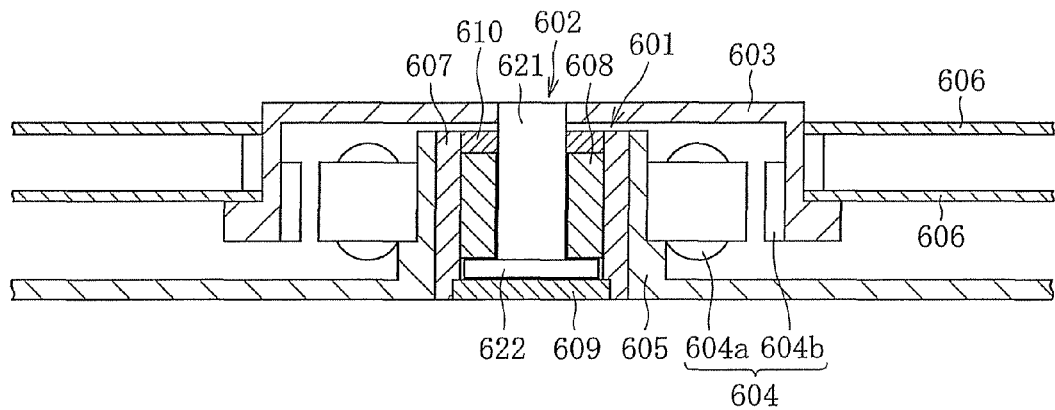
FIG. 53 is a sectional view of a motor provided with a fluid dynamic bearing device according to a sixth embodiment of the present invention.

FIG. 53 is a sectional view of a spindle motor according to the sixth embodiment of the present invention, which is provided with a fluid dynamic bearing device 601. The spindle motor is used as a disk drive motor for an HDD, which is provided with a magnetic disk, and includes the fluid dynamic bearing device 601 for supporting a shaft member 602 attached with a hub 603 in a radial direction and in a non-contact manner, a drive portion 604 constituted by a stator coil 604a and a rotor magnet 604b opposed to each other through an intermediation of, for example, a radial gap, and a bracket 605. The stator coil 604a is fixed to the bracket 605, and the rotor magnet 604b is fixed to the hub 603. A housing 607 of the fluid dynamic bearing device 601 is fixed to an inner periphery of the bracket 605. Further, as illustrated in the figure, a disk 606 (two in FIG. 53) is held on the hub 603. In the spindle motor constituted as described above, when the stator coil 604a is energized, the rotor magnet 604b is rotated with excitation force generated between the stator coil 604a and the rotor magnet 604b. In accordance therewith, the disk 606 held on the hub 603 is integrally rotated with the shaft member 602.

Figure 54:
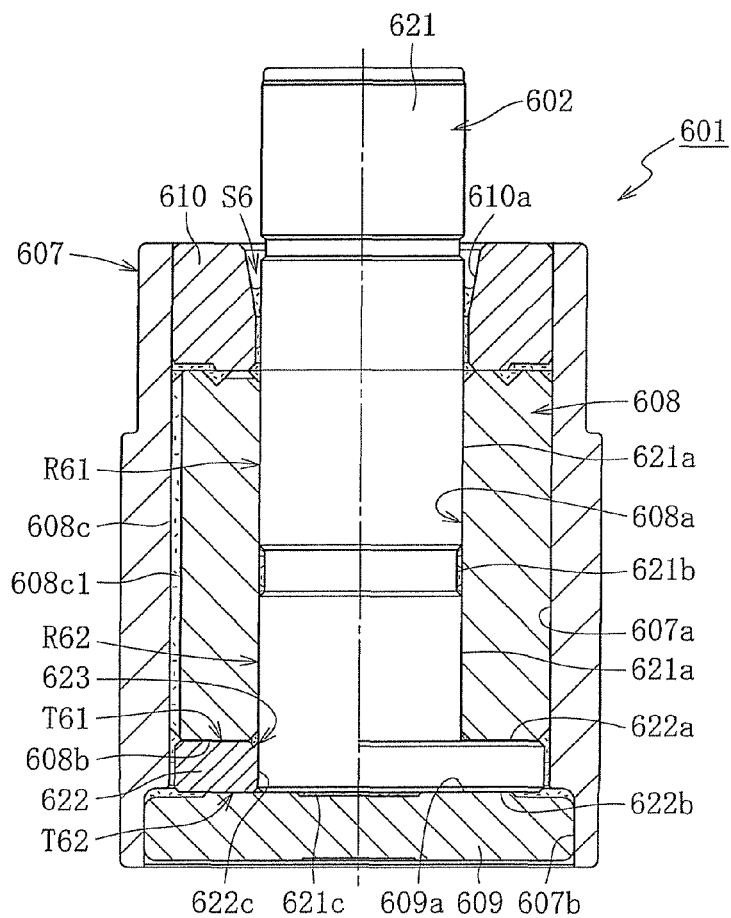
FIG. 54 is a sectional view of the fluid dynamic bearing device.

FIG. 54 is a sectional view of the fluid dynamic bearing device 601. The fluid dynamic bearing device 601 includes the shaft member 602 manufactured by a method described below, the housing 607, a bearing sleeve 608 fixed to an inner periphery of the housing 607, a lid member 609 for closing one end of the housing 607, a seal member 610 arranged on an opening side of the other end of the housing.

The housing 607 is formed into a cylindrical shape with use of a metal material such as brass or a resin material, and exhibits a mode in which both axial ends thereof are opened. To an inner peripheral surface 607a of the housing 607, an outer peripheral surface 608c of the bearing sleeve 608 is fixed by appropriate means such as bonding (including loose bonding and press-fit bonding), press-fitting, or welding (including ultrasonic welding and laser welding). Further, on the lower end side of the inner peripheral surface 607a, there is formed a fixation surface 607b, which is described below and larger than the inner peripheral surface 607a in diameter, for fixing the lid member 609.

The bearing sleeve 608 is formed into a cylindrical shape with use of a porous body made of a sintered metal or the like. In this embodiment, the bearing sleeve 608 is formed into a cylindrical shape with use of a porous body made of a sintered metal including copper as a main component, and is fixed to the inner peripheral surface 607a of the housing 607 by bonding. The bearing sleeve 608 may be formed of a porous body made of a non-metallic material such as a resin or ceramic, or may be formed of, except the porous body such as a sintered metal, a material having a structure free from inner holes, or a structure having holes of a size which prevents passage of a lubricating oil.

Figure 55:
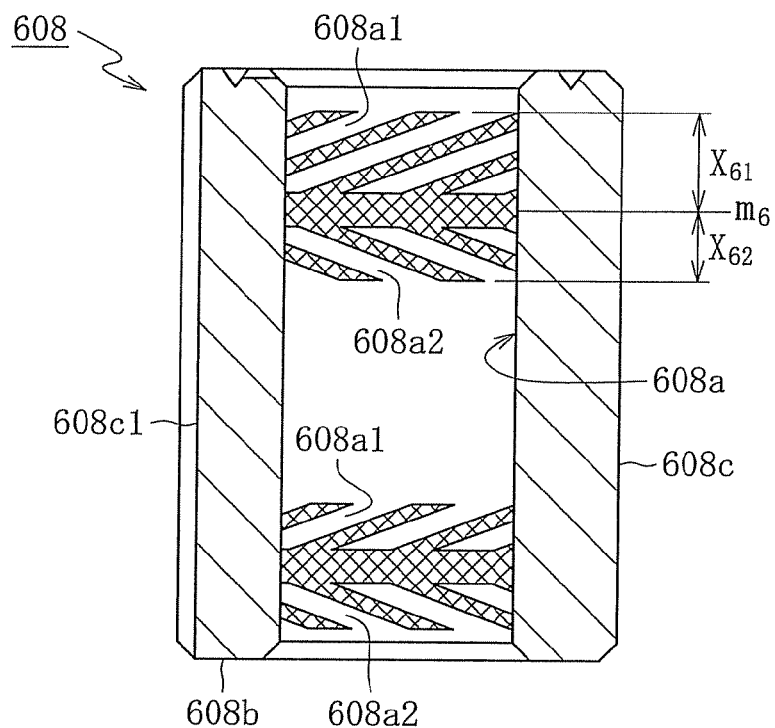
FIG. 55 is a sectional view of the bearing sleeve.

In the entire or a part of a region of an inner peripheral surface 608a of the bearing sleeve 608, regions where multiple dynamic pressure grooves are arranged are formed as a radial dynamic pressure generating portion. In this embodiment, as illustrated in FIG. 55, for example, two regions where multiple dynamic pressure grooves 608a1 and 608a2 having inclination angles different from each other are arranged in a herringbone pattern are formed while being axially separated from each other. In this embodiment, for the purpose of intentionally generating circulation of a lubricating oil inside the bearing, the region on one side (upper side in this case), where the dynamic pressure grooves 608a1 and 608a2 are arranged, is formed asymmetrically in the axial direction. When description thereof is made with reference to a mode illustrated in FIG. 55, an axial dimension $X_{61}$ of the region on the upper side with respect to an axial center $m_6$ (seal member 610 side), where the dynamic pressure grooves 608a1 are arranged, is larger than an axial dimension $X_{62}$ of the region on the lower side, where the dynamic pressure grooves 608a2 are arranged.

Figure 56:
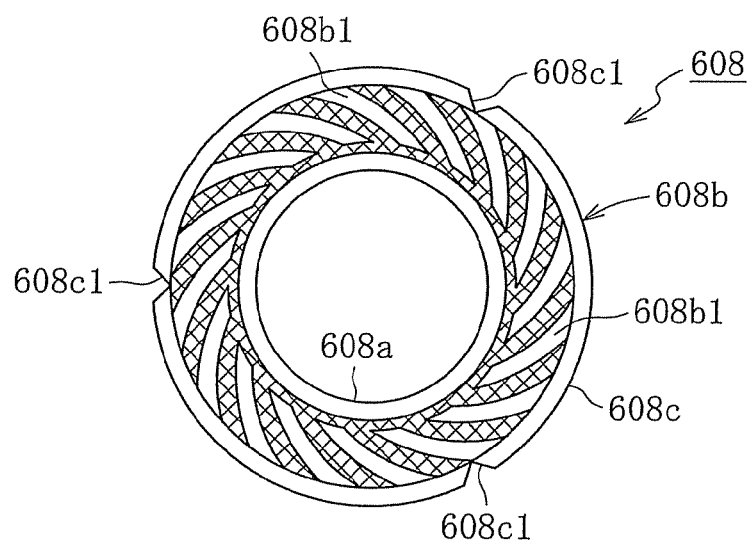
FIG. 56 is a plan view of the end surface of the bearing sleeve, which is opposed to the flange portion.

In the entire or a part of a region of a lower end surface 608b of the bearing sleeve 608, as illustrated in FIG. 56, for example, a region where multiple dynamic pressure grooves 608b1 are arranged in a spiral pattern is formed as a thrust dynamic pressure generating portion. In the state of a finished product, the region where the dynamic pressure grooves 608b1 are arranged is opposed to an upper end surface 622a of a flange portion 622 described below, and at the time of the rotation of the shaft member 602, a thrust bearing gap of a first thrust bearing portion T61 described below is formed between the region and the upper end surface 622a (refer to FIG. 54).

In an outer peripheral surface 608c of the bearing sleeve 608, there are formed multiple axial grooves 608c1 extending in the axial direction. Mainly during use of the fluid dynamic bearing device 601, for example, in the case where excess and deficiency of the lubricating oil occur in the inner space of the bearing, those axial grooves 608c1 play a role of immediately solving this undesirable state so as to restore an appropriate state.

The lid member 609 for closing the lower end side of the housing 607 is formed of a metal material, a resin material, or the like, and is fixed to the fixation surface 607b provided at the lower end in the inner periphery of the housing 607. In this case, for fixing the lid member 609, it is possible to adopt arbitrary means such as bonding, press-fitting, or welding.

In the entire or a part of a region of an upper end surface 609a of the lid member 609, there is formed a region where dynamic pressure grooves are arranged, the region exhibiting an arrangement mode similar to, for example, that of FIG. 56 (opposite in spiral direction). In the state of a finished product, the region where dynamic pressure grooves are arranged (thrust dynamic pressure generating portion) is opposed to a lower end surface 622b of the flange portion 622, and at the time of the rotation of the shaft member 602, a thrust bearing gap of a second thrust bearing portion T62 described below is formed between the region and the lower end surface 622b (refer to FIG. 54).

In this embodiment, the seal member 610 as a sealing means is formed of a metal material and a resin material separately from the housing 607, and is fixed to the inner periphery of the upper end of the housing 607 by arbitrary means such as press-fitting, bonding, or welding.

On the inner periphery of the seal member 610, there is formed a sealing surface 610a having a tapered surface, and a seal space S6 is formed between the sealing surface 610a and the outer peripheral surface of a shaft portion 621 described below. In the state in which the lubricating oil is filled inside the fluid dynamic bearing device 601, the oil surface of the lubricating oil is constantly maintained within the range of the seal space S6.

The shaft member 602 is constituted by the shaft portion 621 and the annular flange portion 622 having a hole provided at the center thereof, in which the lower end of the shaft portion 621 is fixed. As illustrated in FIG. 54, on the outer periphery of the shaft portion 621, there is formed a radial bearing surface 621a opposed in the radial direction to each of the regions where the dynamic pressure grooves 608a1 and 608a2 are arranged, the regions being provided on the inner peripheral surface 608a of the bearing sleeve 608. In this embodiment, two radial bearing surfaces 621a are provided while being axially separated from each other. Between those radial bearing surfaces 621a and 621a, there is provided a thinned portion 621b having a diameter smaller than that of the radial bearing surfaces 621a.

The lower end of the shaft portion 621 is press-fitted to the flange portion 622. Further, at the axial end portion of the press-fit region (bearing sleeve 608 side in this case) of the shaft portion 621 and the flange portion 622, there is provided a caulking fixation portion 623 with respect to the flange portion 622.

Note that, it is preferable that the shaft portion 621 be formed of a material excellent in strength, rigidity, abrasion resistance, and the like, such as stainless steel, and that the flange portion 622 be formed of a material excellent in plastic workability at the time of the caulking process in comparison with that of the shaft portion 621, such as brass.

After the components described above are assembled, the inner space of the bearing (region indicated by scattered dots in FIG. 54) is filled with the lubricating oil, whereby the fluid dynamic bearing device 601 as a finished product is obtained. Here, as a lubricating oil filled in the fluid dynamic bearing device 601, various oils can be used. As a lubricating oil provided to the fluid dynamic bearing device for a disk drive such as an HDD, in consideration of changes in temperature during use and transportation thereof, it is possible to suitably use an ester-based lubricating oil excellent in low evaporation rate and low viscosity, for example, a lubricating oil including dioctyl sebacate (DOS) or dioctyl azelate (DOZ).

In the fluid dynamic bearing device 601 constituted as described above, when the shaft member 602 is rotated, the regions where the dynamic pressure grooves 608a1 and 608a2 of the bearing sleeve 608 are arranged are opposed to the radial bearing surfaces 621a and 621a of the shaft portion 621 through an intermediation of radial bearing gaps. Then, in accordance with the rotation of the shaft member 602, in any of the upper and lower regions where the dynamic pressure grooves 608a1 and 608a2 are arranged, the lubricating oil is pressed to an axial center $m_6$ of the dynamic pressure grooves 608a1 and 608a2, and the pressure thereof is increased. Owing to the dynamic pressure effect of the dynamic pressure grooves 608a1 and 608a2 as described above, a first radial bearing portion R61 and a second radial bearing portion R62 for rotatably supporting the shaft member 602 in the radial direction in a non-contact manner are formed so as to be constituted at two positions while being separated from each other, respectively.

Simultaneously, in a thrust bearing gap between the region where the dynamic pressure grooves 608b1 are arranged, the region being provided to the lower end surface 608b of the bearing sleeve 608, and the upper end surface 622a of the flange portion 622 opposed thereto, and in a thrust bearing gap between the region where the dynamic pressure grooves are arranged, the region being provided to the upper end surface 609a of the lid member 609, and the lower end surface 622b of the flange portion 622 opposed thereto, oil films of the lubricating oil are respectively formed owing to the dynamic pressure effect of the dynamic pressure grooves. Then, owing to the pressures of the oil films, the first thrust bearing portion T61 and the second thrust bearing portion T62 for supporting the shaft member 602 in the thrust direction in a non-contact manner are constituted, respectively.

Hereinafter, one example of the manufacturing method for the shaft member 602 is described.

Figure 52:
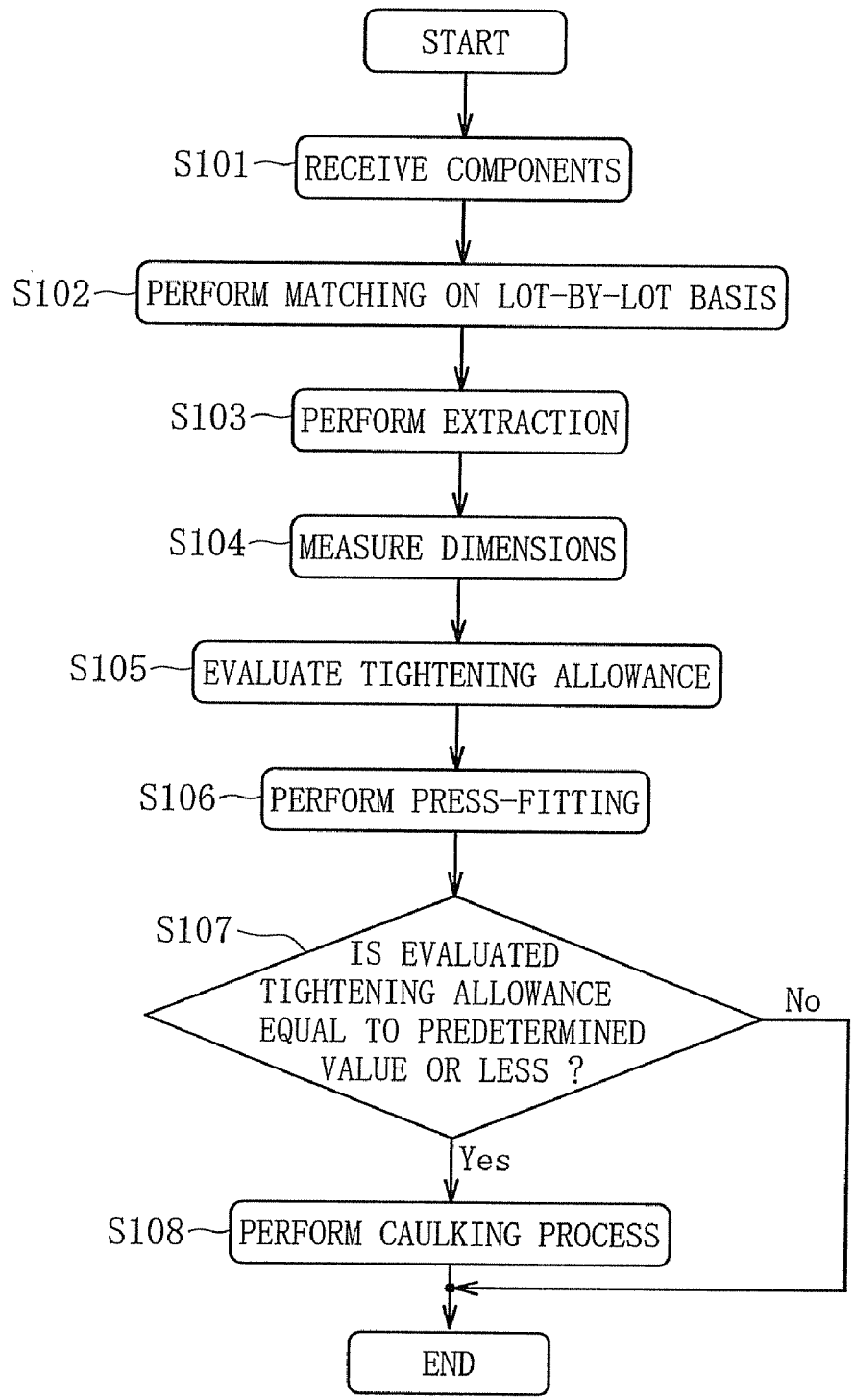
FIG. 52 is a flowchart of a manufacturing method for a fluid dynamic bearing device according to a sixth embodiment of the present invention.

FIG. 52 is one example of a flowchart of the manufacturing method for a fluid dynamic bearing device according to this embodiment. As illustrated in FIG. 52, the manufacturing method includes a step of receiving components to be assembled, that is, the shaft portion 621 and the flange portion 622 (Step S101), a step of performing matching on the received shaft portion 621 and the flange portion 622 on a lot-by-lot basis (Step S102), and a step of arbitrary extracting one shaft portion 621 and one flange portion 622 from lots of each of the shaft portion 621 and the flange portion 622 which have been subjected to matching (Step S103), a step of measuring an outer diameter dimension of the extracted shaft portion 621 and an inner diameter dimension of the hole of the flange portion 622 (Step S104), a step of evaluating, based on a difference in the measured dimensions, tightening allowance (press-fit allowance) when the both members are press-fitted (Step S105) to each other, a step of press-fitting the shaft portion 621 whose tightening allowance has been evaluated into the hole of the flange portion 622 (Step S106), and a step of determining whether or not the evaluated tightening allowance is lower than a predetermined value of the tightening allowance (Step S107), and a step of performing a caulking process on the press-fit product whose tightening allowance has been determined to be lower than the predetermined value as a result of determination (Step S108).

Hereinafter, description is made of each of Steps S101 to S108, mainly of Step S102 of matching.

First, each of the shaft portion 621 and the flange portion 622 which are obtained through the working steps is subjected to the assembly step on a lot-by-lot basis. In this case, there is received the shaft member 621 whose outer peripheral surface to be press-fitted is formed to be highly accurate (less than several μm) by being roughly molded turning, for example, and then performing grinding on the outer peripheral surface including the radial bearing surface (radial bearing surfaces 621a and 621a illustrated in FIG. 54). On the other hand, there is received the flange portion 622 whose inner peripheral surface 622c is formed simultaneously with the hole by a process separate from that for the both end surfaces (upper end surface 622a and lower end surface 622b illustrated in FIG. 54) constituting the thrust bearing surfaces, the process including a rough working such as turning.

Figure 57:
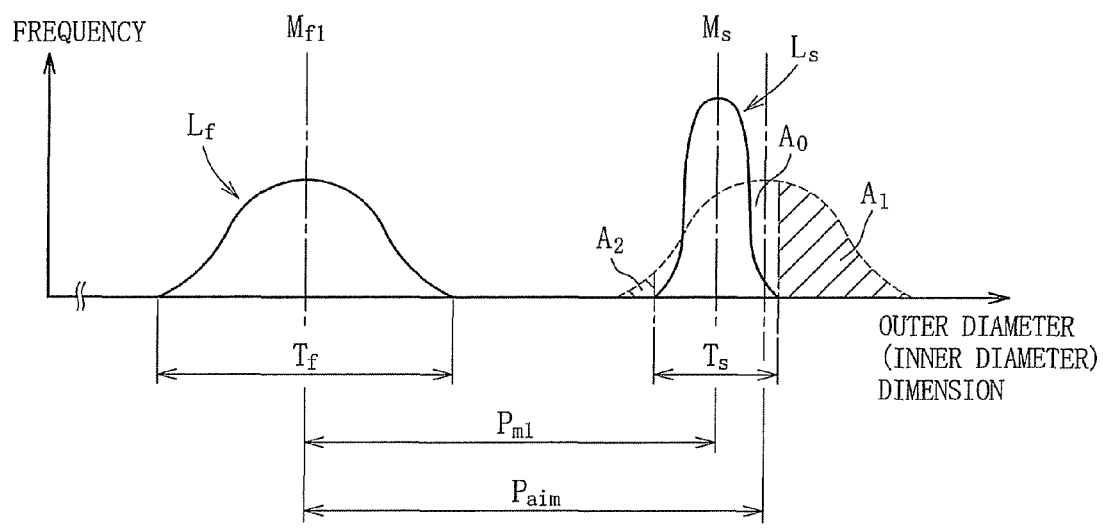
FIG. 57 is a graph illustrating an example of the frequency distribution of the outer diameter dimension of the shaft portion and the frequency distribution of the inner diameter dimension of the hole of the flange portion, which are arbitrarily selected from the respective lots and to be matched in pairs with each other.

Next, matching is performed on the shaft portion 621 and the flange portion 622 which have been received on a lot-by-lot basis (Step S102). Specifically, as illustrated in FIG. 57, matching is performed so that a difference $P_{m1}$ between a representative outer diameter dimension $M_s$ of the shaft portion 621 determined in lots $L_s$ and a representative inner diameter dimension $M_{f1}$ of the hole of the flange portion 622 similarly determined in lots $L_f$ becomes smaller than an aimed value $P_{aim}$ of the tightening allowance. In this case, the lot $L_f$ of the flange portion 622 in which a nominal dimension, that is, the representative inner diameter dimension $M_{f1}$ of the inner peripheral surface 622c is made larger than the representative inner diameter dimension $M_f$ of the lots $L_f$ used for the matching illustrated in FIG. 60 (matching in which the difference between representative dimensions Ms and $M_f$ is aimed value $P_{aim}$).

Note that, the aimed value $P_{aim}$ of the tightening allowance is appropriately set in a range of an upper limit capable of obtaining minimum extraction force required depending on use thereof and a type of model to which the fluid dynamic bearing device 601 is mounted and preventing deterioration in component accuracy due to press-fitting. Further, the range determined at this time defines an allowable range of an appropriate tightening allowance (range $A_0$ illustrated in FIG. 57). Further, due to the above-mentioned difference in working method, working tolerance $T_s$ of the lots $L_s$ of the shaft portion 621 is smaller than working tolerance $T_f$ of the lots $L_f$ of the flange portion 622. Further, in this embodiment, there are used the lots $L_s$ and $L_f$ of the shaft portion 621 and the flange portion 622, in which the representative outer diameter dimension $M_s$ and the representative inner diameter dimension $M_{f1}$ are respectively equal to an average outer diameter dimension and an average inner diameter dimension of the lots.

From the lots $L_s$ of the shaft portion 621 and the lots $L_f$ of the flange portion 622, which have been subjected to matching as described above, one shaft portion 621 and one flange portion 622 are arbitrary selected and extracted (Step S103). Then, the extracted pair of outer diameter dimension of the shaft portion 621 and the inner diameter dimension of the flange portion 622 are measured (Step S104).

Based on the dimension of each component measured in Step 104, the tightening allowance obtained at the time of press-fitting of both the components is evaluated (Step S105). Specifically, from information about a dimension of each component stored in an appropriate memory (including database), a difference in diameter dimensions of the shaft portion 621 and the flange portion 622, which are paired and subjected to press-fitting, is calculated as a value of the tightening allowance. The information about the calculated allowance is transmitted to Step S107 of determining the tightening allowance, the step being a subsequent step (after the next step).

The shaft portion 621 whose dimension has been measured is press-fitted into the hole of the flange portion 622 to be paired therewith (Step S106). The value of the tightening allowance obtained in this step is a value calculated in Step S105, and hence whether or not to perform caulking process is individually determined in Step S107 of determining the tightening allowance of the next step without measuring an actual tightening allowance at the time of press-fitting (Step S107). Specifically, when the evaluated tightening allowance is lower than a predetermined threshold value (value of the tightening allowance corresponding to the required minimum extraction force), caulking process is performed on the press-fit products (Step S108). In this case, the caulking condition is set such that caulking force is imparted uniformly to all the press-fit products determined to need to be subjected to caulking process.

Further, the press-fit products determined not to need to be subjected to caulking process in Step S107 finish assembly thereof as finished products without passing through the caulking process.

In this case, the caulking process is performed by performing, in the state of holding by an appropriate jig the shaft portion 621 and the flange portion 622, which have been integrated with each other by press-fitting, partial plastic working on one of the shaft portion and the flange portion 622. In this case, the working object is preferably the flange portion 622, which can be formed by a relatively soft material compared with a material of the shaft portion 621. In this case, it is preferable that an appropriate jig for caulking be pressurized to the inner periphery of the upper end surface 622a of the flange portion 622 to thereby plastically deform the flange portion 622, the inner periphery being a vicinity of the fastening portion with respect to the shaft portion 621. Further, in order to reduce deformation of the flange portion 622 due to the caulking, in particular, the hump generated around a portion to be subjected to caulking process, it is also effective to eliminate in advance a part of the inner periphery of the upper end surface 622a of the flange portion 622, or a part on a side of the upper end surface 622a of the inner peripheral surface 622c.

Through Steps S103 to S107 (to Step S108 if needed) described above, press-fitting and, if needed, caulking process are performed on the paired shaft portion 621 and the flange portion 622, whereby the shaft member 602 as an assembly is formed. The series of Steps S103 to 108 are performed on the shaft portions 621 and the flange portions 622 as many as possible in the lots $L_s$ and $L_f$, thereby obtaining the shaft portion 602 as the assembly.

As described above, by performing assembly of the shaft portion 621 and the flange portion 622 by press-fitting, and by evaluating the tightening allowance at the time of press-fitting and setting the caulking condition based on the evaluated tightening allowance, it is possible to adjust the caulking condition depending on the degree of the evaluated allowance. Therefore, variation in tightening allowance is compensated by the caulking, and stable fixing force can be imparted between the shaft portion 621 and the flange portion 622. Specifically, when the evaluated allowance has a size smaller than that within an appropriate allowable range, that is, regarding the assembly of the flange portion 622 and the shaft portion 621 in the region $A_1$ in FIG. 57, it is possible to substantially and effectively make reinforcement by caulking by performing the caulking process in the appropriate caulking condition base on the evaluated value of the tightening allowance.

Further, in this embodiment, before the press-fitting step, matching on a lot-by-lot basis is performed for setting smaller than the aimed value $P_{aim}$ of the tightening allowance the difference $P_{m1}$ between the representative outer diameter dimension $M_s$ of the shaft portion 621 and the representative inner diameter dimension $M_f$ of the hole of the flange portion 622, which are determined in the lots $L_s$ and $L_f$ respectively.

Therefore, an appropriate allowable range of the tightening allowance (range represented by region $A_0$ in FIG. 57, which corresponds to working tolerance $T_s$ of the shaft portion in this case) wholly shifts to the side on which the tightening allowance is large. As a result, while the region $A_1$ in which the tightening allowance is relatively excessively small is increased (range in which the tightening allowance falls out of allowable width region $A_0$ of the appropriate tightening allowance to a side on which the tightening allowance is small), by that much, the region $A_2$ in which the tightening allowance is relatively excessively large is decreased (range in which the tightening allowance falls out of allowable width region $A_0$ of the appropriate tightening allowance to the side on which the tightening allowance is large). In this case, in the assembly of the combination of the flange portion 622 and the shaft portion 621 belonging to the allowable width region $A_1$ of the tightening allowance, fixing force therebetween can be adjusted by performing the caulking process based on the evaluated allowance, and hence fixing force after the press-fitting and the caulking can be ensured with respect to as many works in lots as possible, and ratio of failure assemblies due to excessively large tightening allowance is reduced, whereby it is possible to improve yield rate.

Figure 58:
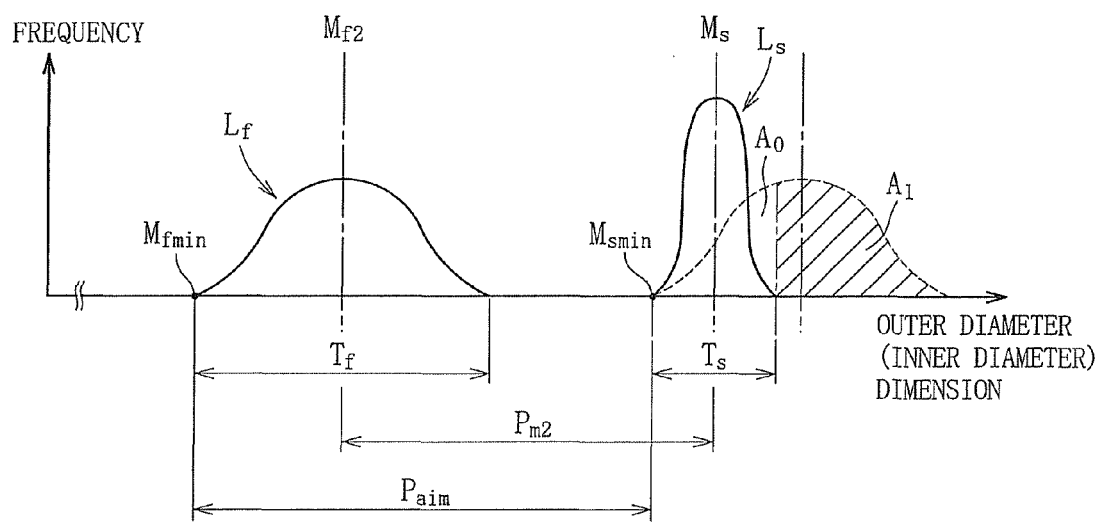
FIG. 58 is a graph illustrating another example of the frequency distribution of the outer diameter dimension of the shaft portion and the frequency distribution of the inner diameter dimension of the hole of the flange portion, which are arbitrarily selected from the respective lots and to be matched in pairs with each other.

Further, when performing matching on a lot-by-lot basis as described above, as illustrated in FIG. 58, for example, it is also possible to perform matching of setting as the aimed value $P_{aim}$ a difference between a minimum outer diameter dimension $M_{smin}$ of the shaft portion 621 and a minimum inner diameter dimension $M_{fmin}$ of the hole of the flange portion 622, which are determined in the lots $L_s$ and $L_f$, respectively. By performing press-fitting after performing matching in this way, it is possible to eliminate the assembly of the flange portion 622 and the shaft portion 621, the assembly being included in the region $A_2$ in which the tightening allowance is relatively excessively large. Therefore, failures in assembly due to press-fitting can be further reduced and the yield rate of the shaft member 602 can be further improved. Note that, as illustrated in FIG. 58, in the case of the lots $L_s$ in which the difference between the representative outer diameter dimension $M_s$ and the minimum outer diameter dimension $M_{smin}$ corresponds to a half of the working tolerance $T_s$ (also in lots $L_f$ of the flange portion, when a difference between representative inner diameter dimension $M_{f2}$ and minimum inner diameter dimension $M_{fmin}$ corresponds to the half of working tolerance $T_f$), it is possible to perform matching by a difference $P_{m2}$ between the representative dimensions $M_s$ and $M_{f2}$, thereby facilitating management.

Further, as in this embodiment, control of the caulking process can be facilitated when setting is performed such that a specific caulking condition is given to the press-fit product of the assembly whose evaluated tightening allowance is smaller than the predetermined amount. Further, it is possible to simplify not only the caulking process mode but also the equipment thereof, and hence it is also preferable economically.

Hereinabove, the manufacturing method for the shaft member 602 according to the sixth embodiment of the present invention is described. However, as a matter of course, the embodiment thereof can be modified within the range of the present invention.

Figure 59:
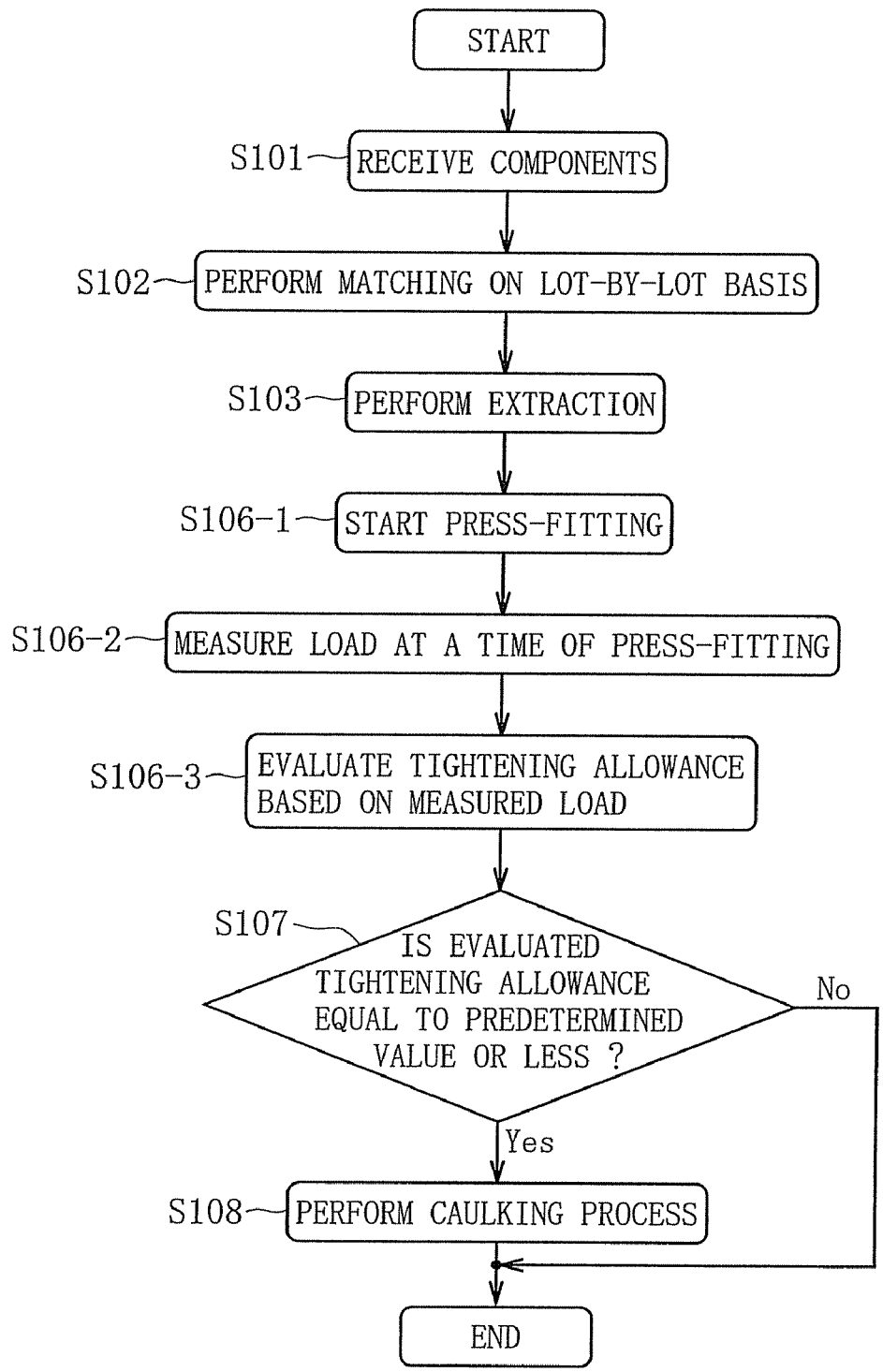
FIG. 59 is a flowchart of a manufacturing method for a fluid dynamic bearing device according to another structure.
Figure 60:
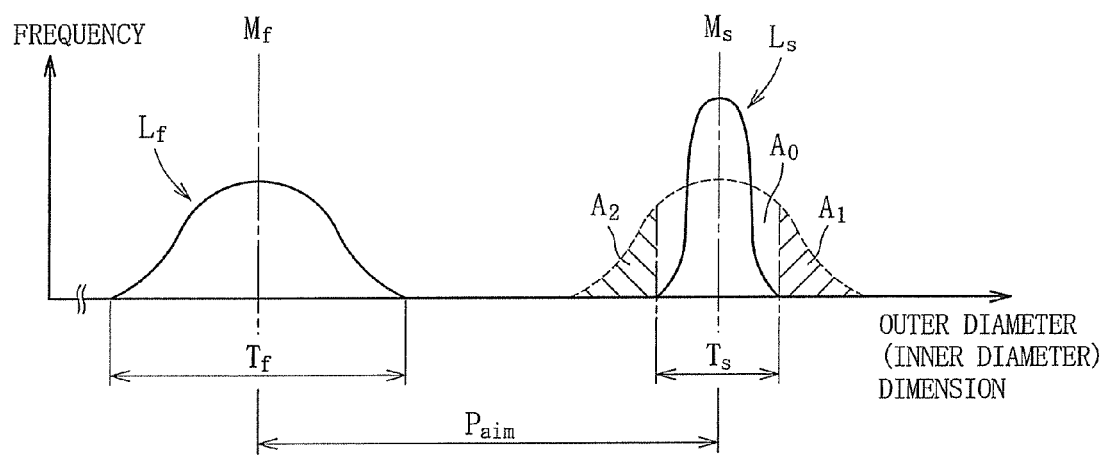
FIG. 60 is a graph illustrating a conventional example of the frequency distribution of the outer diameter dimension of the shaft portion and the frequency distribution of the inner diameter dimension of the hole of the flange portion, which are arbitrarily selected from the respective lots and to be matched in pairs with each other.

For example, in the above-mentioned embodiment, there is described the case of performing the evaluation of the tightening allowance (Step S105) based on the results of measurement of the outer diameter dimension of the hole of the shaft portion 621 and the inner diameter dimension of the hole of the flange portion 622. However, the evaluation of the tightening allowance may be performed based on information other than the above. FIG. 59 is a flowchart of a manufacturing method according to an example thereof. The structure (step) of the manufacturing method illustrated in FIG. 59 is different from that illustrated in FIG. 52 in including, after Step S103 of extracting the shaft portion 621 to be press-fitted and the flange portion 622, Step S106-1 of starting the press-fitting, Step S106-2 of measuring load at the time of the press-fitting, and Step S106-3 of evaluating the tightening allowance based on the measured load.

In this way, by measuring the load at the time of press-fitting and evaluating the tightening allowance based on the measured load, information about press-fit states of the individual press-fit products can be obtained, and hence it is possible to evaluate the tightening allowance (fixing force which is estimated to be obtained by press-fitting) based on the information reflecting the individually specific press-fit states. Further, when press-fitting force is measured, by a pressure sensor such as a loadcell provided to the caulking jig, as reaction force received by the shaft portion 621 from the flange portion 622, it is possible to reduce the number of steps and simplify the equipment thereof compared with the case of measuring the dimensions individually before press-fitting, which is preferable. As a matter of course, if the measured load (reaction force and the like) can be used as the evaluated tightening allowance as it is in the subsequent determination step S107, the determination may also be made with the determination criteria in Step S107 being replaced by the caulking load.

Further, in the above-mentioned embodiment, there is described the case where a threshold value (lower minimum value) of the tightening allowance is set as a value corresponding to minimum extraction force required depending on use, model to be mounted, and the like, and a step of uniformly setting the caulking condition (Step S107) is provided when the actually evaluated tightening allowance is lower than the threshold value. However, it is also possible to appropriately set the caulking condition by the means other than the above. For example, it is also possible to provide, after the evaluation of the tightening allowance (Step S105 or Step S106-3), in place of Step S107, a step of setting the caulking condition (thereafter, the caulking process is performed depending on the set caulking condition) such that sum of fastening force based on the evaluated tightening allowance and fastening force due to caulking is constant. Alternatively, when the evaluated tightening allowance does not reach the above-mentioned threshold value, it is also possible to provide a step of setting the caulking condition thereof such that the sum of fastening force due to press-fitting and fastening force due to caulking corresponds to the above-mentioned threshold value. By setting the caulking condition in this way, it is possible to obtain the shaft member having uniform fixation strength of less variation.

Note that, in the evaluation of the tightening allowance (Step S105 and Step S106-3) and the determination step S107 for the tightening allowance, which are adopted in the above-mentioned embodiment, the matching step S102 on a lot-by-lot basis may not be necessarily provided. That is, even in the case of receiving each component not on a lot-by-lot basis but in an all member mixed state, it is possible to control through the above-mentioned steps the caulking condition including whether the caulking is needed or not, and hence stable fixation strength of less variation can be given to the shaft member.

Further, in this embodiment, there is exemplified the case of providing the caulking fixation portion 623 at the axial upper end (side of upper end surface 622*a*) of the press-fit region of the shaft portion 621 and the flange portion 622. However, in addition to this, the caulking process may be performed on the inner periphery of the lower end surface 622*b* of the flange portion 622 by an appropriate jig. In this case, in the determination step S107, whether or not to perform caulking process on one end side or caulking process on both end sides may be determined (caulking condition may be set) depending on required retention force.

The above-mentioned manufacturing method according to the present invention can be also applied not only to the fluid dynamic bearing device of the above-mentioned structure, but also to that of the other structure.

For example, while in the above-mentioned embodiment, there is described the case of using the outer peripheral surface of the shaft portion 621 as the radial bearing surface 621*a*, and the upper end surface 622*a* and the lower end surface 622*b* of the flange portion 622 as the thrust bearing surfaces, the present invention is not limited thereto. For example, while not shown, it is also possible to apply the present invention to the shaft member for the fluid dynamic bearing device having a structure in which only the upper end surface 622*a* of both the end surfaces 622*a* and 622*b* is used as the thrust bearing surface.

Note that, while the housing 607 and the bearing sleeve 608 are separated in the above-mentioned embodiment, it is also possible to integrate two or more members selected from members constituting the fixed side of the fluid dynamic bearing device 601 in a range allowing assembly (to integrally form by the same material, or to insert one member and die mold the other member). For example, in the structure illustrated in FIG. 54, integration is possible between the housing 607 and the bearing sleeve 608, the housing 607 and the lid member 609, and the housing 607 and the seal member 610. It is also possible to integrate the housing 607, the bearing sleeve 608, and the seal member 610. Further, application of the present invention is not disturbed by a shape of the flange portion to be integrated with the shaft portion. For example, it is possible to apply the present invention to the shaft member integrally having the flange portion provided with the sealing surface in the outer periphery thereof.

Further, in the above-mentioned embodiments (first to sixth embodiments), as the radial bearing portions R11, R12, R21, R22, R31, R32, R41, R42, R51, R52, R61, and R62, and the thrust bearing portions T11, T12, T21, T22, T31, T32, T41, T42, T51, T52, T61, and T62, there are exemplified the structures of generating dynamic pressure effect of the lubricating oil by the dynamic pressure grooves of the herringbone pattern or the spiral pattern. However, the present invention is not limited thereto.

For example, as the radial bearing portions R11 and R12, while not shown, it is possible to adopt a so-called stepped dynamic pressure generating portion in which axial grooves are formed at multiple points in the circumferential direction, or the so-called multi-arc bearing in which multiple arcuate surfaces are arranged in the circumferential direction so as to form, together with the outer peripheral surface (radial bearing surface 21*a*) of the shaft portion opposed thereto, wedge-like radial gaps (bearing gaps) therebetween. As a matter of course, the similar structure can be also adopted as the radial bearing portions R21, R22, R31, R32, R41, R42, R51, R52, R61, and R62 according to the other embodiments (second to sixth embodiments).

Alternatively, a so-called perfectly cylindrical bearing can be constituted by the perfectly cylindrical outer peripheral surface (radial bearing surface 21*a*) opposed to the inner peripheral surface 8*a* of the bearing sleeve 8, the inner peripheral surface constituting the radial bearing surface and being formed as the perfectly cylindrical inner peripheral surface provided with no dynamic pressure groove, arcuate surface, and the like as the dynamic pressure generating portion. As a matter of course, the similar structure can be also adopted as the radial bearing portions R21, R22, R31, R32, R41, R42, R51, R52, R61, and R62 according to the other embodiments (second to sixth embodiments).

Further, the radial bearing portions described above may be provided at two points while being axially separated from each other as described above, or may be provided at only one point or three points while being axially separated from each other.

Further, while not shown as well, one of or both the thrust bearing portions T11 and T12 according to the first embodiment can be constituted also by a so-called stepped bearing in which multiple dynamic pressure grooves having a radial groove shape are provided at predetermined intervals in the circumferential direction in a region constituting the thrust bearing surface, or by a corrugated bearing (in which the end surface thereof has a corrugated shape such as a harmonic waveform). As a matter of course, the similar structure can be also adopted as the thrust bearing portions T21, T22, T31, T32, T41, T42, T51, T52, T61, and T62 according to the other embodiments (second to sixth embodiments).

Further, in the above description, the case is described in which the dynamic pressure generating portion is provided on the fixed side (housings 57, 157, 377, 457, and 507, bearing sleeves 8, 108, 308, 408, 508, and 608, lid members 9, 109, 309, 409, 509, and 609, and the like). However, a part of or all of the dynamic pressure generating portion may be provided to the rotary side (shaft portions 21, 121, 321, 421, 521, and 621, flange portions 22, 122, 322, 422, and 622 (including thrust members 522 and 527), and hubs 53, 153, 373, 453, and 503, and the like). For example, in the first embodiment, it is possible to provide the above-mentioned dynamic pressure generating portion to at least one of the outer peripheral surface (radial bearing surface 21a) of the shaft portion 21, the both end surfaces 22a and 22b of the flange portion 22, and the lower end surface 53a1 of the hub 53.

Further, for example, as in the third embodiment, when performing press-fitting or caulking fixation of the shaft portion 321 in the state of binding the flange portion 322, it is possible to provide in advance a die corresponding to the thrust dynamic pressure generating portion on the lower end surface 331b of the first jig 331 or the upper end surface 332a of the second jig 332 illustrated in FIGS. 28A to 28C, to thereby impart corrective force to the flange portion 322 and form the dynamic pressure generating portion corresponding to the die on both the end surfaces 322a and 322b of the flange portion 322.

Further, in the above description, there is described a structure in which the shaft member 2 is rotated and supported by the bearing sleeve 8 or the like in a non-contact manner. However, contrary to this, the present invention can be also applied to the structure in which the bearing sleeve 8 is rotated and supported by the shaft member 2. In this case, regarding the first embodiment, for example, the bearing sleeve 8 is fixed to the hubs 3 and 53 integrally or separately, and is rotated integrally therewith. As a matter of course, in addition to the first embodiment, the above-mentioned structure can also be applied to the fluid dynamic bearing devices 101, 151, 301, 371, 401, 451, 501, and 610 according to the second to sixth embodiments.

Further, in the above description, the lubricating oil is exemplified as fluid filled in the inside of the fluid dynamic bearing devices 1, 51, 101, 151, 301, 371, 401, 451, 501, and 601, for forming the fluid film in the radial bearing gap or the thrust bearing gap. However, other than the lubricating oil, it is possible to use fluid capable of forming the fluid film, such as gas including air, lubricant having flowability such as magnetic fluid, or lubricating grease.

What is claimed is:

1. A shaft member for a fluid dynamic bearing device, comprising:
   a shaft portion; and
   a flange portion fixed to one end of the shaft portion, in which:
   an outer periphery of the shaft portion is provided with a radial bearing surface capable of forming a radial bearing gap between the radial bearing surface and a surface opposed to the radial bearing surface; and
   one end surface of the flange portion is provided with a thrust bearing surface capable of forming a thrust bearing gap between the thrust bearing surface and a surface opposed to the thrust bearing surface, the shaft member being rotated and supported by fluid film formed in the radial bearing gap and the thrust bearing gap, wherein:
   a radially inner side of the one end surface with respect to the thrust bearing surface is provided with a relief portion having a flat surface closer to an another end surface of the flange portion than the thrust bearing surface,
   the shaft portion is press-fitted into a hole portion provided in the flange portion; and
   the relief portion of the flange portion is partially subjected to a caulking process as plastic working,
   a caulked portion with respect to the shaft portion is constituted by a first hump portion generated on a radially inner side of a portion recessed by the caulking process in the relief portion and the flange portion is fixed to the shaft portion by the caulked portion.

2. A shaft member for a fluid dynamic bearing device according to claim 1, wherein the shaft portion is provided with a release portion for releasing plastic deformation of the flange portion, which is caused by plastic working, to a radially inner side.

3. A shaft member for a fluid dynamic bearing device according to claim 1, wherein the caulking process is performed on a position separated from a radially outer end of the relief portion.

4. A shaft member for a fluid dynamic bearing device according to claim 1, wherein the thrust bearing surface is constituted by a second hump portion generated on a radially outer side of a portion recessed by the caulking process.

5. A shaft member for a fluid dynamic bearing device according to claim 4, wherein the second hump portion has a protruding height equal to 3 µm or less from a thrust bearing surface.

6. A shaft member for a fluid dynamic bearing device according to claim 1, wherein between an inner peripheral surface of the hole portion of the flange portion and the outer peripheral surface of the shaft portion, a portion fixed by press-fitting, a portion fixed by caulking, and a portion absorbing plastic deformation caused in accordance with caulking are provided.

7. A shaft member for a fluid dynamic bearing device according to claim 6, wherein the portion absorbing plastic deformation is formed by filling a gap provided between the flange portion and the shaft portion.

8. A shaft member for a fluid dynamic bearing device according to claim 6, wherein the portion absorbing plastic deformation is formed on an inside in a radial direction of a portion recessed by a caulking process.

9. A shaft member for a fluid dynamic bearing device according to claim 6, wherein the portion fixed by caulking and the portion absorbing plastic deformation are formed in the same region.

10. A shaft member for a fluid dynamic bearing device according to claim 1, wherein the thrust bearing surface of the one end surface of the flange portion is covered with a cover portion.

11. A shaft member for a fluid dynamic bearing device according to claim 10, wherein the cover portion is formed by die molding through insertion of the shaft portion and the flange portion.

12. A shaft member for a fluid dynamic bearing device according to claim 10, wherein the cover portion is provided with a thrust dynamic pressure generating portion for generating a fluid dynamic pressure in the thrust bearing gap.

13. A shaft member for a fluid dynamic bearing device according to claim 1, wherein the hole portion is a through-hole opening in both end surfaces of the flange portion.

14. A fluid dynamic bearing device provided with the shaft member according to claim 1.

15. A motor provided with the fluid dynamic bearing device according to claim 14.

* * * * *